United States Patent
Oke et al.

(10) Patent No.: US 7,751,013 B2
(45) Date of Patent: Jul. 6, 2010

(54) LIQUID CRYSTAL DISPLAY DEVICE WITH COMMON ELECTRODES CONNECTED ACROSS GATE SIGNAL LINES UTILIZING BRIDGE LINES AND CONNECTION PORTIONS

(75) Inventors: Ryutaro Oke, Chiba (JP); Kazunori Ojima, Mobara (JP); Masaki Tsubokura, Mobara (JP); Masashi Baba, Chiba (JP); Yasuhiko Yamagishi, Mobara (JP); Masahiro Tanaka, Yotsukaido (JP); Yuuichi Takenaka, Chiba (JP); Shinji Yasukawa, Shirako (JP); Kikuo Ono, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 11/905,608

(22) Filed: Oct. 2, 2007

(65) Prior Publication Data
US 2008/0043193 A1    Feb. 21, 2008

Related U.S. Application Data

(63) Continuation of application No. 11/098,516, filed on Apr. 5, 2005, now abandoned.

(30) Foreign Application Priority Data
Apr. 9, 2004    (JP)    .............................. 2004-115337

(51) Int. Cl.
*G02F 1/1343*    (2006.01)

(52) U.S. Cl. ..................................... 349/141; 349/144

(58) Field of Classification Search ................. 349/141, 349/144
See application file for complete search history.

(56) References Cited

U.S. PATENT DOCUMENTS 6,256,081 B1    7/2001    Lee et al.

(Continued)

FOREIGN PATENT DOCUMENTS

JP    10-274777    3/1997

(Continued)

OTHER PUBLICATIONS

Office Action from the Taiwan Patent Office dated Apr. 14, 2009 in Chinese.

*Primary Examiner*—David Nelms
*Assistant Examiner*—Jessica M Merlin
(74) *Attorney, Agent, or Firm*—Stites & Harbison PLLC; Juan Carlos A. Marquez, Esq.

(57) ABSTRACT

TFTs are formed on a substrate. An interlayer insulation film is formed on the substrate to cover the TFTs. Lower layer portions of SD lines formed of a multi-layered film which are formed on the interlayer insulation film constitute a lower electrode of an organic EL layer. An uppermost layer of the SD line is formed of a chemically stable metal oxide film, and the SD layer is used as it is. On the other hand, as a lower electrode of an organic EL layer, an upper layer of the SD line is removed and an Al—Si, alloy film of the SD line is used. Due to such a constitution, it is possible to reduce a cost by shortening steps while holding the performance and the reliability of organic EL.

10 Claims, 50 Drawing Sheets

U.S. PATENT DOCUMENTS

| | | |
|---|---|---|
| 6,259,499 B1 | 7/2001 | Yamanashi |
| 6,456,351 B1 | 9/2002 | Kim et al. |
| 6,614,498 B1 | 9/2003 | Tanaka et al. |
| 2001/0030726 A1* | 10/2001 | Yoshida et al. ............. 349/117 |
| 2001/0048500 A1* | 12/2001 | Lim et al. .................. 349/141 |
| 2002/0041354 A1* | 4/2002 | Noh et al. .................. 349/141 |
| 2002/0089618 A1 | 7/2002 | Ahn |
| 2002/0159015 A1 | 10/2002 | Seo et al. |
| 2003/0020862 A1 | 1/2003 | Ohta et al. |
| 2003/0081163 A1 | 5/2003 | Suzuki et al. |
| 2003/0086045 A1* | 5/2003 | Ono et al. .................. 349/141 |
| 2004/0100607 A1 | 5/2004 | Kawata et al. |
| 2004/0227890 A1 | 11/2004 | Chung et al. |
| 2005/0007533 A1 | 1/2005 | Tanaka et al. |
| 2005/0062923 A1 | 3/2005 | Lyu et al. |
| 2005/0099572 A1 | 5/2005 | Ahn et al. |
| 2005/0151911 A1 | 7/2005 | Kim et al. |
| 2005/0231671 A1 | 10/2005 | Jun et al. |

FOREIGN PATENT DOCUMENTS

| | | |
|---|---|---|
| JP | 2001-194681 | 12/1999 |
| KR | 1999-0030881 | 10/1997 |
| KR | 2000-0009875 | 7/1998 |
| KR | 2000-0038537 | 12/1998 |
| KR | 2001-0003751 | 6/1999 |
| KR | 2001-0047913 | 11/1999 |
| KR | 2002-0050815 | 12/2000 |
| TW | 448335 | 11/1997 |

* cited by examiner

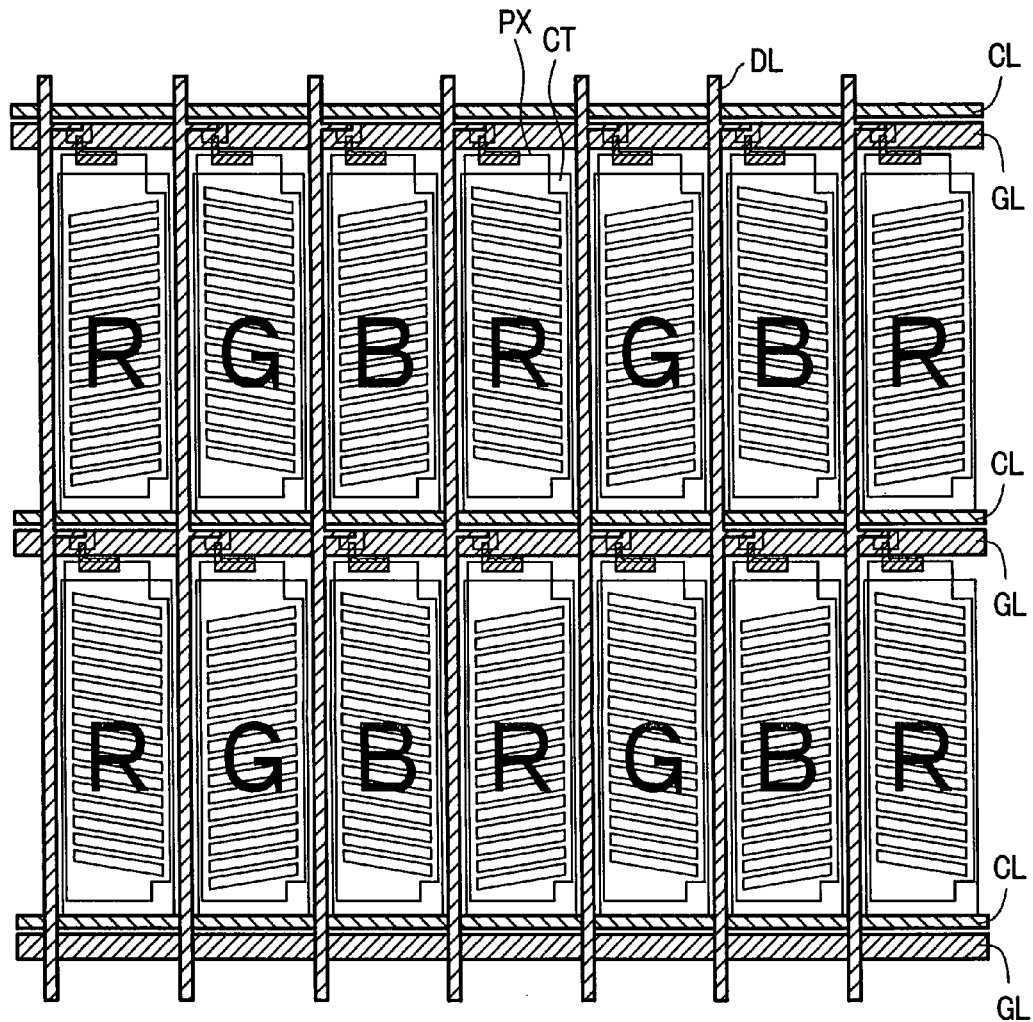

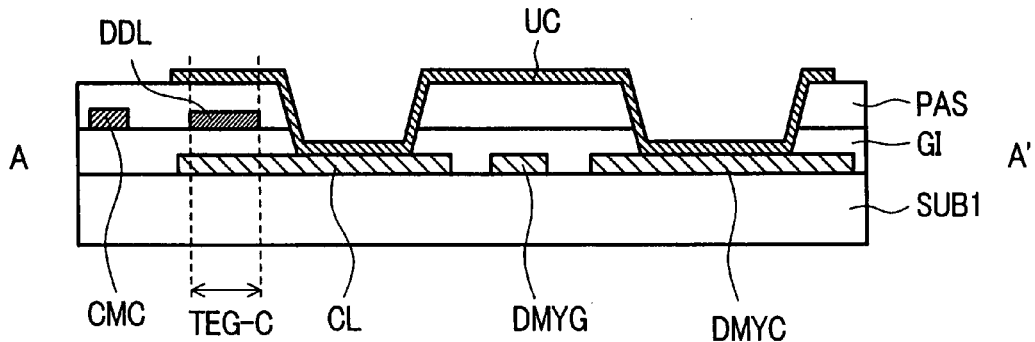
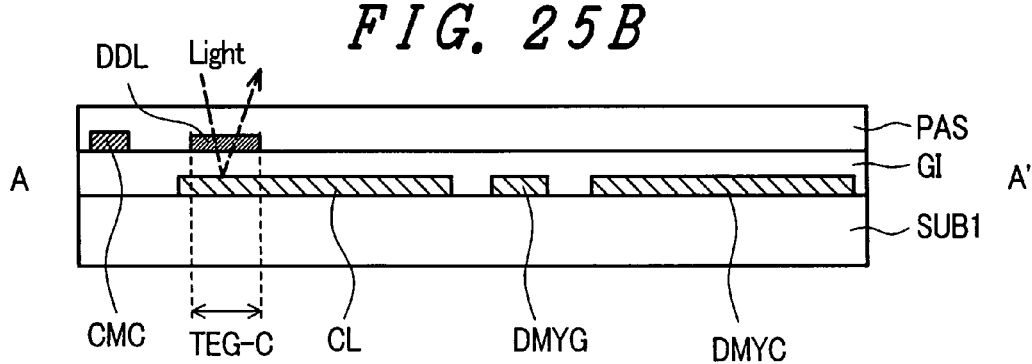
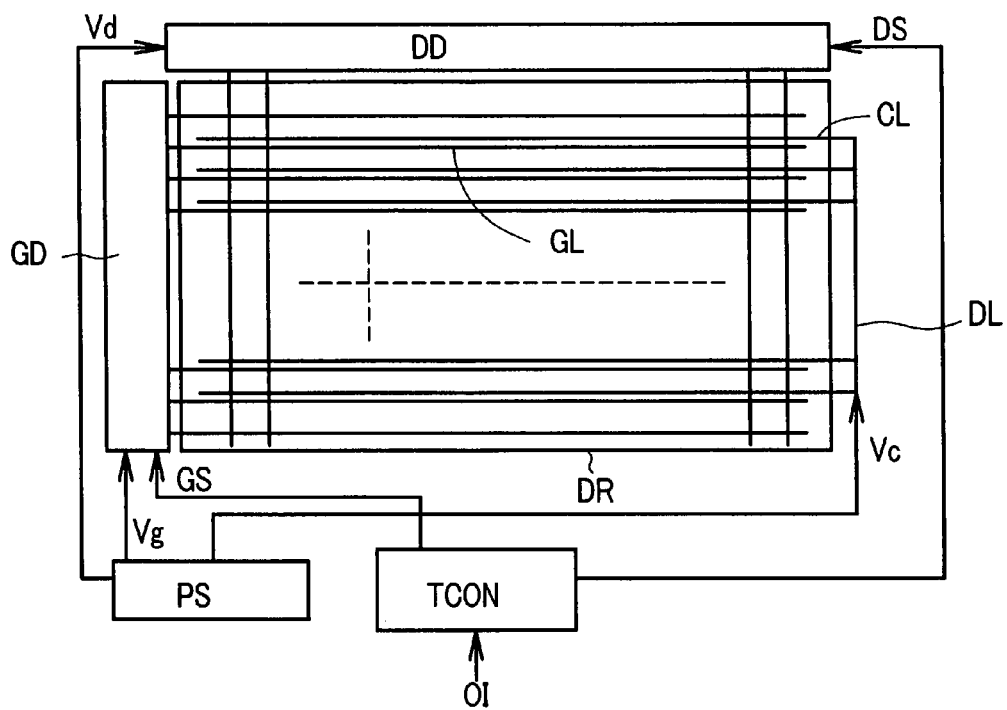

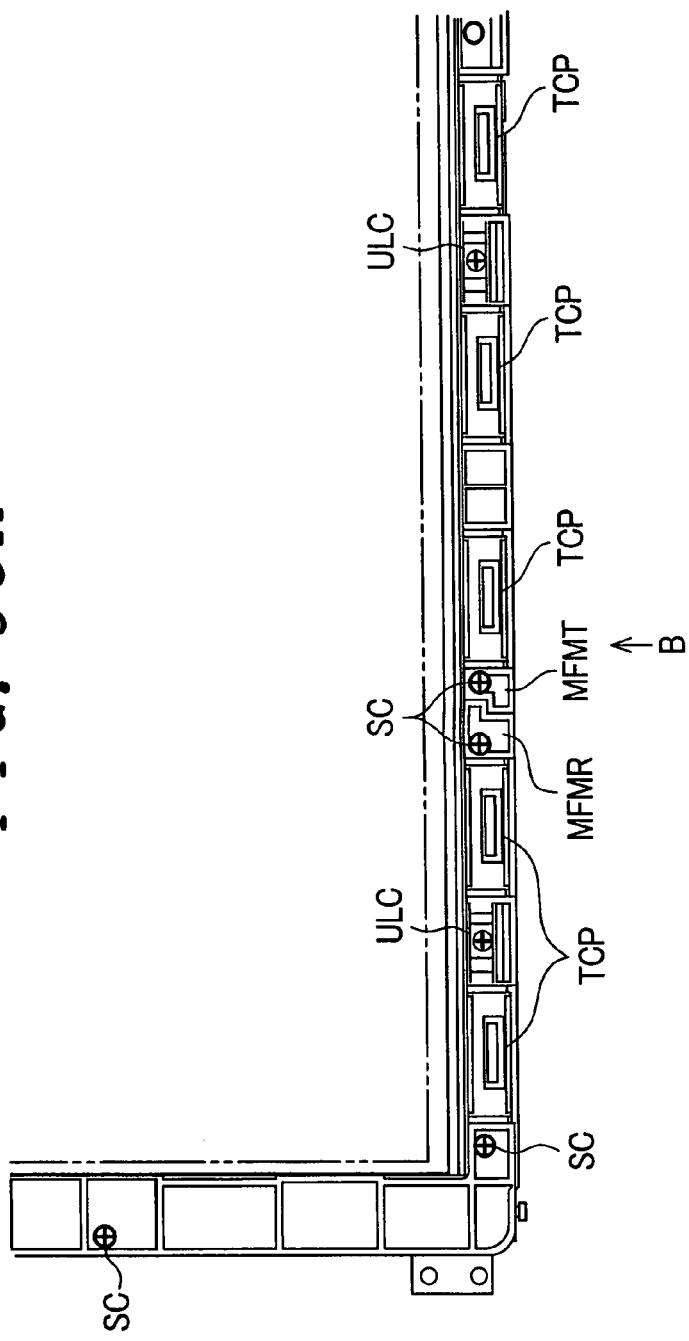
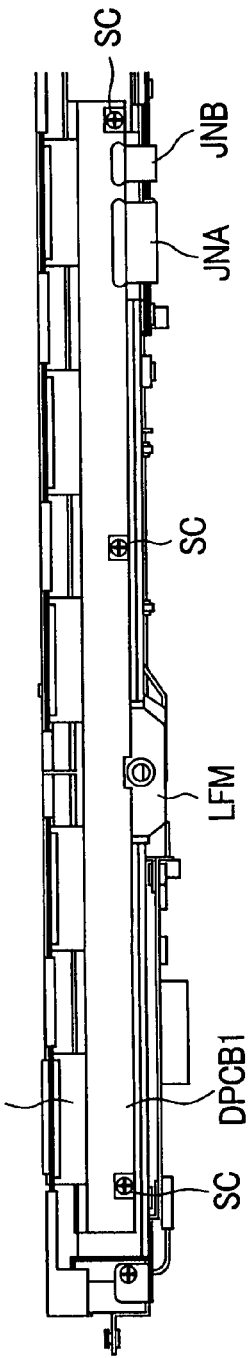
FIG. 38A
FIG. 38B

*FIG. 50A*
Data Set
 A : 00, 1F, 3E, 6M, 9A
 B : 01, 2F, 4E, 7A, 9M
 C : 00, 1C, 2M, 4C, 9A
*FIG. 50B*
Rev 3. 00A
for HITACHI
*FIG. 50C*
*FIG. 50D*
*FIG. 50E*
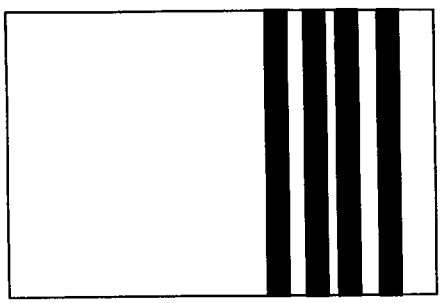
*FIG. 50F*
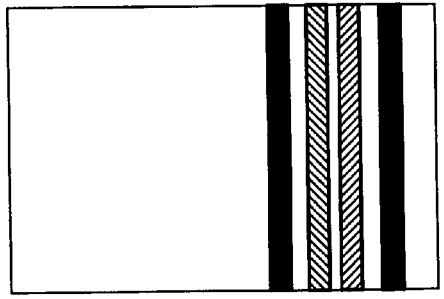

FIG. 59
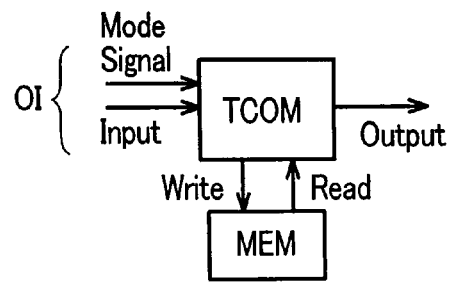
FIG. 60
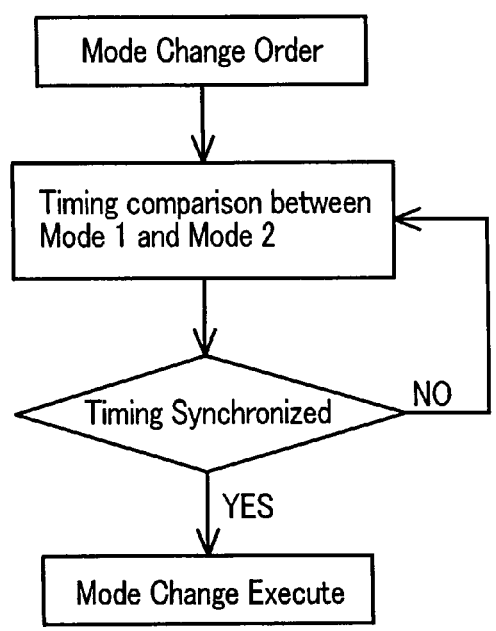
FIG. 61
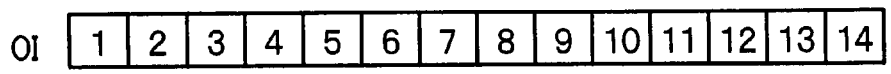
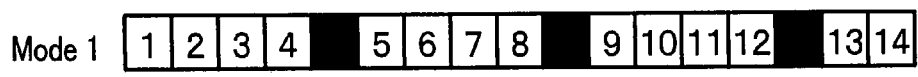
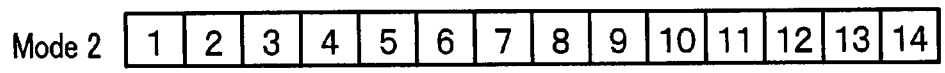

US 7,751,013 B2

LIQUID CRYSTAL DISPLAY DEVICE WITH COMMON ELECTRODES CONNECTED ACROSS GATE SIGNAL LINES UTILIZING BRIDGE LINES AND CONNECTION PORTIONS

CROSS REFERENCE TO RELATED APPLICATIONS

This application is a Continuation of nonprovisional U.S. application Ser. No. 11/098,516 filed on Apr. 5, 2005 now abandoned. Priority is claimed based on U.S. application Ser. No. 11/098,516 filed on Apr. 5, 2005, which claims the priority of Japanese Application 2004-115337 filed on Apr. 9, 2004, all of which is incorporated by reference.

BACKGROUND OF THE INVENTION

1. Field of the Invention

The present invention relates to a display device.

2. Description of the Related Art

A display device has tasks which have to be steadily improved such as the enhancement of brightness, the improvement of a viewing angle, the enhancement of image quality, the enhancement of a yield rate, the enhancement of reliability, the enhancement of productivity, the reduction of cost and the like. Here, with respect to the improvement of the viewing angle, for example, U.S. Pat. No. 6,256,081 disclose a display device which sets the directions of electrodes in a plurality of directions in the inside of one pixel or U.S. Pat. No. 6,456,351 disclose a display device in which the directions of electrodes are made different in three pixels which are arranged close to each other in the lateral direction.

SUMMARY OF THE INVENTION

As has been explained in the Description of the Related Art, the display device has the various tasks which have to be steadily improved. Among these tasks, with respect to the viewing angle, for example, inventors of the present invention have found out that the structure shown in U.S. Pat. No. 6,256,081 generates an invalid region on a center portion of a pixel and lowers the brightness. Further, the inventors of the present invention have found out that the arrangement of the U.S. Pat. No. 6,456,351 exhibits an insufficient viewing angle at the time of displaying a monochroic color corresponding to a color filter of red, green or blue.

The present invention has been made under such circumstances, for example, and one of advantages of the present invention is to provide a display device which can enhance a viewing angle and can realize the enhancement of brightness in both of a white display and a monochroic display.

Although there are many other tasks and advantages which the present invention aims to achieve, these tasks and advantages will become apparent by the disclosure made in this specification and attached drawings.

To briefly explain the inventions disclosed in this specification, they are as follows.

(1) In a display device having a display element, for example, the display element is configured such that the extending directions of electrodes are made different from each other among upper, lower, left and right pixels.

(2) On the premise of the constitution (1), the extending direction of the electrodes in each pixel is unidirectional.

(3) On the premise of the constitution (1) or (2), the pixels include two types of pixels in which the extending directions of the electrodes are symmetrical with respect to the gate-signal-line extending direction or the video-signal-line extending direction, and the pixels are alternately arranged in the upper, lower, left and right directions.

(4) On the premise of any one of the constitutions (1) to (3), the display element includes color filters having three primary colors and the color filters are arranged such that the color filters of the same color are arranged in the longitudinal direction of the display device and the color filters of three primary colors are sequentially arranged in the lateral direction of the display device.

(5) In a display device having a display element, for example, the display element includes lower planar electrodes and upper electrodes each of which has a large number of line-like portions or slit portions which are formed on a same substrate, and the extending directions of the large number of line-like portions or slit portions are made different from each other among upper, lower, left and right pixels.

(6) On the premise of the constitution (5), the extending direction of the line-like portions and the slit portions in each pixel is unidirectional.

(7) On the premise of the constitution (5) or (6), the pixels include two types of pixels in which the extending directions of the line-like portions or the slit portions are symmetrical with respect to the gate-signal-line extending direction or the video-signal-line extending direction, and the pixels are alternately arranged in the upper, lower, left and right directions.

(8) On the premise of any one of the constitutions (5) to (7), the display element includes color filters having three primary colors and the color filters are arranged such that the color filters of the same color are arranged in the longitudinal direction of the display device and the color filters of three primary colors are sequentially arranged in the lateral direction of the display device.

The display device having such constitutions can enhance a viewing angle and can enhance the brightness in both of a white display and a monochroic display.

Other advantageous effects which are realized by other constitutions of the display device disclosed in this specification will become apparent based on the disclosure in this specification and attached drawings.

DESCRIPTION OF THE DRAWINGS

FIG. 3 is an explanatory view of an example of the correspondence between color filters and a group of pixels of the display device according to the present invention;

FIG. 4 is an explanatory view of an example of the correspondence between color filters and a group of pixels of the display device according to the present invention;

FIG. 25A and FIG. 25B are cross-sectional views for explaining an example of a dummy pattern;

FIG. 26 is a view for explaining a schematic example of a system of a display device

FIG. 36A and FIG. 366B are views for explaining the positioning at a portion B in FIG. 34 in more detail;

FIG. 38A and FIG. 38B are a front view and an side view of the vicinity of a drain printed circuit board in a state that the upper frame is removed;

FIG. 50A to FIG. 50F are explanatory views showing various screen display examples in an information display mode;

FIG. 59 is a system diagram showing the signal transmission between a TCON and a memory;

FIG. 60 is a flow chart of a mode change;

FIG. 61 is an explanatory view of the mode changeover timing;

DETAILED DESCRIPTION OF THE PREFERRED EMBODIMENTS

Embodiments of the present invention are explained hereinafter in conjunction with drawings.

<Overall Schematic Constitution>

Figure 27:
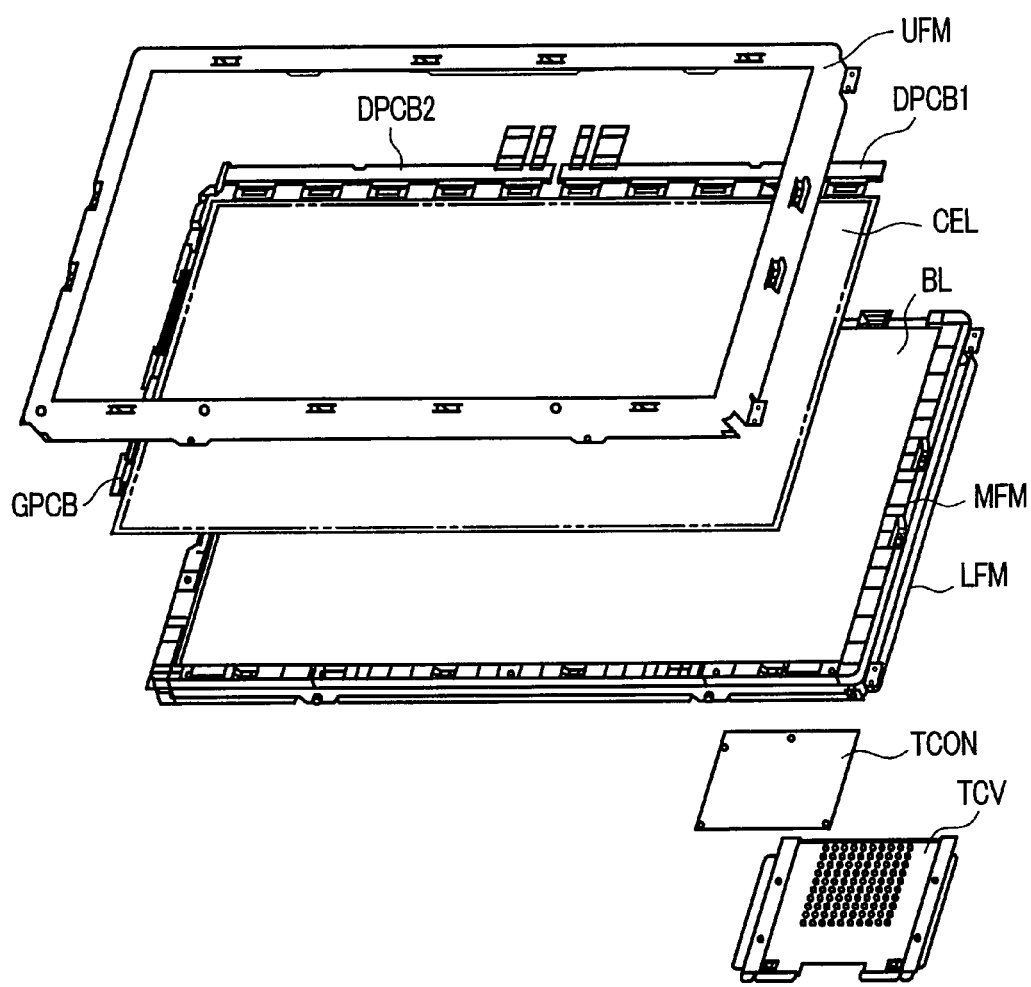
FIG. 27 is an exploded perspective view showing one example of the module structure of the display device.

A display device according to the present invention includes a display element as a constitutional element thereof. FIG. 27 is an explode perspective view showing one example of the module structure of the display device. The display element CEL is positioned between an upper frame UFM and a lower frame LFM. The upper frame UFM includes an opening portion and a display region DR of the display element CEL is exposed from the opening portion so that the display region DR can be observed. As an example, when the display element CEL is a liquid crystal display element, a backlight unit BL which becomes a light source of light to be transmitted through the display element CEL is arranged on a back surface of the liquid crystal display element. An intermediate frame MFM is arranged on a peripheral portion of the backlight unit BL and a peripheral portion of the display element CEL is positioned on the intermediate frame MFM thus determining the position of the display element CEL. In the display device, a controller TCON which generates various signals for realizing an image display on the display element CEL is provided.

FIG. 26 is a system schematic diagram showing a path for generating a display signal to the display element CEL in response to a signal from the controller TCON. Signals from the outside of the display device, for example, a signal from a TV set, a signal from a PC and other various control signals are inputted to the controller TCON as an external output OI. The controller TCON forms such signals into signals to be supplied to the display element CEL for an image display. The signals differ depending on the display element CEL. For example, the various control signals are formed into desired signal depending on cases such as a case in which the display element CEL is a liquid crystal display device, a case in which the display element CEL is an EL display device, a case in which the display element CEL is a FED display device. To consider the case in which the display element CEL is the liquid crystal display device as an example, the controller TCON supplies a video signal line drive circuit signal DS to a video signal line drive circuit DD and supplies a gate signal line drive circuit signal GS to a gate signal line drive circuit GD. Various voltages Vd for video signal line drive circuit which include a drive voltage for circuit per se and a plurality of gray scale reference voltages are supplied to the video signal line drive circuit DD from a power source circuit PS, while various voltages Vg for gate signal line drive circuit which include a drive voltage for the gate signal line drive circuit per se and a reference voltage which becomes the reference with respect to the gate voltage are supplied to the gate signal line drive circuit GD from the power source circuit PS. Further, as a common potential of the display element CEL, a common potential voltage Vc is supplied. A video signal is supplied to video signal lines DL from the video signal line drive circuit DD and a gate signal is supplied to gate signal lines GL from the gate signal line drive circuit GD, wherein using a switching element TFT formed on the pixel, in response to the control signal to the gate signal lines GL, a potential of the video signal line DL is supplied to a pixel electrode PX (described later). By driving the liquid crystal molecules with an electric field or a voltage difference between the pixel electrode PX and the common potential Vc, the state of the liquid crystal layer is changed so as to realize the image display.

<Display Element>

<<Example of Arrangement of Group of Pixels>>

Figure 1:
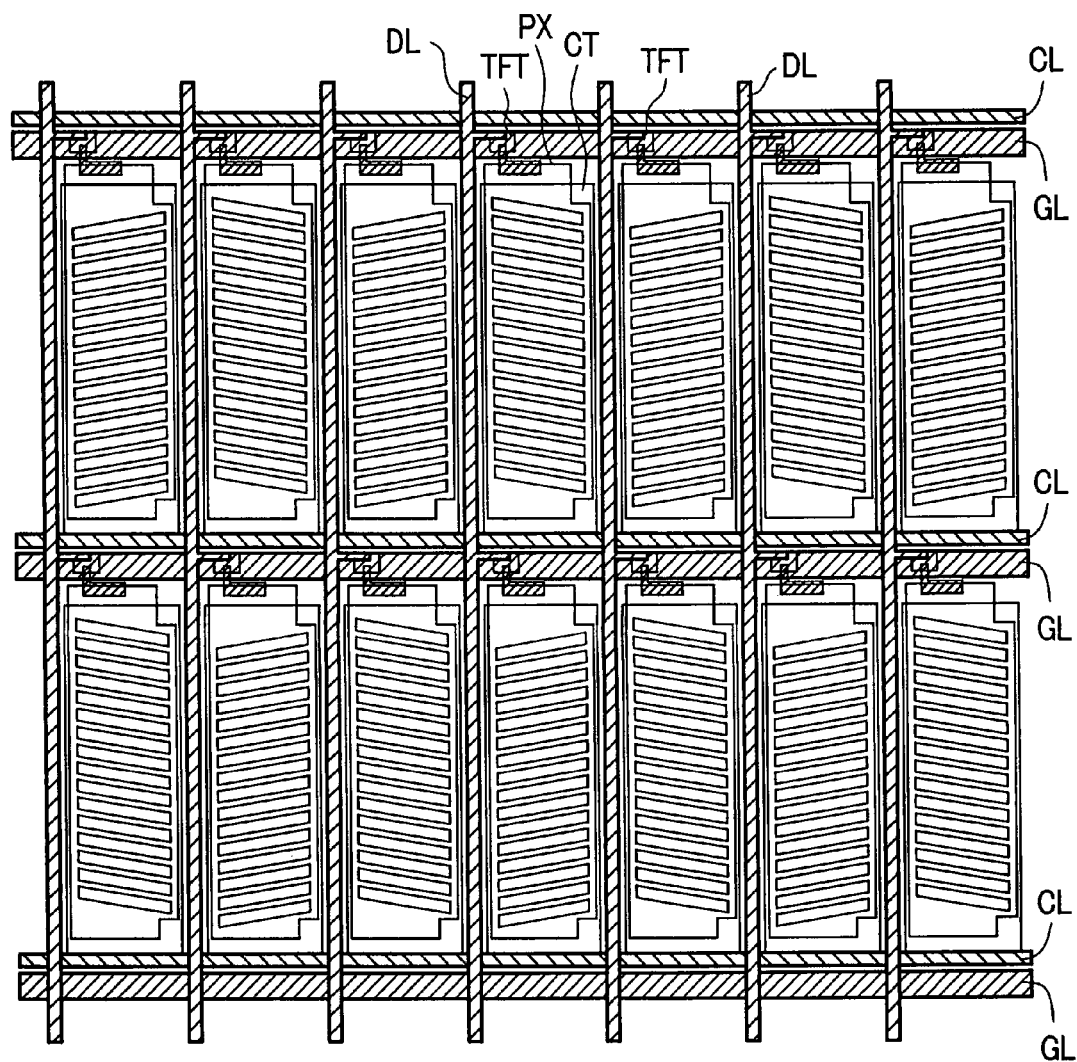
FIG. 1 is a plan view for explaining an arrangement example of a group of pixels of a display device according to the present invention.

One example of a group of pixels of the display element CEL is shown in FIG. 1. The video signal of the video signal line DL is supplied to the pixel electrode PX by way of the switching element TFT which is controlled by the gate signal lines GL. The common potential is supplied to the common electrode CT via the common signal line CL. The electric field is generated between the pixel electrode PX and the common electrode CT and hence, the liquid crystal layer is driven whereby the display is performed.

The constitutional feature of the constitution shown in FIG. 1 lies in that the extending direction of the electrodes differs among the upper, lower, left and right pixels which are arranged close to each other. Accordingly, this embodiment is characterized in the arrangement per se that the extending direction of the electrodes differs among the upper, lower, left and right pixels. One example of the division of pixel pattern for realizing such a constitutional feature is shown in FIG. 2. Symbol UE indicates an upper electrode which constitutes an upper layer and includes a large number of line-like portions or slits. Symbol LE indicates a lower electrode which constitutes a lower layer and is formed in a planar shape. Depending on the direction of the slits, for example, of the upper electrode UE, the extending direction of the electrode can be changed and hence, the direction of the electric field can be controlled.

Figure 2A:
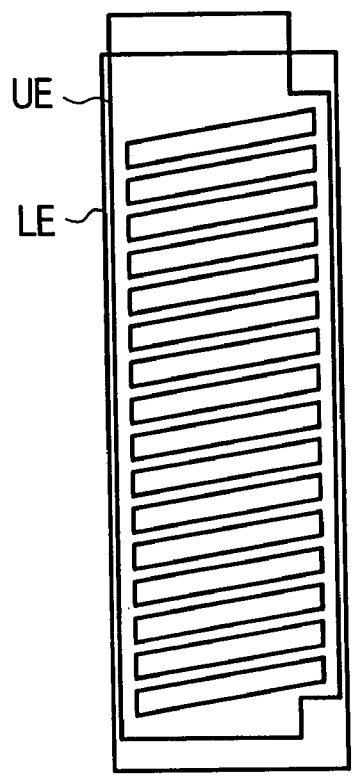
FIG. 2A and FIG. 2B are views for explaining an example of a pixel pattern of the display device according to the present invention.
Figure 2B:
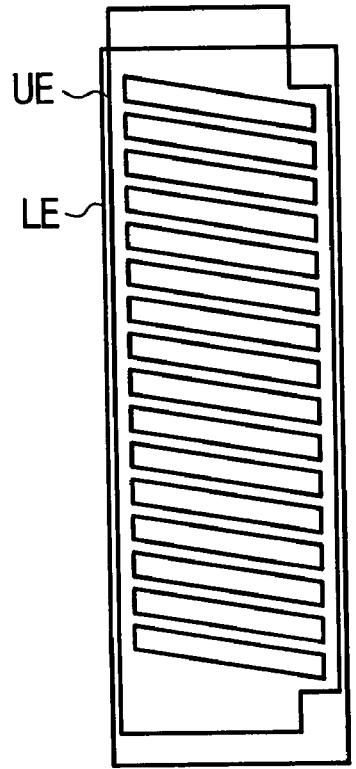

FIG. 2A shows a pixel pattern in which the slits extend in the right upward direction, while FIG. 2B shows a pixel pattern in which the slits extend in the right downward direction. By alternately arranging these two pixel patterns as the neighboring pixels in the upper, lower, left and right directions, it is possible to realize the constitution in which the extending direction of the electrodes differs among the upper, lower, left and right pixels. So long as the extending direction of the electrodes differs among the upper, lower, left and right pixels, any pixel structure can be used. For example, the present invention may apply to the arrangement of the direction of the slits or projections in a vertical orientation method (a VA method) display device.

FIG. 3 shows one example of color filter arrangement in the arrange of the group of pixels in FIG. 1. As the color filters, the color filters of three primary colors consisting of red (R), green (G) and blue (B) are arranged, for example. In these three primary colors, the color filters in common color are arranged in the group of pixels in the longitudinal direction. Due to such an arrangement, as can be clearly understood from FIG. 2, even when the pixels are observed in view of each monochroic unit, the extending direction of the electrodes differs among the upper, lower, left and right pixels. It is more desirable that the extending directions of the electrodes are arranged in symmetry between the neighboring pixels with respect to the extending direction of the video signal line GL or the extending direction of the gate signal line GL. Due to such a constitution, it is possible to realize the improvement of a viewing angle not only in the case of white display which performs the display using all of R, G, B but also in the case of primary color display which performs the display using only one color out of R, G, B. This implies that it is possible to realize the improvement of the viewing angle even in the display of the color other than white which is realized by combining a plurality of colors.

An advantageous effect on the improvement of the viewing angle obtained by such a constitution is explained in conjunction with FIG. 4. FIG. 4 is a view which shows the arrangement shown in FIG. 3 in an expanded manner. Symbols (A), (B) respectively correspond to, for example, the pixel (a) and the pixel (b) in FIG. 2. That is, these pixels are pixels which differ in the extending direction of the electrodes. Symbols R, G, B in the drawing indicate the correspondence with the display of the colors R, G, B.

For example, in performing the white display, the display is performed using all pixels. Accordingly, the pixels (B) are uniformly arranged outside the G(B) of the pixel (A). Accordingly, it is possible to offset the viewing angle dependency (or the directional dependency of coloring) of the pixels (A) and the viewing angle dependency of the pixels (B) and hence, the viewing angle dependency can be reduced. Particularly, when the electrode arrangement direction of the pixels (A) and the electrode arrangement direction of the pixels (B) are arranged in symmetry with respect to the gate signal line GL or the video signal line DL, it is possible to maximize the offset effect and hence, it is possible to realize the wide viewing angle which substantially eliminates the viewing angle dependency.

Next, the case in which the red (R) display is performed is considered. With respect to the pixel R(B) in the drawing, the pixels of R which are arranged closest in the upper, lower, left and right direction of the pixel R(B) are always constituted of the pixels R(A). Further, with respect to the pixel R(A) in the drawing, the pixels of R which are arranged closest in the upper, lower, left and right direction of the pixel R(A) are always constituted of the pixels R(B). That is, it becomes apparent that since only the pixels of R are used in the monochroic display of red, it is possible to improve the viewing angle also in the monochroic display of red in the same manner as the white display. In the same manner, the improvement of the viewing angle is realized also in the monochroic display of B meaning blue and in the monochroic display of G meaning green.

Further, since the colors other than the monochroic colors can be displayed as the combinations of R, G, B, it is possible to realize the improvement of viewing angle in the display of these colors. That is, it is possible to achieve the remarkable advantageous effect that the display device having the wide viewing angle can be realized irrespective of the kinds of colors.

Such a wide viewing angle is particularly preferable in the display device applicable to a large-sized TV set. Further, in the large-sized TV set which has been developed for digital broadcasting, an aspect ratio (for example, 16:9) of a screen is larger than an aspect ratio (4:3) of a conventional NTSC type TV set and hence, it is possible to ensure a large perspective angle from a viewer at the center and corner portions of a screen. Accordingly, this technique is extremely effective for realizing the enlargement of the viewing angle due to the arrangement of the group of pixels set forth in the concept of the present invention.

Further, compared to a case in which a plurality of electrode directions are provided in the inside of the single pixel, it is possible to unify the arrangement direction of electrodes in the inside of one pixel and hence, invalid regions and domain generating regions can be reduced whereby the enhancement of numerical aperture can be realized and, at the same time, the enhancement of brightness and the reduction of power consumption of the display device as a whole can be realized. Further, since a pattern in the inside of the pixel can be simplified, for example, the flow of an etching solution in performing the wet etching of fine line-like or slit-like electrodes in the inside of the pixel is unified whereby defects on etching such as the formation of residues or the disconnection can be reduced thus capable of enhancing a yield rate.

<<Arrangement Example of Polarization Transmission Axis and Initial Orientation Direction>>

When the above-mentioned liquid crystal display element is used as the display element CEL, to eventually convert the modulation of light by the liquid crystal layer to a visible state, in the transmissive-type liquid crystal display element, for example, the liquid crystal layer is arranged between two polarizers. In the liquid crystal layer, the orientation of the liquid crystal is changed by the electric field generated by the above-mentioned electrodes, for example. In a state that the voltage is not applied to the liquid crystal molecules of the liquid crystal layer, as an example, the treatment which aligns the liquid crystal molecules in one direction is performed. This treatment is called as the initial orientation treatment and the initial orientation direction ORI is set by the orientation treatment which applies rubbing to the orientation film or irradiates polarization ultraviolet rays to the orientation film.

Figure 7:
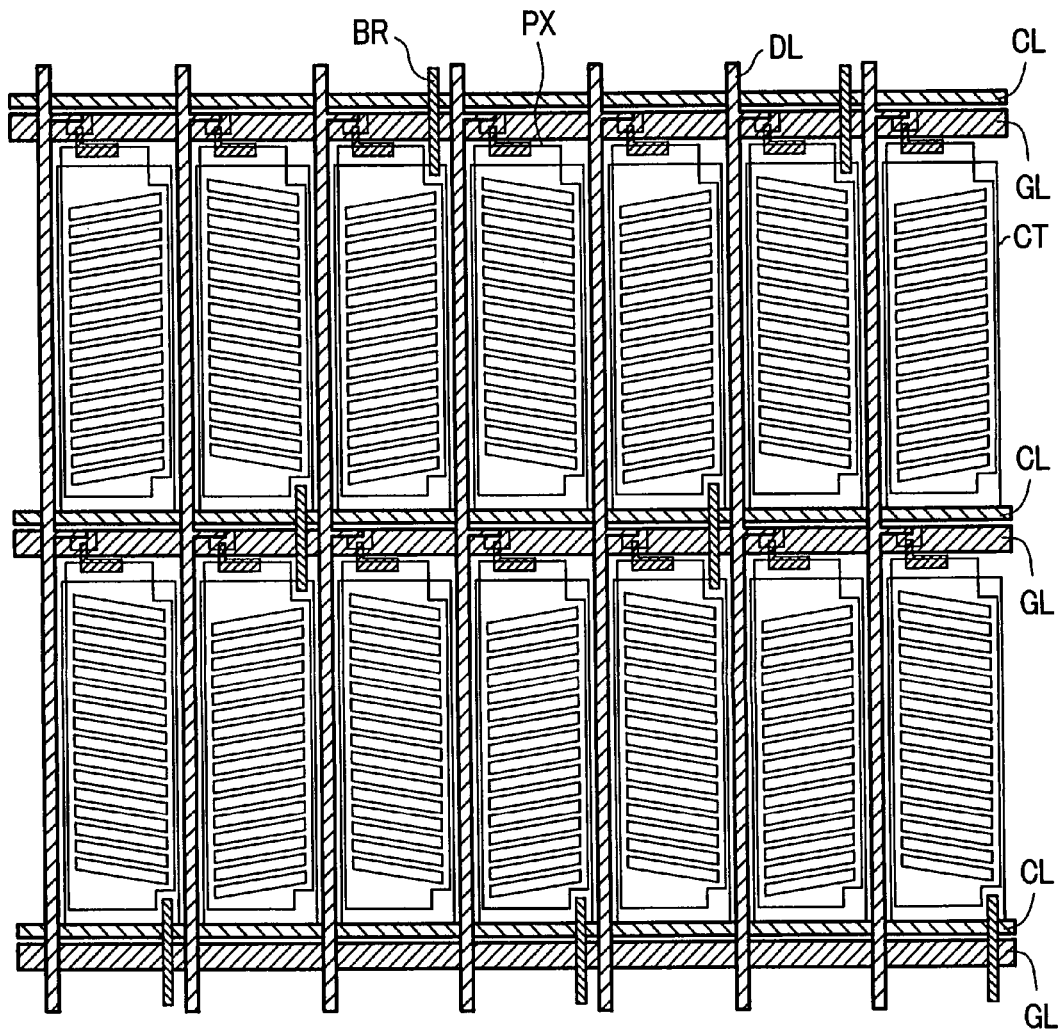
FIG. 7 is a plan view for explaining an example of a group of pixels of a display device according to the present invention.
Figure 8A:
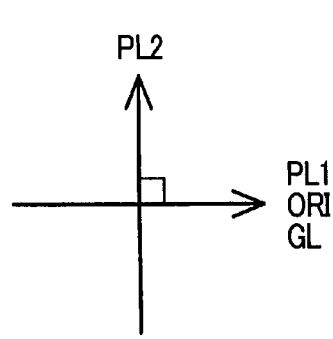
FIG. 8A and FIG. 8B are an explanatory view of an embodiment of the arrangement and the orientation direction of a polarizer.
Figure 8B:
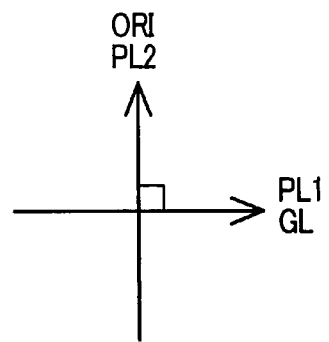

One example of the relationship between the polarization transmission axis of the polarizer and the initial orientation direction in the pixel having the line-like or slit-like pattern shown in FIG. 2 is shown in FIG. 8A and FIG. 8B. Symbol GL indicates the extending direction of the gate line, symbols PL1, PL2 indicate polarization transmission axes of one and another polarizers and these polarization transmission axes PL1, PL2 are arranged to be orthogonal from each other. The initial orientation direction ORI is arranged as shown in FIG. 8A when the liquid crystal molecules have the positive dielectric anisotropy and is arranged as shown in FIG. 8B when the liquid crystal molecules have the negative dielectric anisotropy. Accordingly, when the electric field is generated between the pixel electrode PX and the common electrode CT, it is possible to make the direction of rotation of the liquid crystal molecules opposite from each other between the pixel shown in FIG. 2A and the pixel shown in FIG. 2B whereby it is possible to constitute the display element CEL having the wide viewing angle irrespective of the color displayed when the above-mentioned arrangement is combined with the arrangement shown in any one of FIG. 1 and FIG. 3 to FIG. 7. Further, in a display mode in which the initial orientation direction becomes substantially perpendicular to the substrate, that is, in a so-called vertical orientation method, the initial orientation direction ORI becomes the perpendicular direction. In this case, the arrangement is configured such that the directions that the liquid crystal molecules are inclined assume a plurality of directions when the voltage is applied to the liquid crystal. However, also in this case, it is desirable that two polarizers are arranged to become orthogonal from each other to realize the high contrast and the wide viewing angle.

<<Supply Example of Common Voltage to Group of Pixels>>

In supplying the common voltage to the group of pixels, as shown in FIG. 1 as one example, it is possible to supply the common voltage to the group of pixels which extend in the lateral direction, for example, using the common signal line CL. However, as can be clearly understood from FIG. 1, the common signal lines CL are spaced apart from each other. By making the common potential more stable, it is possible to make the display quality stable. Further, it is also possible to reduce a line width of the common signal line CL thus realizing the further enhancement of the numerical aperture.

Figure 5:
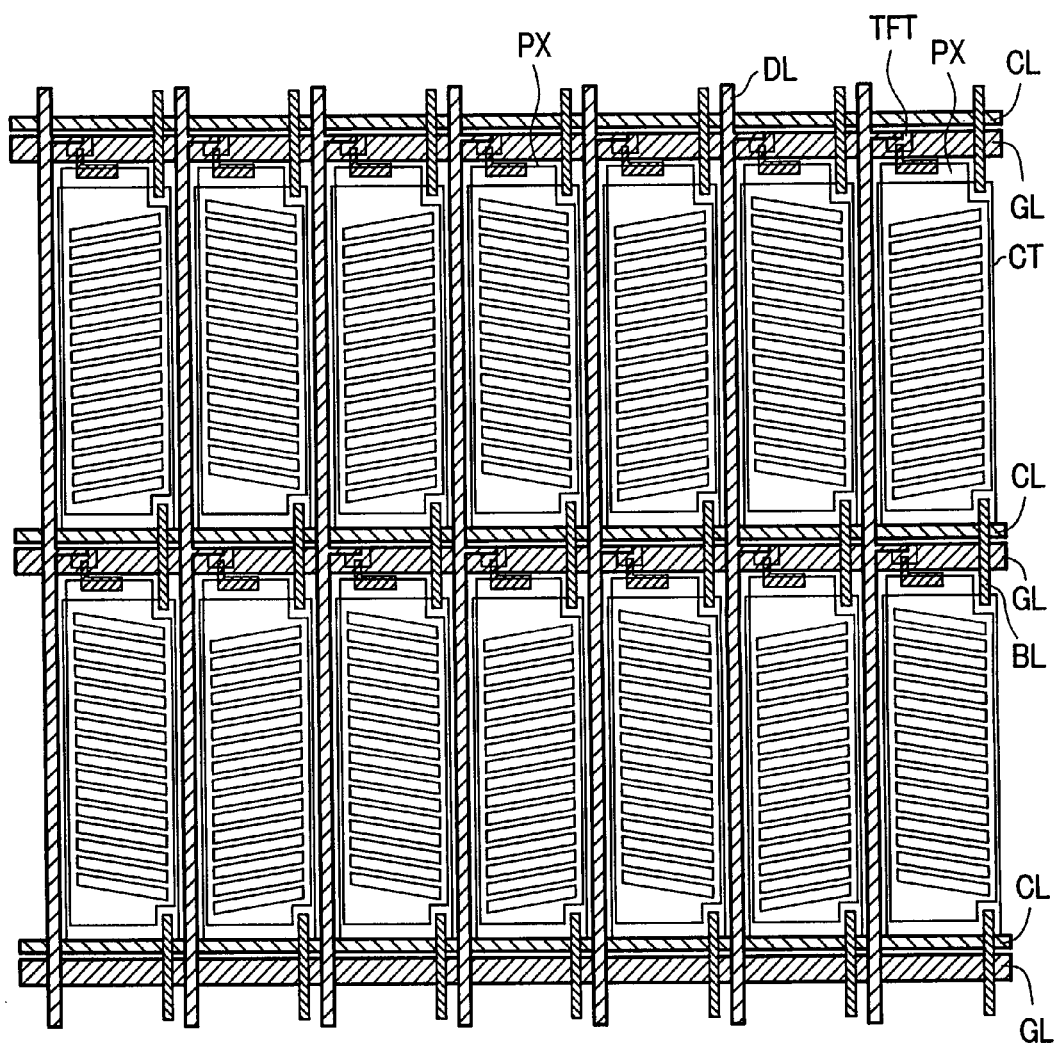
FIG. 5 is a plan view for explaining an example of a group of pixels of a display device according to the present invention.

FIG. 5 shows an example in which the common electrodes CT of the pixels which are arranged close to each other in the vertical direction are electrically connected with each other using a bridge line BR. Since the common electrodes CT of the respective pixels are connected to the common signal line CL, the common potential is supplied to the respective pixels from the upper, lower, left and right directions in a matrix array whereby the common potential can be largely stabilized.

Figure 6A:
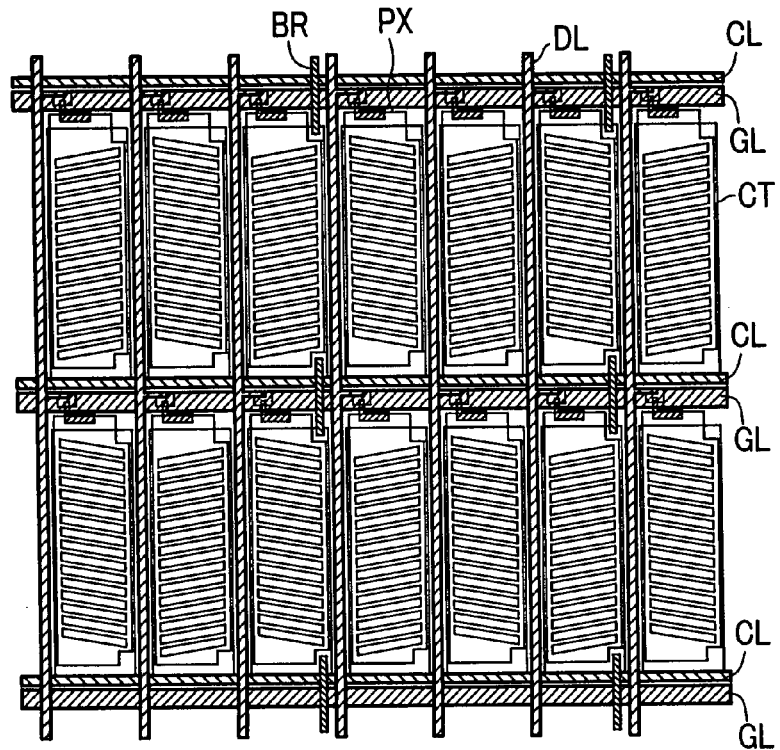
FIG. 6A and FIG. 6B are plan views for explaining an example of a group of pixels of a display device according to the present invention.

FIG. 6A shows an example in which each bridge line BR is provided for a plurality of pixels. In the drawing, one bridge line BR is allocated to three pixels. The common potential stabilization effect obtained by the bridge line BR has the feature that the brightness irregularities between the neighboring rows can be eliminated compared to the case which has no bridge line. This feature can be achieved by electrically connecting the neighboring common signal lines CL which extend in parallel. Since the connection distance is short and the frequency is large, it is unnecessary to make the bridge line BR have the low resistance comparable to the resistance of the common signal line CL. Accordingly, even when the bridge lines BR are arranged in a state that one bridge line BR is allocated to the plurality of pixels, it is possible to obtain the advantageous effect.

Figure 6B:
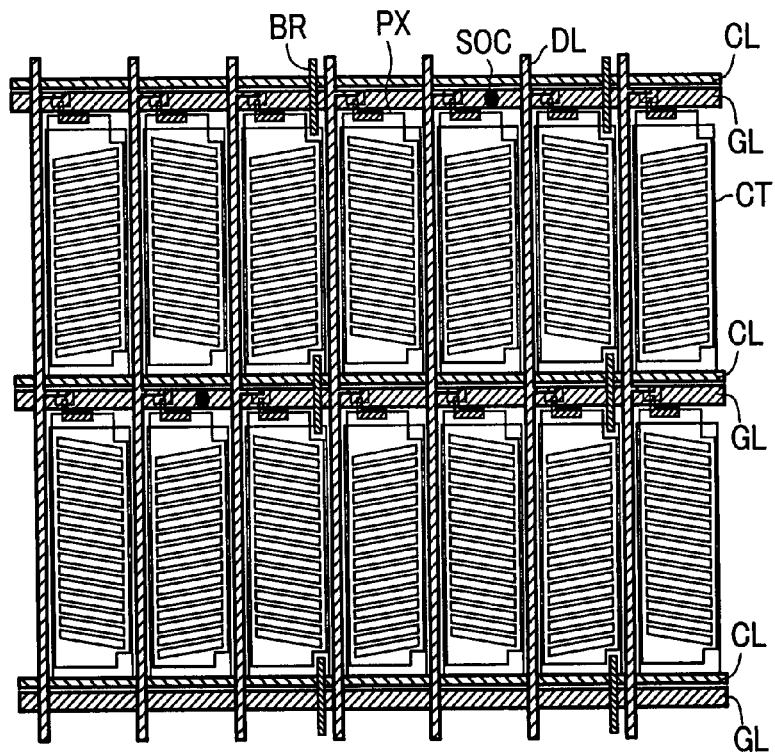

By arranging the bridge line BR in a state that one bridge line BR is allocated to the plurality of pixels, there exist the pixels which have no bridge line BR and, in these pixels, a space over the gate signal line GL becomes wider than the pixel having the bridge line BR. Accordingly, it is preferable to form the pixels as shown in FIG. 6B where support columns SOC or the like which hold the distance between two substrates of the display element CEL are arranged in the pixels.

FIG. 7 shows an example in which the pixels on which the bridge line BR is arranged are not aligned in a straight line in the longitudinal direction. Since the bridge line BR is arranged close to the video signal line DL, a parasitic capacitance is generated between the bridge line BR and the video signal line DL. When the bridge lines BR are uniformly provided to all pixels, the generation of the parasitic capacitance also becomes uniform and hence, there is no influence of the parasitic capacitance to the image quality. However, when the bridge lines BR are provided only to the group of pixels which extend in the particular longitudinal direction, the parasitic capacitance is generated only on the group of pixels and hence, there arises the difference in the parasitic capacitances of video signal lines DL. Although it is possible to design the bridge lines BR such that no influence of a level which causes a drawback in view of image quality is generated, it is needless to say that it is desirable to eliminate such a possibility in principle. Accordingly, by arranging the bridge lines BR as shown in FIG. 7, the generation of the parasitic capacitance is diffused so as to eliminate the possibility of the influence to the image quality.

<<Detailed Example of Pixel>>

Figure 9:
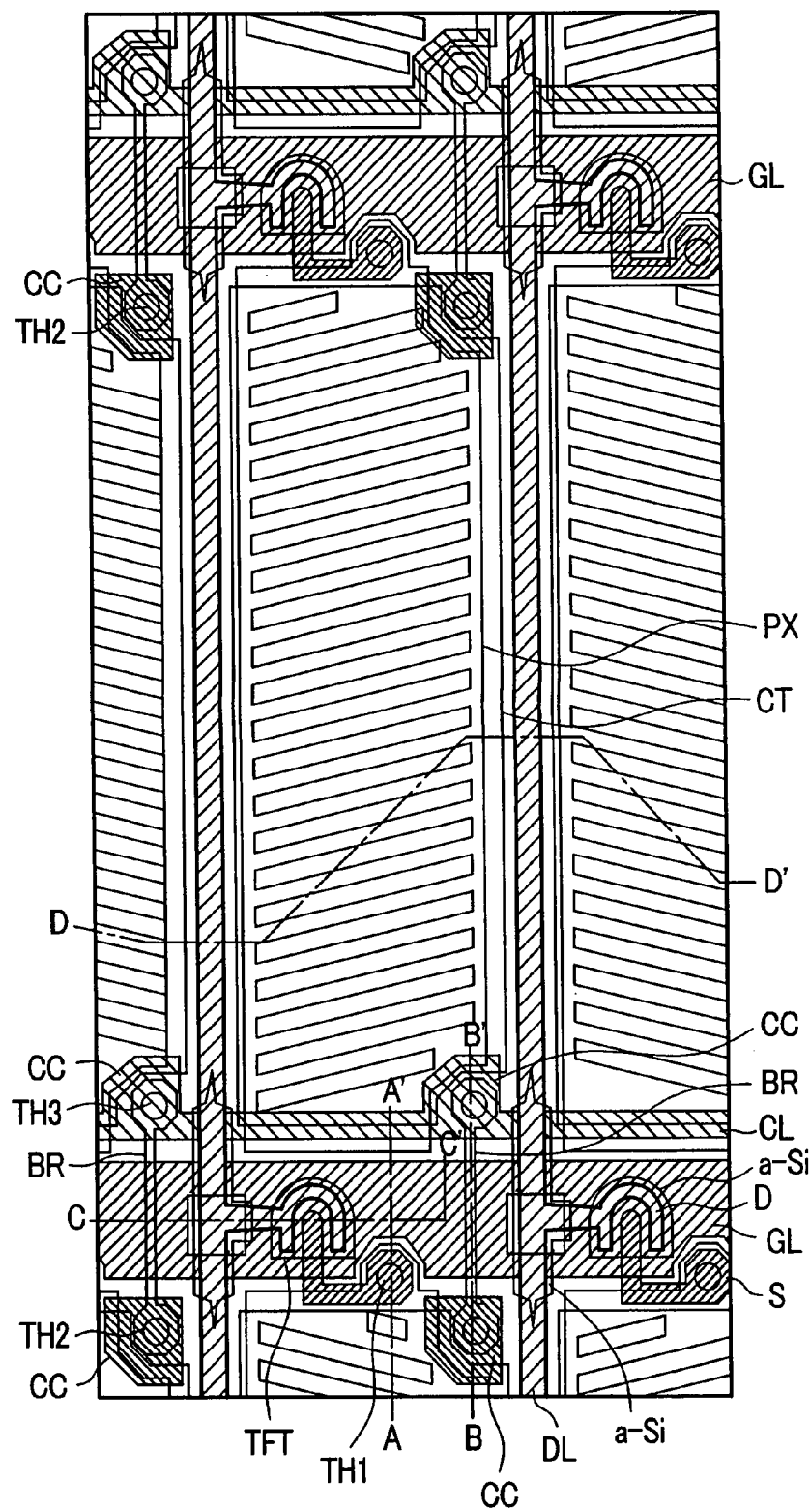
FIG. 9 is an explanatory view of one example of the detailed structure of the pixel of the display device according to the present invention.

FIG. 9 shows one example of the detailed structure of the pixel which is preferably used in the display element CEL. Hereinafter, a large number of features which this pixel possesses are explained sequentially.

<<TFT Portion>>

Features of the TFT portion shown in FIG. 9 are explained. The video signal line DL is connected with the drain electrode D of the switching element TFT. The drain electrode D is formed in a shape which surrounds the source electrode S in a semicircular manner. Further, there is provided a semiconductor layer a-Si which has an end portion thereof arranged further outside the drain electrode D and is formed in a semicircular shape. By controlling the turning ON/OFF of the semiconductor layer a-Si by the gate signal line GL, the conduction/interruption between the drain electrode D and the source electrode S can be controlled. By forming the drain electrode D in a semicircular shape which surrounds the source electrode S, it is possible to increase a channel width thus improving the writing characteristics of the TFT. Further, by also forming a distal end portion of the source electrode S into a semicircular shape, it is possible to prevent the channel length from becoming non-uniform and, at the same time, it is possible to prevent the deterioration of the reliability attributed to the concentration of electric field.

The video signal line DL is connected with the drain electrode D using a connecting member which is integrally formed with the drain electrode D. In connecting the video signal line DL, the connecting member has a large width at a connecting portion thereof with the video signal line DL and a narrow width at a connecting portion thereof with the drain electrode D. Further, a hole is formed in the gate signal line GL in the vicinity of the connecting portion and the video signal line DL is configured not to be overlapped with the gate signal line GL in the vicinity of the connecting portion. Due to such a constitution, it is possible to achieve the prevention of the disconnection of the connecting portion and the reduction of the crossing capacitance whereby the parasitic capacitance of the video signal line DL can be reduced. Further, since the connecting member gets over the gate signal line GL with an angle, that is, since the connecting member gets over the gate signal line GL in a non-perpendicular manner, the possibility of disconnection can be reduced.

<<<Pixel Electrode Connecting Portion>>>

The source electrode S of the switching element TFT in the pixel shown in FIG. 9 once gets over the gate signal line GL and extends and, thereafter, is bent in the direction parallel to the gate signal line GL and, subsequently, is bent and extends in the direction of the gate signal line GL and forms a connecting region. The gate signal line GL is formed in a state that the gate signal line GL is recessed in the connecting region portion, that is, in a state that a line width thereof is narrowed thus ensuring the connecting region. The source electrode S and the pixel electrode PX are electrically connected with each other via a through hole TH1 formed in the connecting region. The reason that the connecting region is arranged in a state that the connecting region intrudes toward the gate signal line GL side is to ensure the numerical aperture. Further, the resistance of the line becomes dominant at a narrowest portion of the line. In the constitution shown in FIG. 9, the gate signal line GL has a hole at an intersecting portion thereof with the video signal line DL and is formed into two portions which have a narrow line width and these two portions are merged again to form the bold line. This branching of the gate signal line GL into two portions is, when the short-circuiting is generated between the gate signal line GL and the video signal line DL, to enable the correction of the short-circuiting by separating the branched portion where the short-circuiting is generated. Since the total line width of the gate signal line GL is narrow at this portion, with respect to the resistance of the gate signal line GL, the value becomes dominant at the portion having this width. Accordingly, by forming the connecting portion with the pixel electrode PX in a state that the connecting portion intrudes toward the gate signal line GL side, the enhancement of numeral aperture is realized and, at the same time, the substantial increase of the resistance value of the gate signal line GL attributed to the intrusion of the connecting portion can be restricted to a trivial value. Further, the gate signal line GL is configured to have a large width at the portion where the TFT is formed than the portion where the gate signal line GL crosses the video signal line DL or the vicinity of the connecting portion with the pixel electrode PX. Accordingly, it is possible to ensure the large channel width of the TFT and hence, the display device which exhibits the high yield rate and the high image quality can be realized.

<<<Common Signal Line and Common Electrode>>>

In the pixel shown in FIG. 9, the common signal line CL extends in parallel with the gate signal line GL. The common signal line CL is formed of a metal material on the same layer as the gate signal line GL as an example. The common signal line CL is connected with the common electrode CT. Here, in the application of the present invention to a reflective-type display device, for example, the common electrode CT may be formed integrally with the common signal line CL using the same material. However, when the common electrode CT adopts the planar constitution as shown in FIG. 9, to use the display element CEL in the transmission display, it is necessary to use the common electrode CT formed of a transparent electrode. Accordingly, the electrical connection between the common electrode CT and the common signal line CL is constituted as the connection of different layers. Since the common electrode CT and the common signal line CL constitute the different layers, in performing the connection, there arises a phenomenon that one layer gets over another layer and a disconnection may occur at the get-over portion. Accordingly, the prevention of such a disconnection becomes important for ensuring a yield rate.

Figure 12A:
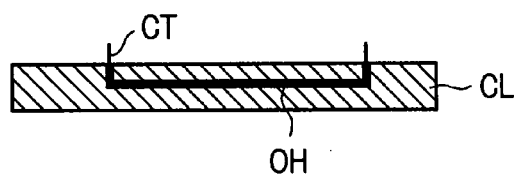
FIG. 12A and FIG. 12B are views for explaining the getting-over at an overlapped portion of an electrode and a line.
Figure 12B:
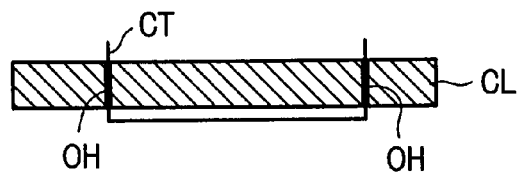

FIG. 12A and FIG. 12B show an example of a case in which the common signal line CL is formed above the common electrode CT and the common signal line CL directly gets over the common electrode CT. In the constitution shown in FIG. 12B, when the common signal line CL gets over the common electrode CT, the get-over portions OH are formed on both sides of the common electrode CT. These get-over portions OH are extremely thin having the same width with the common signal line CL as can be understood from the drawing. When the disconnection occurs also on either one of these get-over portions OH, the common electrode CT cause a line defect. Accordingly, this example provides the structure which largely influences the yield rate.

FIG. 12A shows the improved structure, wherein end portions or end sides of the common electrode CT are arranged to fall within the width of the common signal line CL. In other words, the common electrode CT is arranged such that the end portions thereof are arrange to be positioned in the midst of the common signal line CL in the widthwise direction. Accordingly, it is possible to ensure a region where the common signal line CL extends without being overlapped to the common electrode CT and hence, it is possible to set the possibility of occurrence of complete disconnection at an extremely low level. Further, it is possible to prolong an extension length of the end sides of the common electrode CT on the common signal line CL and hence, even when the disconnection occurs by a chance, it is possible to supply the common potential to the common electrode CT from the common signal line CL through other portion. Accordingly, it is possible to ensure the highly reliable connection having redundancy and hence, the high-quality display device can be realized with a high yield rate.

<<<Connection of Common Potential of Upper and Lower Pixels>>>

By electrically connecting the common potentials of the neighboring upper and lower pixels, the common potentials are made stable. In FIG. 9, the electrical connection is established using the bridge line BR.

In FIG. 9, the common signal line CL includes a projecting portion or a large-width portion at a portion thereof. This portion constitutes a common potential connecting portion CC of upper and lower pixels to which the common potential is supplied from the common signal line CL. The bridge line BR is connected to the common potential connecting portion CC via a through hole TH2. The bridge line BR is arranged over the gate signal line GL in a spaced-apart manner by way of at least the gate insulation film GI, traverses the gate signal line GL and extends to another neighboring pixel. In another pixels which are arranged close to the pixel in the vertical direction, a different island-like common potential connecting portion CC is formed. The common potential connecting portion CC is formed of the same metal as the common signal line CL, for example, and has at least a portion thereof overlapped to the common electrode CT. The bridge line BR is connected with this island-like common potential connecting portion CC by way of the through hole TH2. Accordingly, it is possible to establish the electric connection of the common potentials of the neighboring pixels in the vertical direction.

The different island-like common potential connecting portion CC may, in the structure which forms the common signal line CL on the portion, be integrally formed with the common signal line CL. However, by supplying the matrix-like common potentials using the bride line BR, a demand for the line resistance of the common signal line CL is reduced and hence, by forming the common signal line CL only on one end side of the pixel, it is possible to increase the numerical aperture correspondingly.

Further, even when the bridge line BR is directly connected to the common electrode CT without through the common potential connecting portion CC, it is possible to achieve the matrix power supply with respect to the electrical connection. However, to take the yield rate and the image quality into consideration, it is more preferable to establish the electric connection via the common potential connecting portion CC.

That is, since the connection is performed via the through hole, a layer thickness of the liquid crystal layer differs in the vicinity of the through hole and hence, there may be formed a region where leaking of light occurs due to a reason that the orientation treatment is not performed sufficiently whereby the image quality is liable to be easily lowered. Accordingly, by forming the common potential connecting portion CC using a metal material which generally possesses the light blocking property, it is possible to achieve the light blocking of the through hole portion. It is needless to say that, in the reflective-type structure or the like in which the common electrode CT is made of a metal material, the common electrode CT also serves as the common potential connecting portion CC.

Further, the connection at the common potential connecting portion CC is established by connecting the bridge line BR to the through hole. That is, the bridge line BR is patterned by etching. When the display device is normally manufactured, the material and the connection structure of the bridge line BR and the common electrode CT do not influence the yield rate. However, in performing the patterning by exposing the bridge line BR, there exists a step in which a photo resist is formed in a same shape as the bridge line BR, the etching is performed using the photo resist as a mask, and an extra portion around the bridge line BR is removed. Since the bridge line BR is formed as an isolated thin pattern, the bridge line BR is formed in a pattern with which the photo resist which constitutes a mask during etching is extremely easily peeled off. Further, when the photo resist is peeled off, the bridge line BR of the through hole portion is removed by etching and, at the same time, the lines and the electrodes arranged below the through hole portion are directly exposed to the etching. Here, assuming that the lines or pattern below the through hole portion are made of the same material as the bridge line BR, the pattern below the through hole portion are etched. When the bridge line BR is made of the same material such as ITO, SnO or the like as the transparent electrode or the common potential connecting portion CC as an example, the transparent electrode of the common potential connecting portion CC is remarkably etched in the horizontal direction thus arising the possibility that a defect occurs in an image display region in the inside of the pixel. Assuming that the common signal line CL is also made of the same material, this defect may lead to the disconnection of the common signal line CL. This becomes a cause of lowering the yield rate. Accordingly, by providing the common potential connecting portion CC which is made of the material different from the material of the bridge line BR, even when a defect occurs by a chance during the step for forming the bridge line BR, it is possible to obviate the occurrence of the display defect of the pixel. This is because that when the defect occurs only on the bridge line BR, so long as one connection is allocated to the plurality of pixels, it is still possible to maintain the bridge connection effect and hence, it is possible to obtain only the image quality improvement effect attributed to the bridge line BR.

Further, by arranging the common electrode CT such that the common electrode CT is brought into contact with the lower portion of the common potential connecting portion CC, even when the common electrode CT and the bridge line BR are made of the same type of material, it is possible to provide a protective region at the time of etching using the common potential connecting portion CC made of different material in a wide range whereby the possibility of deteriorating the yield rate can be fundamentally eliminated.

Further, the bridge line BR traverses the gate signal line GL and hence, the bridge line BR forms the parasitic capacitance with gate signal line GL. To reduce this parasitic capacitance, it is desirable to use a conductive layer remotest from the gate signal line GL as the bridge line BR.

In total, it is desirable that the bridge line BR is formed of the transparent electrode made of a material such as ITO, SnO, ITZO, IZO, ZnO or the like formed on the protective film PAS and the common potential connecting portion CC is made of the same metal material as the common signal line CL.

Further, in the example shown in FIG. 9, the common electrode CT is constituted of a planar electrode and is formed of a transparent electrode made of a material such as ITO, SnO, ITZO, IZO, ZnO or the like. Accordingly, it is desirable that the common electrode CT is connected to the common potential connecting portion CC from below the common potential connecting portion CC. Here, when both of the common electrode CT and the bridge line BR are formed of the transparent electrode, it is preferable to use the same transparent electrode material such as ITO, for example, from a viewpoint of the common use of a film forming device and an etching device in the manufacturing steps.

Further, in the constitution shown in FIG. 9, the pixel electrode PX is positioned above the common electrode CT and includes a large number of fine line-like-like portions or slit-like portions. When the display element is used as the element for transmissive display, it is also preferable that the pixel electrode PX is also formed of the same transparent electrode material. By forming the pixel electrode PX on the same layer as the bridge line BR, it is possible to obviate the increase of the number of layers of the layer structure and hence, the number of steps can be obviated.

In FIG. 9, one end of the pixel electrode PX is arranged to be overlapped to the common potential connecting portion CC. In the common potential connecting portion CC, the bridge line BR to which the common potential is applied is formed on the same layer as the pixel electrode PX and constitutes a singular point in the display device which performs the display using the electric field generated between the potential of the pixel electrode PX and the common potential. Since the direction of the electric field differs from the originally intended direction, this becomes a cause of the deterioration of the image quality. Accordingly, by overlapping this region on the common potential connecting portion CC having the light blocking property, the influence is eliminated. Further, for that end, a shape of an end side of the common potential connecting portion CC and a shape of an end side of the pixel electrode PX have the similar shapes in a region where the common potential connecting portion CC and the pixel electrode PX are overlapped to each other.

Here, the common potential connecting portion CC is formed in a shape where the pixel-electrode-PX-side corner portions thereof are cut. This provision is made to eliminate the undesired light blocking region thus enhancing the numerical aperture. In this case, as shown in FIG. 9, the pixel electrode PX and the common potential connecting portion CC are configured to be overlapped to each other at three sides which are unparallel to each other and the pixel electrode PX and the common potential connecting portion CC, that is, the light blocking layers extend in parallel.

Here, by forming the vicinity of the connecting portion of the bridge line BR in the same manner, it is possible to minimize the required light blocking region.

In this region, the distance between the pixel electrode PX and the bridge line BR as viewed in parallel is set longer than the distance between the bridge line BR and the common electrode CT as viewed in parallel. This provision is made to obviate the short-circuiting attributed to the constitution that the pixel electrode PX and the bridge line BR are formed on the same layer and, at the same time, to sufficiently ensure the contact surface area between the common electrode CT and the common potential connecting portion CC.

<<<Arrangement of Group of Pixels>>>

The pixel electrode PX shown in FIG. 9 is configured such that a large number of slits extend in one direction and the direction differs among the pixels which are arranged close to each other in the upper, lower, left and right directions. Due to such a constitution, it is possible to enlarge the viewing angle irrespective of the kind of color. Here, this arrangement of the group of pixels relates to the viewing angle enlarging effect and even with respect to a case in which a plurality of directions exist in the inside of one pixel or a case in which the same direction is given in all pixels, these cases can obtain other advantageous effects attributed to other disclosed constitutions.

Figure 10:
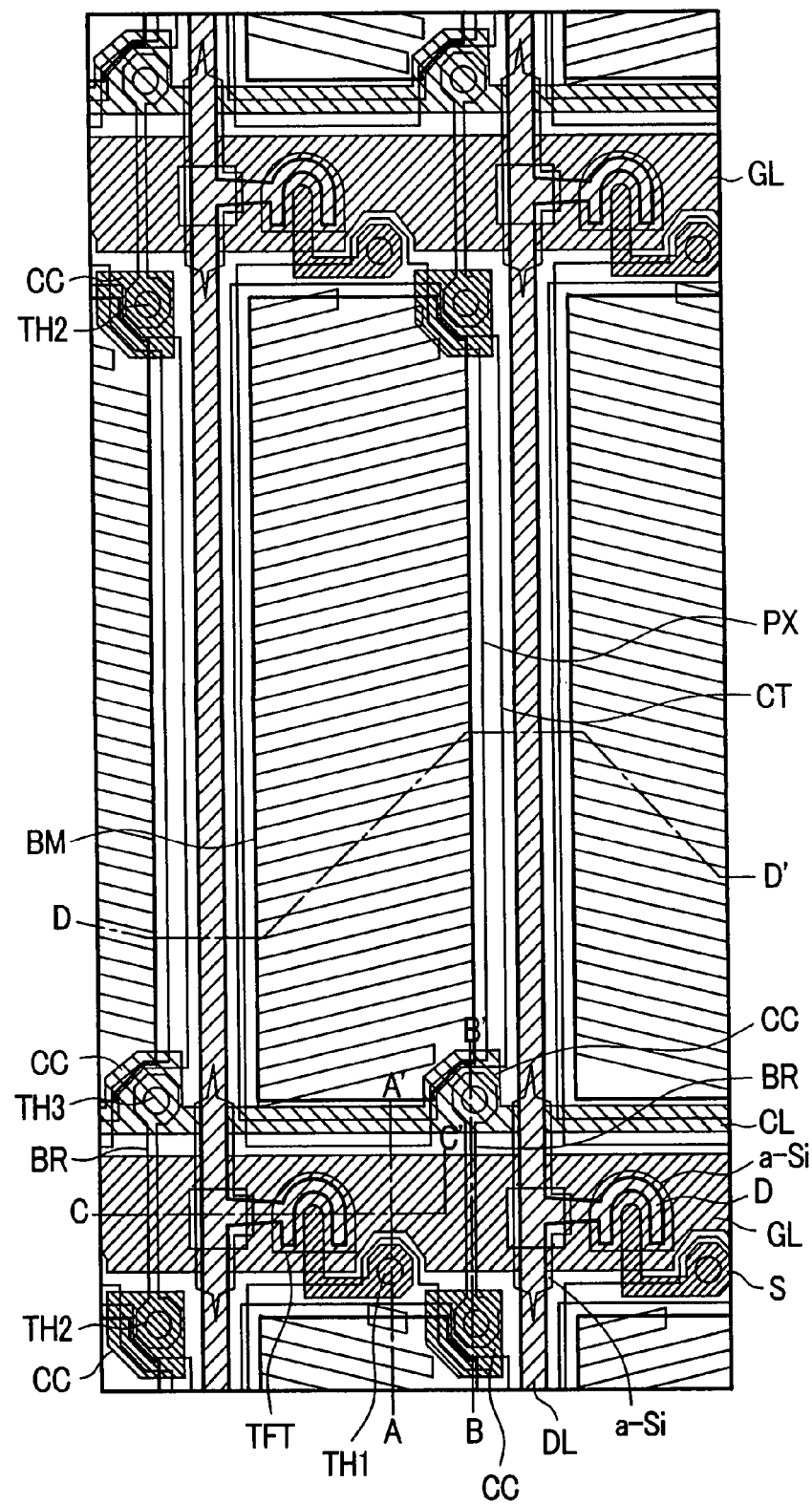
FIG. 10 is a an explanatory view of one example of the detailed structure of the pixel of the display device according to the present invention.

Further, the color filters CF are, as an example, are arranged such that, as shown in FIG. 3, wherein the color filters CF are common in the longitudinal direction and the color filters of colors R, G, B are arranged in the lateral direction. In arranging the color filters CF, it is desirable to form the black matrix BM as a partition between the color filters CF and a light blocking layer for enhancing a contrast ratio due to the light shielding of undesired regions. FIG. 10 shows an example of a case in which a black matrix BM is formed with respect to a pattern shown in FIG. 9. The black matrix BM is formed in principle such that the end portions of the black matrix BM falls within the inside of the region where the pixel electrode PX is formed. However, since the common potential connecting portion CC functions as a light blocking layer in the portion of the common potential connecting portion CC, it may be possible to form a boundary in a region which exceeds the pixel electrode PX.

<<<Cross-Sectional Structure>>>

The cross-sectional structure of an essential part of the pixel shown in FIG. 9 or FIG. 10 is sequentially explained.

Figure 11:
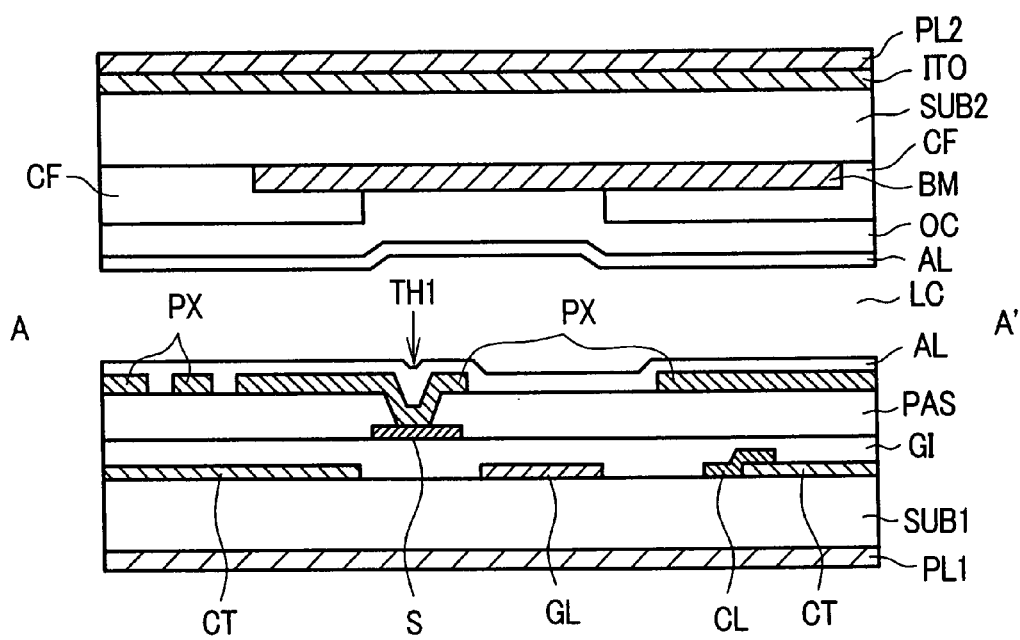
FIG. 11 is a schematic cross-sectional view of an A-A' portion in FIG. 9 or FIG. 10.

FIG. 11 shows the cross-sectional structure of a A-A' portion shown in FIG. 9 or FIG. 10. On the first substrate SUB1, the common electrode CT is formed as the lowermost layer. As an example, the common electrode CT is formed of a transparent electrode, for example, made of ITO. The gate signal line GL and the common signal line CL are made of metal. The gate signal line GL extends between the regions where the common electrode CT is formed. The common signal line CL has a portion thereof formed in a state that the portion gets over the common electrode CT and supplies the common potential to the common electrode CT. Further, since common signal line CL is arranged such that the whole thereof does not get over the common electrode CT, the disconnection of the common signal line CL is obviated. The gate insulation film GI is formed in a state that the gate insulation film GI covers the common electrode CT, the common signal line CL and the gate signal line GL. On the gate insulation film GI, a metal layer S which is extended from the source electrode S of the switching element TFT is arranged and this extended portion constitutes a connecting portion with the pixel electrode PX. For this end, the gate signal line GL on the A-A' cross section has a small line width. The protective film PAS is formed on the source electrode S. The pixel electrode PX is formed of the transparent electrode, for example, ITO in the same manner as the common electrode and is arranged on the protective film PAS. The pixel electrode PX and the source electrode S are connected with each other via the through hole TH1 formed in the protective film PAS, while the video signal which is supplied from the video signal line DL is supplied to the pixel electrode PX through the switching element TFT. The orientation film AL is formed on the pixel electrode PX and the initial orientation treatment is applied to the orientation film AL on demand. On a back surface of the substrate SUB1, the first polarizer PL1 is formed.

The second substrate SUB2 is arranged to face the first substrate SUB1 in an opposed manner. Black matrixes BM which block the undesired leaking of light are formed on the second substrate SUB2. Color filters CF are formed in a state that end portions thereof are overlapped to the black matrixes BM. Although two color filters CF are shown in a spaced apart manner in the drawing, since the color of the color filters CF in the A-A' cross-sectional direction is equal, the color filters CF may be integrally formed. The overcoat film OC is formed in a state that the overcoat film OC covers the color filters CF and the black matrixes BM. An orientation film AL is formed on the overcoat film OC. On a back surface side of the second substrate SUB2, the second polarizer PL2 is formed. A conductive layer such as ITO may be formed between the second substrate SUB2 and the second polarizer PL2 on demand. This is because that such a constitution brings about an advantageous effect of blocking a leaked electric field and of reducing EMI. Further, it is also possible to prevent the undesired static electricity from influencing the display of the liquid crystal layer.

The liquid crystal layer LC is formed between the substrate SUB1 and the substrate SUB2. An electric field is generated by applying a voltage difference between the pixel electrode PX and the common electrode CT and the orientation of the liquid crystal molecules of the liquid crystal layer LC is changed from the initial orientation direction by the electric field thus controlling the visible display image.

The initial orientation direction ORI imparted by the orientation films AL of the substrate SUB1 and the substrate SUB2 is parallel to the substrate SUB1 and the substrate SUB2, wherein the relationship which the initial orientation direction ORI makes with the polarization transmission axes of the polarizers PL1, PL2 assumes the relationship which is explained in conjunction with FIG. 8 as one example. Due to such a constitution, it is possible to realize the normally black characteristics in which the display exhibits black when the voltage is not applied and the brightness is increased along with the applying of the voltage.

Figure 13:
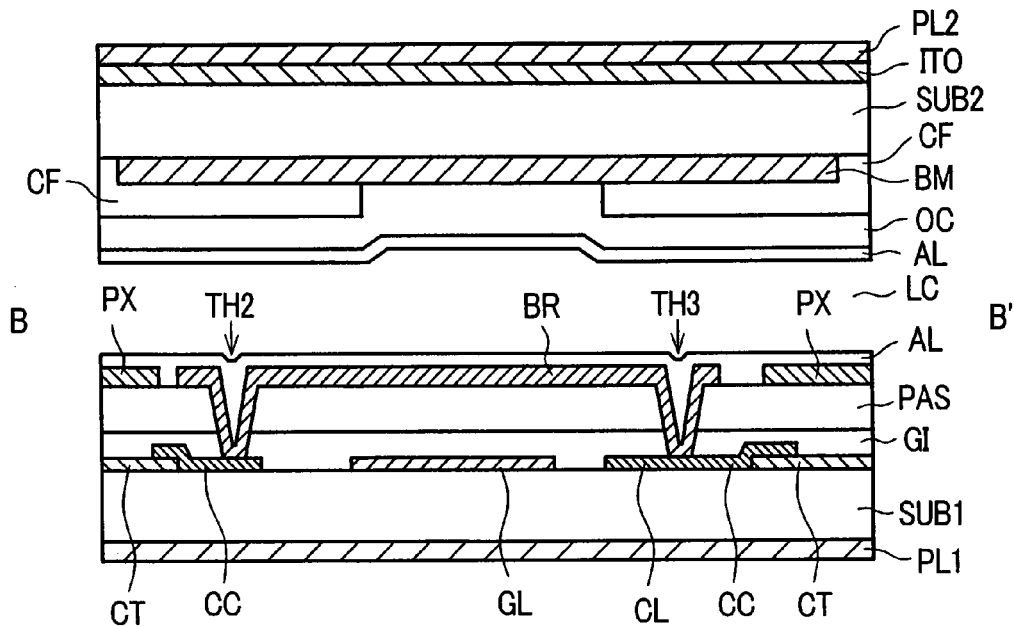
FIG. 13 is a schematic cross-sectional view of a B-B' portion in FIG. 9 or FIG. 10.

FIG. 13 is the cross-sectional structure taken along a line B-B' in FIG. 9 or FIG. 10. On the protective film PAS, the bridge line BR which is formed of the transparent electrode, for example, ITO is formed on the same layer as the pixel electrode PX. The bridge line BR electrically connects the common electrodes CT of the pixels arranged close to each other in the upper and lower directions. The pixel which corresponds to the lower pixel shown in FIG. 9 or FIG. 10 corresponds to the left-side pixel region in FIG. 13. The common potential connecting portion CC in the region is overlapped to the common electrode CT from above the common electrode CT and is electrically connected with the common electrode CT. The common potential connecting portion CC is formed of the same metal layer as the gate signal line GL. The common potential connecting portion CC is connected with the bridge line BR via the through hole TH2. Here, the bridge line BR and the common electrode CT are not directly connected with each other and the common potential connecting portion CC made of the metal material is interposed between them thus realizing the enhancement of the above-mentioned yield rate. The bridge line BR traverses the gate signal line GL by way of the gate insulation film GI and the protective film PAS. By making these traversing lines spaced apart from each other as much as possible, it is possible to suppress the parasitic capacitance. The bridge line BR which traverses the gate signal line GL is connected with another common potential connecting portion CC via the through hole TH3. The common potential connecting portion CC is integrally formed with the common signal line CL. Further, by connecting the common electrode CT as the lower layer, the electric connection between the pixels is established.

Figure 14:
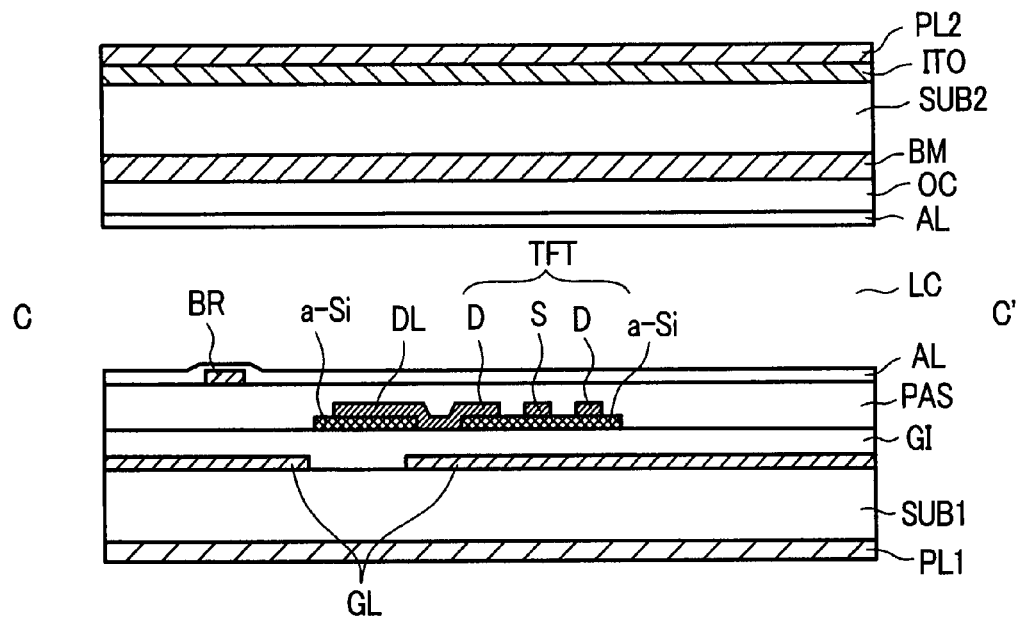
FIG. 14 is a schematic cross-sectional view of a C-C' portion in FIG. 9 or FIG. 10.

FIG. 14 is the cross-sectional structure taken along a line C-C' in FIG. 9 or FIG. 10. This drawing particularly relates to the explanation of the structure of the switching element TFT portion. In the region, the blocking of light of the switching element TFT is necessary and hence, the black matrixes BM which constitute the light blocking layer are formed over the whole region of the substrate SUB2. The gate signal lines GL formed on the substrate SUB1 are, since hole portions are formed in the gate signal lines GL to perform the above-mentioned correction, arranged in a spaced apart manner in FIG. 14. Although the video signal line DL extends in the hole portion, to reduce the possibility of disconnection of the video signal line DL at the time of getting over the gate signal line GL before and after the hole portion, the semiconductor layer a-Si is formed below the video signal line DL. The connecting portion extends toward the gate signal line GL from the video signal line DL and is connected to the drain electrode D of the switching element TFT. The source electrode S is sandwiched by the drain electrodes D from both sides and the semiconductor layer a-Si is formed between these two drain electrodes D thus forming the channel region of the switching element TFT. Here, usually, a high-concentration doped layer $n^+$ is formed on an upper surface of the semiconductor layer, wherein the high-concentration doped layer $n^+$ remains between the drain electrode D, the source electrode S and the semiconductor layer a-Si and is removed in the channel region between the drain electrode D and the source electrode S thus enhancing the characteristics of the switching element TFT. However, the constitution is omitted from the drawing.

Figure 15:
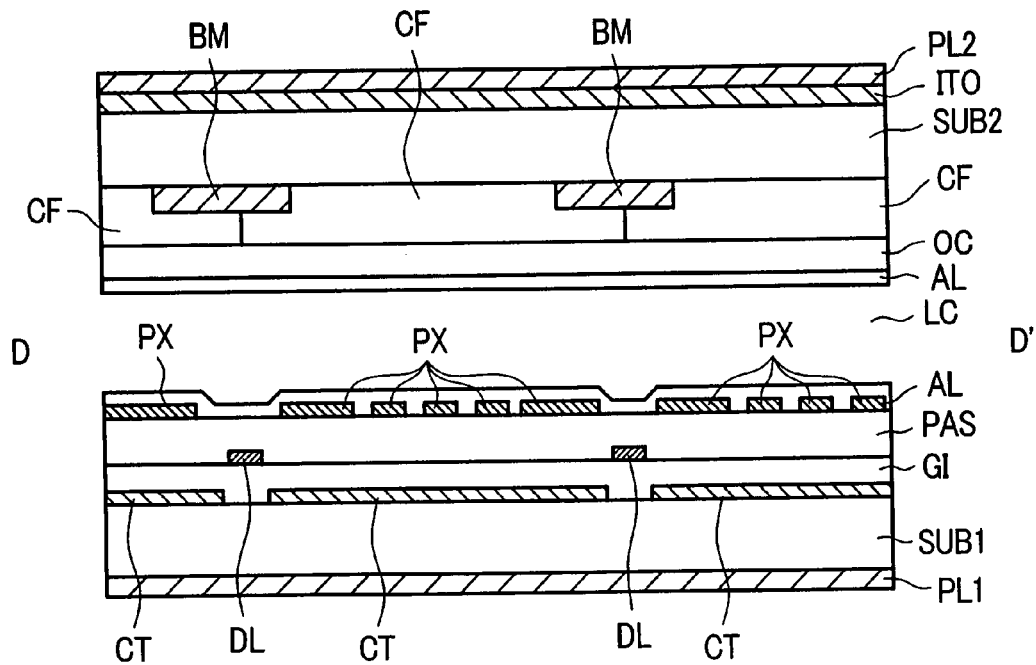
FIG. 15 is a schematic cross-sectional view of a D-D' portion in FIG. 9 or FIG. 10.

FIG. 15 is the cross-sectional structure taken along a line D-D' in FIG. 9 or FIG. 10. The black matrix BM is arranged between the pixels which are arranged close to each other in the lateral direction thus interrupting the undesired leaking of light. The color filters CF which are arranged close to each other in the lateral direction differ in color from each other and hence, the color filters CF exhibit the different colors from each other. In each pixel, the common electrode CT is formed in a planar shape and is formed of the transparent electrode such as ITO, for example, in case of the transmissive-type display element. When the common electrode CT is used for the reflective-type display element, the metal layer is used as the common electrode CT. The pixel electrode PX is formed on the protective film PAS and is formed of the transparent electrode such as ITO, for example, in case of the display element for transmissive display. Since the pixel electrode PX is directly formed below the orientation film, even in the display element CEL for reflective-type display, the pixel electrode PX is preferably made of the transparent electrode from a viewpoint of enhancing the reliability.

The pixel electrode PX includes a large number of line-like portions, wherein portions between the line-like portions form regions which expose the common electrode CT between the pixel electrodes PX. Accordingly, a route which terminates the electric field from the pixel electrode PX at the common electrode CT is formed and, by driving the liquid crystal molecules of the liquid crystal layer LC by the electric field, the image display can be achieved. When both of the pixel electrode PX and the common electrode CT are formed of the transparent electrode for transmissive display, the substantially whole display region becomes transparent and hence, it is possible to realize the highly bright display device which exhibits the high optical transmissivity.

Further, since the directions of the electrodes can be controlled by the directions of the line-like portions or the slit portions formed in the upper electrodes such as the pixel electrodes PX, even when the gate signal lines GL and the video signal lines DL are arranged orthogonally, it is possible to freely set the directions of the electrodes without hardly influencing the numerical aperture.

<<Another Example of Detailed Example of Pixel>>

In FIG. 9, one example of the detailed structure of the pixel which is preferably applicable to the display element CEL is shown. The constitution and the advantageous effects explained in <<<TFT portion>>>, the constitution and the advantageous effects explained in <<<pixel electrode connecting portion>>>, the constitution and the advantageous effects explained in <<<common signal line and common electrode>>>, and the constitution and the advantageous effects explained in <<<Connection of common potentials of upper and lower pixels>>> can be obtained by pixels having other various planar constitutions. One example of these pixels is explained.

Figure 62:
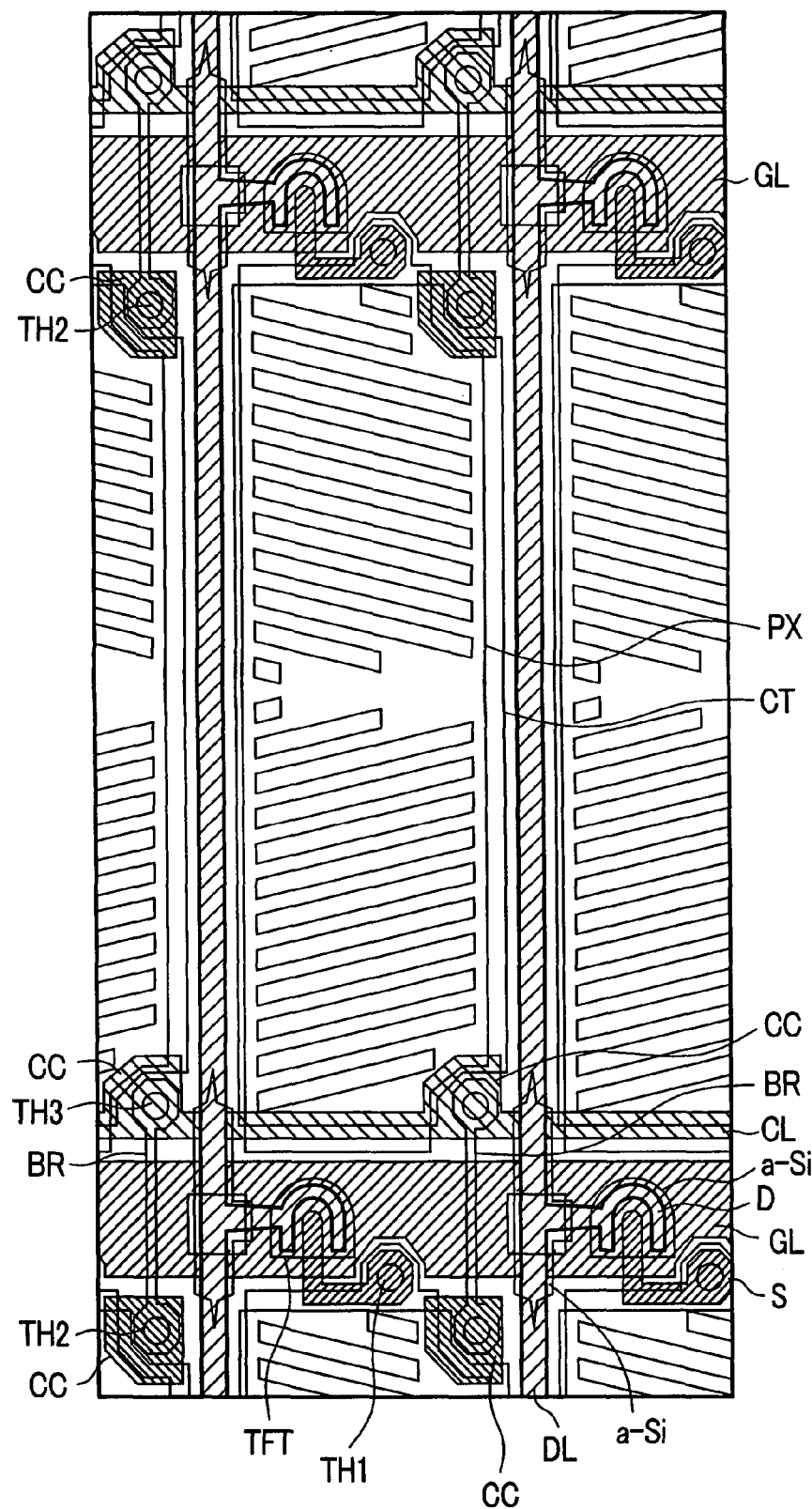
FIG. 62 is an explanatory view of one example of the detailed structure of the pixel of the display device according to the present invention.

FIG. 62 is a view which corresponds to FIG. 9 and shows the planar constitution of the pixel. The largest point which makes the constitution shown in FIG. 62 different from the constitution shown in FIG. 9 lies in that the arrangement of slits formed in the pixel electrode PX is common with respect to respective pixels. In FIG. 62, the direction of the slits in the pixel electrodes PX differs between an upper region of the pixel and a lower region of the pixel. That is, the slits are arranged downwardly as the slits extend toward one side surface of the pixel in the upper region, while the slits are arranged upwardly as the slits extend toward one side surface of the pixel in the lower region. That is, the slits are arranged in the direction that the slits are converged to the center of the pixel. Due to such a constitution, the correction of the viewing angle can be performed in the inside of one pixel.

Different from the constitution shown in FIG. 9, in the constitution shown in FIG. 62, there exist regions where the directions of the slits differs, that is, the upper region and the lower region in the inside of one pixel and hence, the use efficiency of the pixel is lowered at the center region which constitutes a boundary between two regions. Accordingly, the numerical aperture is slightly reduced. However, in the display device which is used as a screen of a PC monitor or the Internet, there may be a case that the constitution shown in FIG. 62 which always realizes the correction of the viewing angle with respect to any images is suitable. It is possible to select either one of the above-mentioned constitution shown in FIG. 62 and the constitution which maximizes the brightness in FIG. 9 and is particularly suitable for display of natural scene such as the TV set depending on the usage or application and there may be a case that the constitution shown in FIG. 62 is suitable. In this case, in the image of the PC monitor or the Internet, there is no continuity in the information which is observed in the natural scene between the pixels and hence, the importance of the necessity of stability of the common potential between the pixels is further increased compared to the case of the constitution shown in FIG. 9. Even in such a case, in the constitution where the direction of the slits formed in the pixel electrode PX differs between the upper region and the lower region of the pixel, by providing the bridge line BR so as to connect the common electrodes CT between the upper and lower neighboring pixels, it is possible to make the common potential stable thus realizing the stable image display.

Further, when the bridge line BR is formed in the constitution where the direction of the slits formed in the pixel electrodes PX differs between the upper region and the lower region of the pixel PX, the manner of arranging the bridge line BR gives the different influence to the numerical aperture. In FIG. 62, to enhance the numerical aperture, the bridge line BR is formed on a side where the slits are converged. Further, the common potential connecting portions CC are provided respectively corresponding to upper and lower end portions of the side where the slits are converged. Due to such a constitution, it is possible to enhance the numerical aperture compared to the case in which the common potential connecting portions CC are formed on the side where the slits are diffused.

Further, in the constitution shown in FIG. 62, as an example, in the center region of the pixel electrode PX, a pattern in which the pixel electrode PX repeats the expansion and the contraction of a width thereof at least three times is formed. Due to such a constitution, it is possible to provide the constitution whose boundary between the upper region and the lower region of the pixel electrode PX can be hardly observed with eyes and hence it is possible to enhance the integrity of the pixel. Further, in the center region of the pixel electrode PX, the pattern in which the pixel electrode PX repeats the expansion and the contraction of the width at least three times is suitable for avoiding the rapid change of the potential of the pixel electrode PX. This constitution is particularly effective in the display image or the display method which requires the transitional characteristics of display, for example, a case in which the black image is written in the screen periodically.

Figure 63:
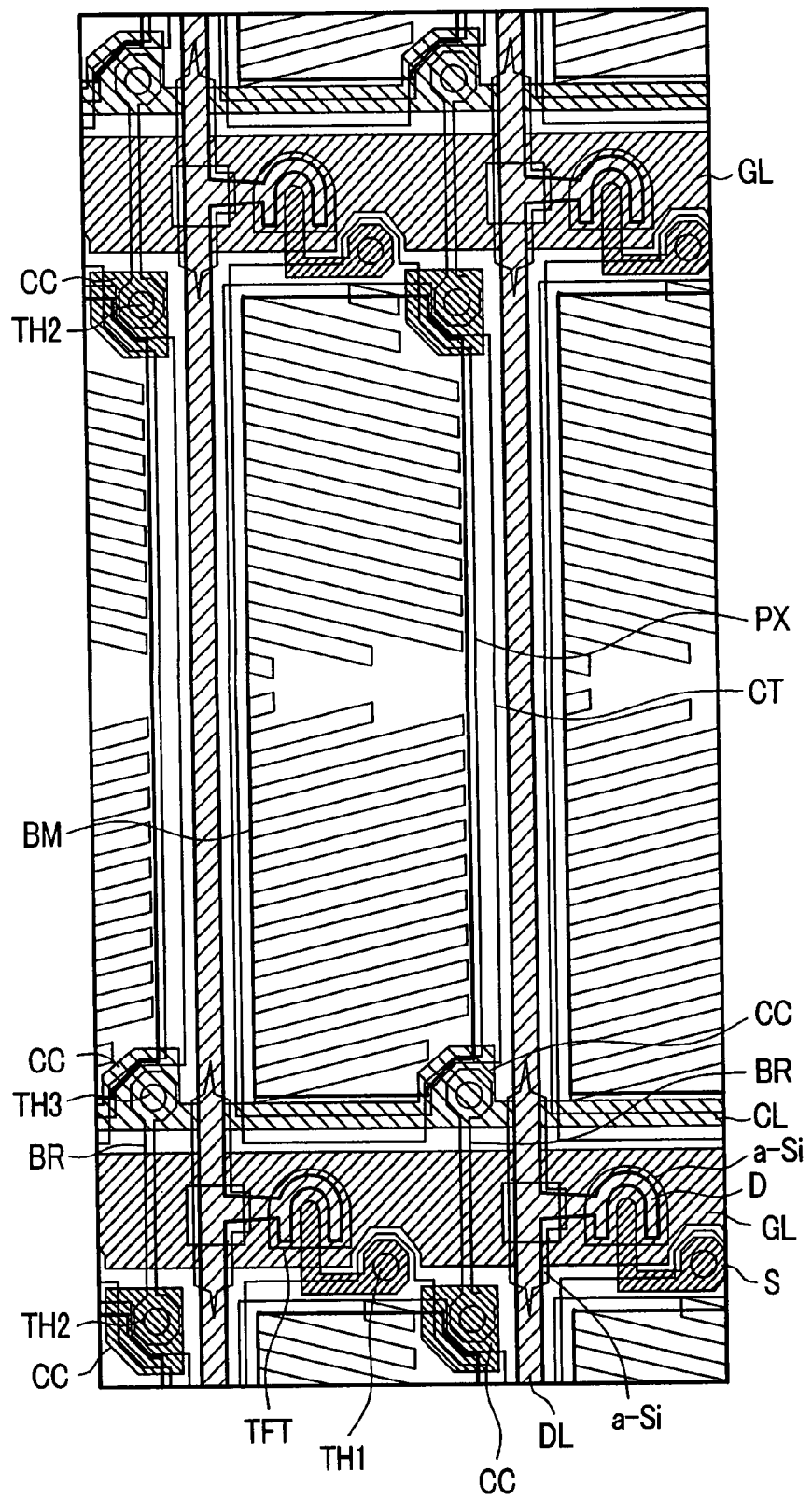
FIG. 63 is an explanatory view of one example of the detailed structure of the pixel of the display device according to the present invention.

FIG. 63 is a view which corresponds to FIG. 10 and shows one example of the planar structure of the pixel in a state that the light blocking layer BM is formed on the constitution shown in FIG. 62.

Figure 64:
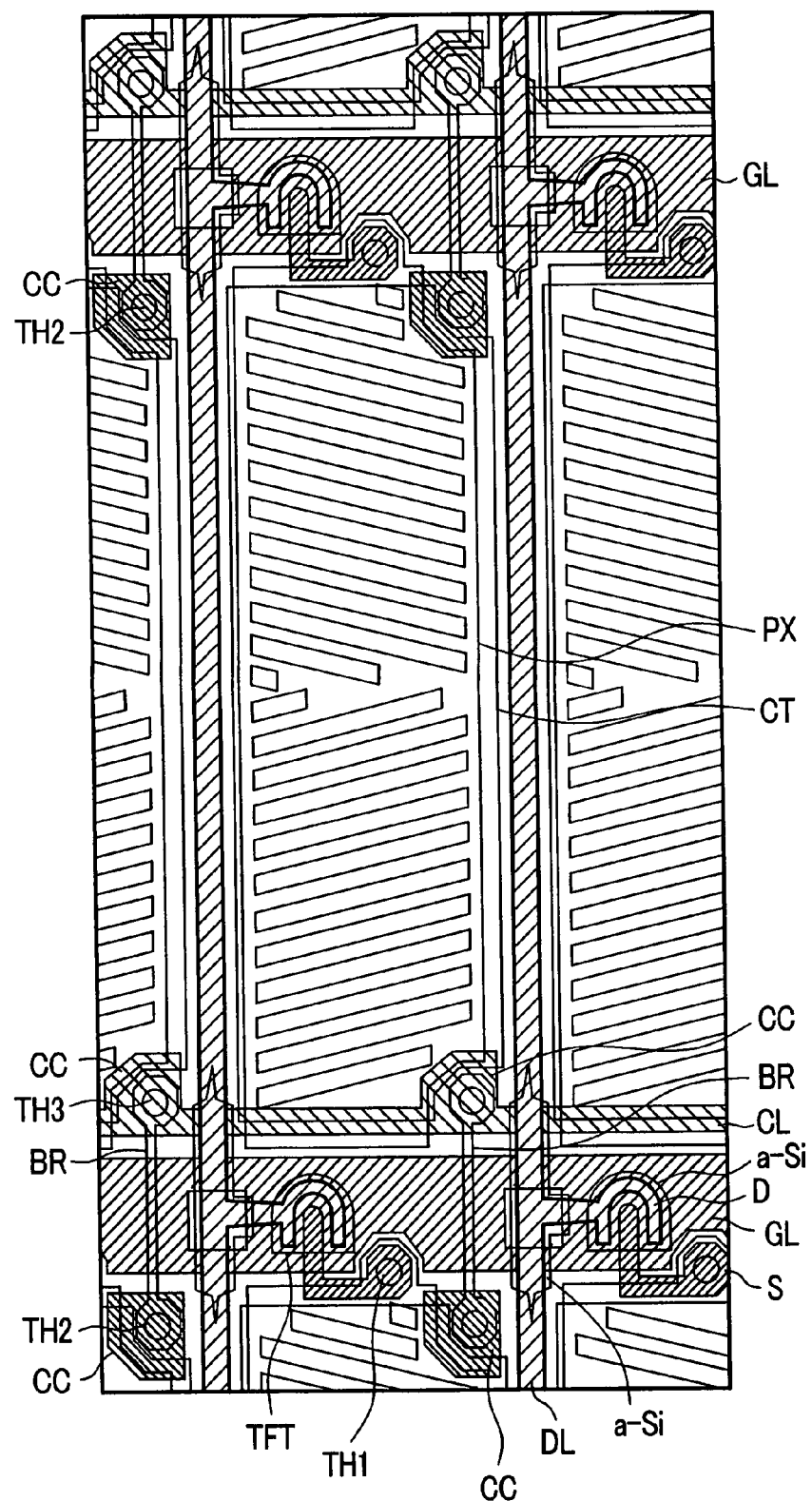
FIG. 64 is an explanatory view of one example of the detailed structure of the pixel of the display device according to the present invention.

FIG. 64 shows an example which slightly differs from the constitution shown in FIG. 62 with respect to the constitution of the center portion of the pixel.

In FIG. 64, the slits formed in the pixel electrode PX are formed such that the upward slits and the downward slits are alternately meshed with each other at the center region of the pixel. In FIG. 64, this constitution also simultaneously adopts the above-mentioned pattern in which the pixel electrode PX repeats the expansion and the contraction of a width thereof at least three times. By adopting the constitution in which the upward slits and the downward slits formed in the pixel electrodes PX are alternately meshed with each other at the center region of the pixel, it is possible to enhance the utilization efficiency of the pixel at the center region whereby the brightness can be enhanced.

<<Dummy Pixel Region>>

<<<Arrangement of Pixels at Corner Portions>>>

Figure 16A:
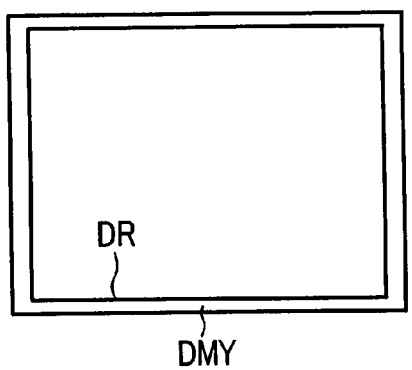
FIG. 16A and FIG. 16B are explanatory views of a display region and a dummy pixel region.

As shown in FIG. 16A a dummy pixel region DMY is arranged in the periphery of the display region DR of the display element CEL. This provision is made to approximate the conditions such as parasitic capacitance and the like of the pixel at an outermost periphery of the display region and other pixels as close as possible.

Figure 16B:
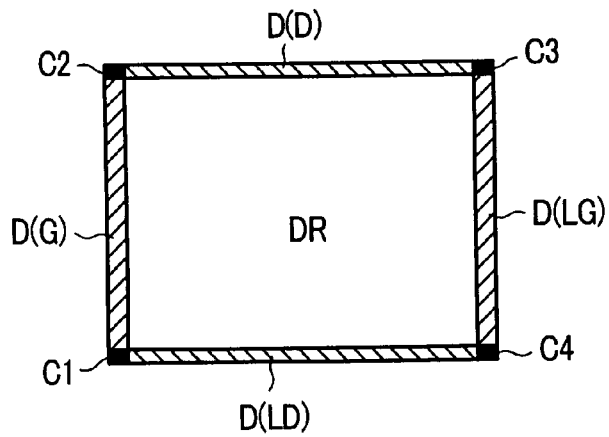

Here, the dummy pixel region DMY can be divided into a plurality of regions as shown in FIG. 16B. That is, the dummy pixel region DMY can be divided into an upper dummy pixel region D(D), a lower dummy pixel region L(D), a left dummy pixel region D(G) and a right dummy pixel region D(LD). By repeating a pattern which is equal to a pattern in the inside the display regions in these dummy pixels, it is possible to arrange the conditions between the dummy pixel region and the display region. Further, from a viewpoint of neutralizing the influence with respect to any display, it is possible to adopt the structure which exposes only the common potential. This is because that even with respect to the pixels used for display, at the time of performing the black display, the common potential is applied to both of the pixel electrode PX and the common electrode CT.

Here, with respect to the group of pixels on the outermost periphery of the display region which are arranged in parallel in the lateral direction, for example, with respect to the group of pixels on the outermost periphery which are arranged in parallel in D (LD) in FIG. 16B, the degree of influence from the D(DL) is substantially equal between the neighboring pixels. Further, with respect to the group of pixels on the outermost periphery of the display region which are arranged in parallel in the longitudinal direction, for example, with respect to the group of pixels on the outermost periphery which are arranged in parallel in D (G) in FIG. 16B, the degree of influence from the D(G) is substantially equal between the neighboring pixels. However, with respect to the dummy pixel C1 at the corner portion which constitutes a position where the D (LD) and the D (G) intersect imparts the influence singularly to the pixel at the corner portion of the effective display region DR which is closest to the C1. Here, since the brightness change which is singularly generated at the characteristic portion such as the pixel of the corner portion may bring about the possibility that all products have the defects in common among products and hence, it is necessary to eliminate such possibility.

Accordingly, the present invention adopts the constitution which allows the directions of the electrodes of the pixels at the corner portions to hardly receive the influence from the dummy pixels at the closest corner portions.

Figure 17:
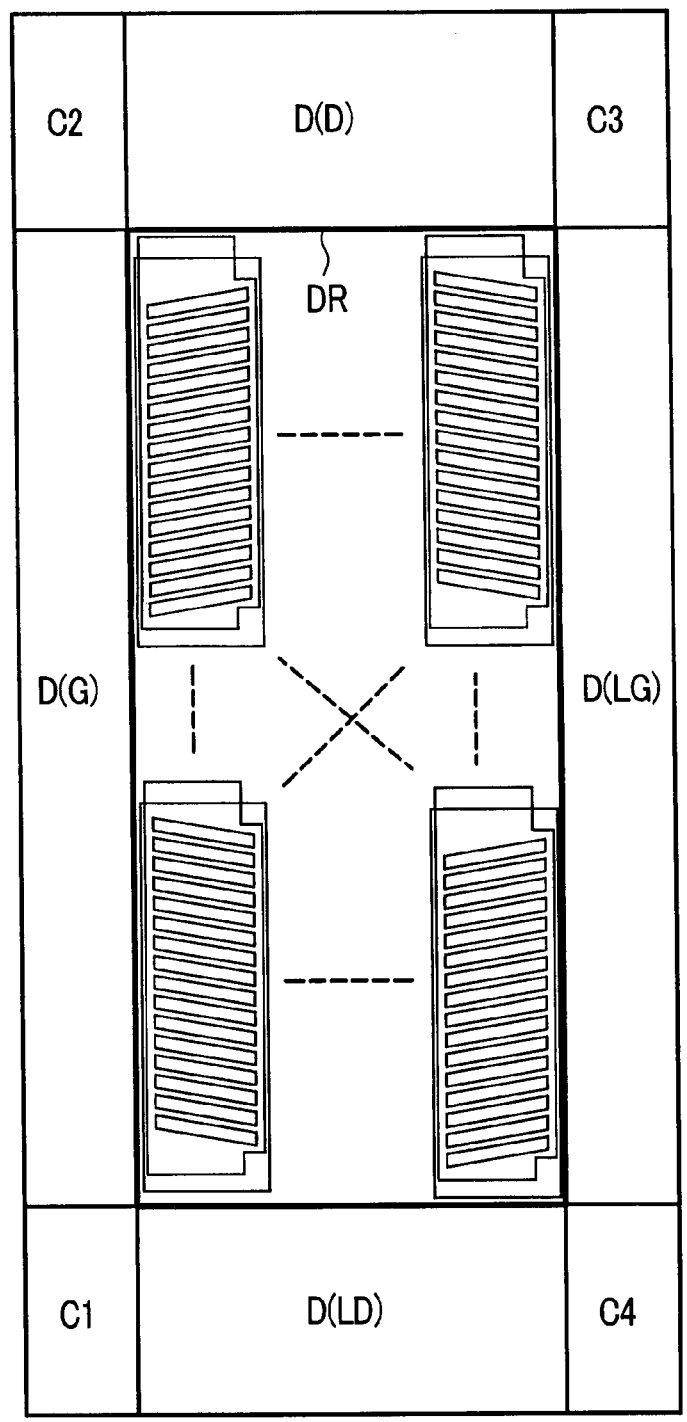
FIG. 17 is a schematic explanatory view for explaining the arrangement of pixels at corner portions.

FIG. 17 is a schematic explanatory view and schematically shows the arrangement of the electrodes of the pixel at corner portions in the inside of the effective display region DR which is closest to the dummy pixels C1, C2, C3, C4 at the four corner portions of the dummy pixel region DMY. This arrangement is characterized in that the respective pixels at the corner portions of the display region adopt the electrode arrangement which hardly receives the influence of the electric field from the dummy pixels at the corner portions.

Figure 18A:
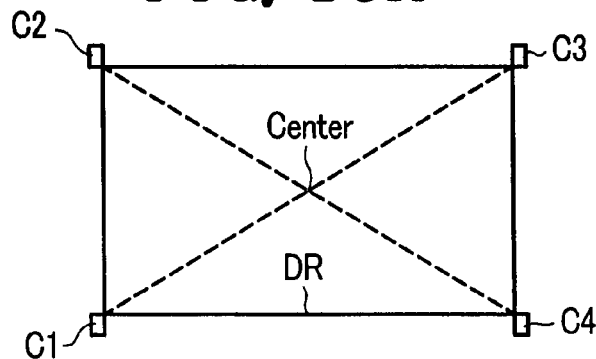
FIG. 18A, FIG. 18B, FIG. 18C and FIG. 18D are explanatory views for explaining the arrangement of electrodes of the pixels at the corner portions.
Figures 18B, 18C:
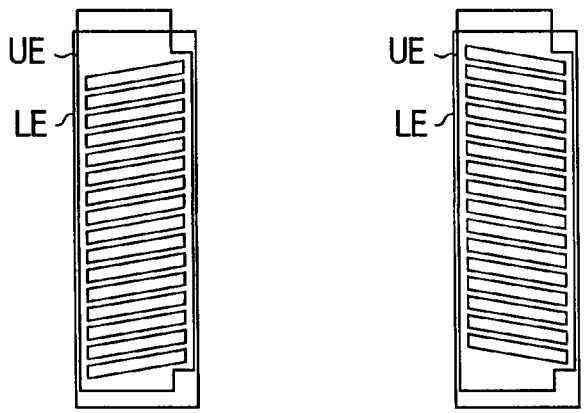
Figure 18D:
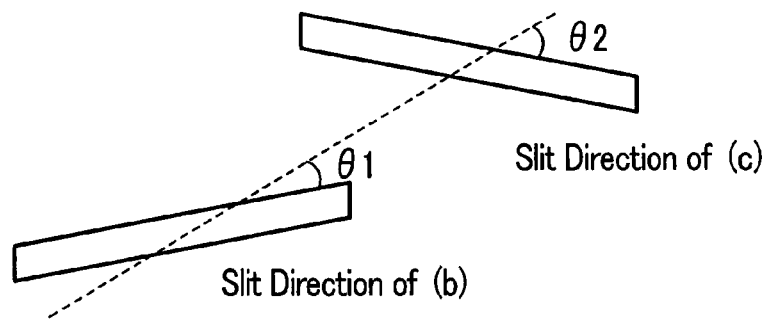

This constitution is explained more easily in conjunction with FIG. 18. FIG. 18A shows that the dummy pixels C1, C2, C3, C4 are formed on the corner portions of the display region DR by taking the center of the display region DR into consideration. Here considered is a case in which in the group of pixels in the effective display region, groups of pixels having two electrode directions shown in FIG. 188B and FIG. 18C which correspond to FIG. 2A and FIG. 2B are present. Here considered is a line segment which connects C1 and C2 in FIG. 18A, that is, an imaginary direction of the electric field extending toward the effective display region from the dummy pixel and the influence of the electric field with the electrode shape shown in FIG. 18B and FIG. 18C using a dotted line. In case of the direction of slits shown in FIG. 18B, an acute angle θ1 which the dotted line and the slits make is set smaller than an angle θ2 which the dotted line and the slits make in case of the direction of slits shown in FIG. 18C. In case of the direction of slits shown in FIG. 18B, the opening portions of the slits are arranged to approach the dummy pixels and hence, the arrangement is liable to easily receive the influence of the electric field from the dummy pixel. To the contrary, In case of the direction of slits shown in FIG. 18C, the arrangement is liable to hardly receive the influence of the electric field from the dummy pixel. Accordingly, it is desirable that the pixels at the corner portions corresponding to C1, C3 have the electrode pattern shown in FIG. 18C. To the contrary, the pixel shown in FIG. 18B is desirable as the pixels in the vicinity of C2 and C4.

Here, as shown in FIG. 18B and FIG. 18C, the explanation has been made with respect to the case in which the lower electrode LE which constitutes the lower layer is formed in a planar shape and the upper electrode UE which constitutes the upper layer is formed in a slit shape. However, the same goes for a vertical orientation method in which only the upper electrodes UE are formed on one substrate provided that the slits are formed.

Although the relationship may be inverted depending on the voltage and the shape of the dummy pixels at the corner portions, the present invention returns to FIG. 17 and the desirable constitution is required to satisfy the following (1).

(1) The dummy pixels include the line-like electrodes or slits, wherein the direction of the line-like electrodes or slits is equal between the pixels formed on the corner portions which face in an opposed manner and at least in the vicinities of the corner portions. It is more preferable that the following (2) is satisfied in addition to the above-mentioned (1).

(2) The dummy pixels include the line-like electrodes or slits, wherein the direction of the line-like electrodes or slits differs between the pixels which are most spaced apart from each other on the same side or at least in the vicinities of the corner portions.

To define the above-mentioned arrangement in view of the object, it is safe to say that the electrode arrangement of the pixels in respective corner portions of the effective display region assumes the arrangement which suppresses the influence from the dummy pixels at the corner portions.

To define the dummy pixels with respect to the case corresponding to the explanation of FIG. 18, the definition becomes as follows (3).

(3) When two kinds of pixels which differ in the direction of the line-like electrodes or the slits are provided, it is safe to say that with respect to the direction of the linear electrodes or slits formed in the pixels at the corner portions, by comparing an acute intersecting angle which the direction of the line-like electrodes or the slits makes with respect to a line which connects the corner portion and the center of the display region, the pixels having the direction of the slits or the electrodes which intersects with an angle larger than the acute intersecting angle are arranged.

<<<Supply of Common Potential Using Dummy Pixel Region>>>

Figure 19:
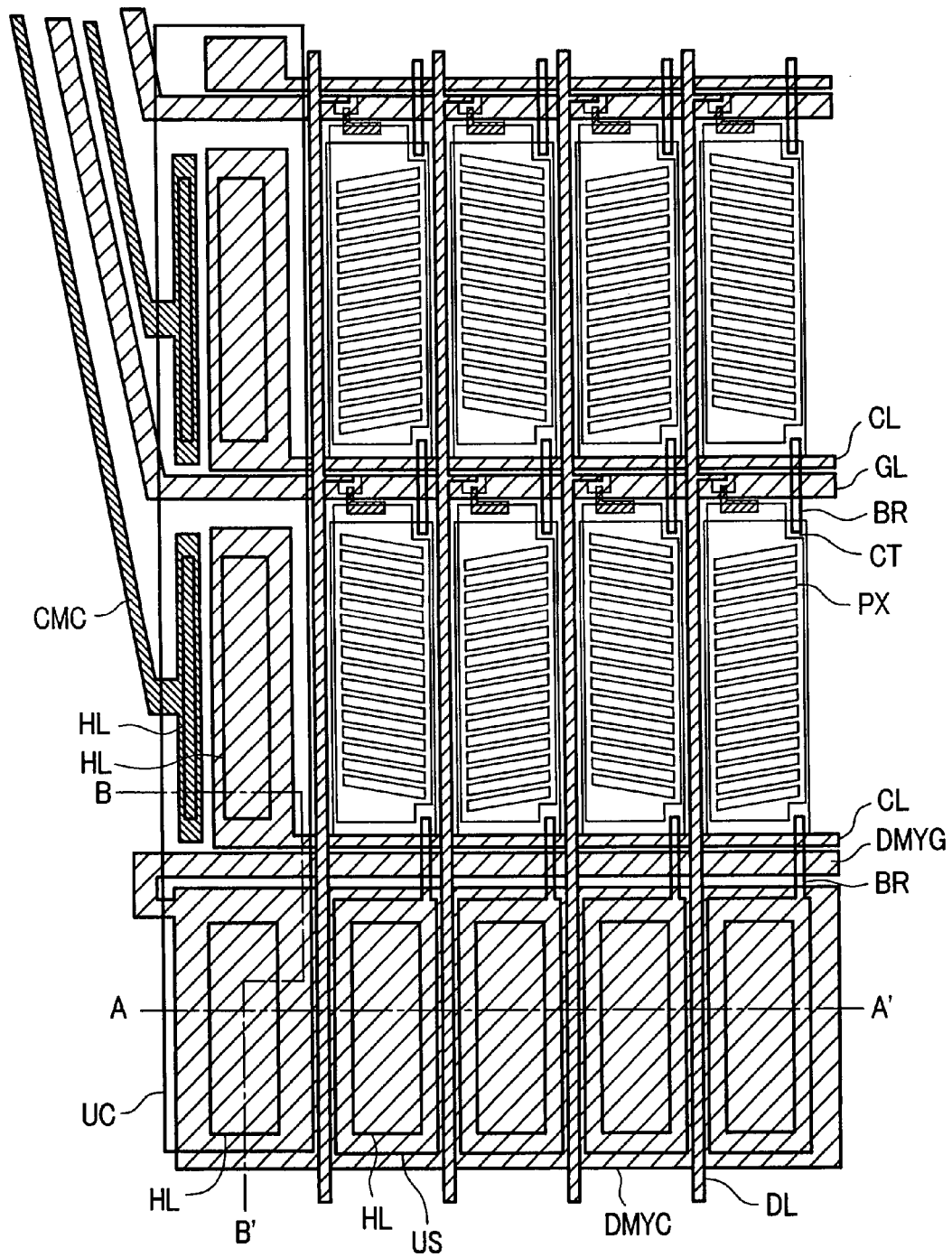
FIG. 19 is an explanatory view of an example of the dummy pixel region.

FIG. 19 is a view for explaining the supply of the common potential using the dummy pixel region in the vicinity of the corner portion and shows the region in the vicinity of the C1 shown in FIG. 16 or FIG. 17.

Figure 20A:
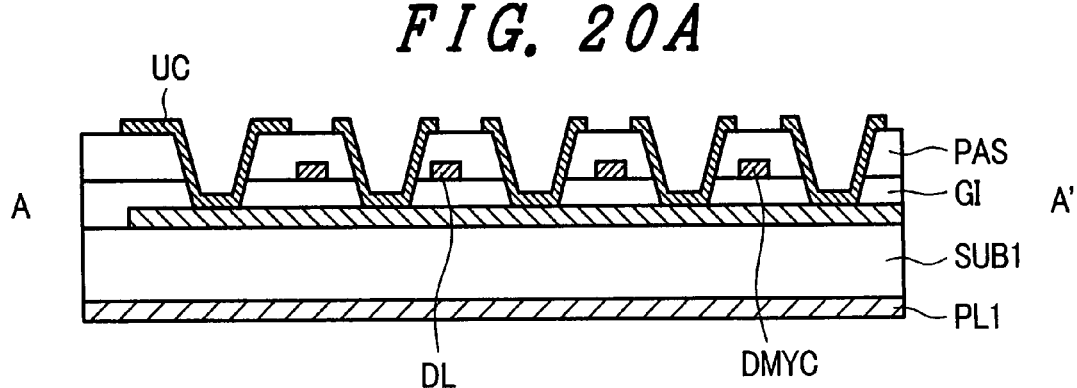
FIG. 20A and FIG. 20B are schematic cross-sectional views taken along a line A-A' and a line B-B' in FIG. 19.

Below the pixel on the display region at the lowermost side, a dummy gate line DMYG is arranged, wherein the dummy pixels are arranged such that the conditions thereof approximate the conditions of other pixels. Below the dummy gate line DMYG, the dummy pixel region, that is, the dummy pixel region which corresponds to the D(LD) in FIG. 16 or FIG. 17 extends. The structure of the dummy pixel region D (LD) is explained in conjunction with FIG. 20A which show the cross-sectional structure taken along a line A-A' in FIG. 19.

A dummy common signal line DMYC to which the common potential is supplied on the same layer with the common signal line CL extends with a large width. Due to this constitution, a bus line for supplying the common potential of low resistance is formed. The gate insulation film GI is formed on the dummy common signal line DMYC and the video signal line DL extends on the gate insulation film GI. The protective film PAS is formed in a state that the protective film PAS covers the video signal line DL. A PAS hole HL is formed in the protective film PAS and the gate insulation film GI in a region between the video signal lines DL. An upper shield electrode US is integrally formed with the bridge line BR using a transparent electrode in a state that the upper shield electrode US covers the PAS hole HL. Due to such a constitution, in respective pixels in the dummy region, the reference potential appears on the uppermost layer and hence, the potential is made stable. Further, the common potential is supplied to the respective pixels in the longitudinal direction from the dummy common potential line DMYC which functions as the bus line of low resistance via the bridge line BR and hence, the reduction of the power supply resistance of the common potential can be achieved.

The dummy common potential line DMYC and the dummy gate signal line DMYG are connected with each other on a left side in FIG. 19 thus obviating the change of the potential of the dummy gate signal line DMYG.

Figure 20B:
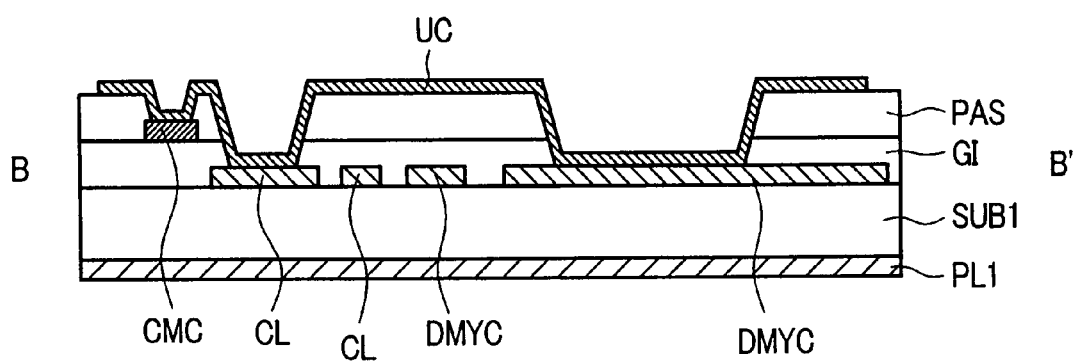

Outside the group of outermost peripheral pixels in the longitudinal direction on the left end, the dummy pixel region extends along the D(G) in FIG. 16 or FIG. 17. In each dummy pixel, an end portion of the common signal line CL forms a large width portion. Further, the common potential connecting metal line CMC is arranged close to the common signal line CL and an end portion of the common potential connecting metal line CMC also has a large width. These large-width portions are arranged close to each other and are electrically connected with each other by an upper shield electrode US. The explanation is made in conjunction with FIG. 20B which is a cross-sectional view of a B-B' line portion shown in FIG. 19. On the substrate SUB1, the large width portion formed on the end portion of the common signal line CL is formed below the gate insulation film GI. The large-width portion of the common potential connecting metal line CMC is formed on the gate insulation film GI in a state that the common potential connecting metal line CMC is arranged close to the common signal line CL. At these large-width portions, the PAS hole HL is formed in the gate insulation film GI and the upper shield electrode US is formed in a state that the upper shield electrode US covers the hole portion whereby the common potential connecting metal line CMC and the common signal line CL become electrically conductive with each other. Further, the upper common connecting line UC is electrically connected with the DMYC through another hole portion thus realizing the supply of the common potential to the DMYC.

The common potential connecting metal line CMC and the gate signal line GL are formed on the different layers. This is because that the common potential is supplied to the common potential connecting metal line CMC using the gate signal line GL toward the display region from the outside on the left side in FIG. 19 and hence, a large number of these lines are arranged in a closely arranged manner corresponding to the number of the pixels whereby the common potential connecting metal line CMC and the gate signal line GL are formed on the different layers by way of the gate insulation film GI for obviating the short-circuiting and the electrolytic corrosion.

Also in the vicinities of other C3, C3, C4, in the dummy pixel portion, the lower metal dummy electrode layer and the upper shield electrode US are connected with each other via the PAS hole HL and hence, the common potential is exposed whereby the potential of the dummy pixel region is made stable.

<<<Dummy Pattern>>>

Figure 21:
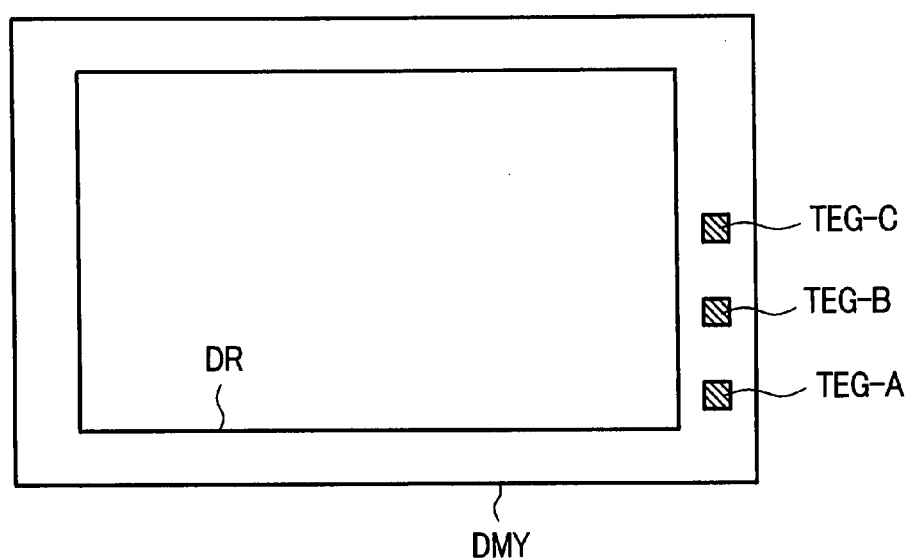
FIG. 21 is an explanatory view of an arrangement example of a dummy pattern in a dummy pixel region.

The dummy pixel region DMY is suitable for arranging the dummy pattern for various purposes. Particularly, dummy pixel region DMY is suitable for arranging a pattern to perform a quality control. FIG. 21 is characterized by arranging a plurality of measuring dummy patterns TEG-A, TEG-B, TEG-C on the dummy pixel region DMY. These measuring dummy patterns may be scattered to different sides, or may be concentrated on one side, or may be formed respectively on a plurality of sides. The important point is that the measuring dummy patterns are arranged in the dummy pixel region which is arranged closest to the pixel.

The explanation is made with respect to a case in which the dummy pattern adopts a pattern which measures film thicknesses of the gate insulation film GI, the semiconductor layer a-Si, the protective film PAS and the like.

The insulation film and the semiconductor layer are formed by a CVD method. Accordingly, film thicknesses of the films which are formed by peripheral patterns receive the influence. The purpose of measuring the film thickness using the dummy patterns is to know the film thicknesses within the display region and, for example, to feedback the obtained information to the film forming conditions in the manufacturing steps. Accordingly, even when the dummy patterns are arranged remote from the display region and obtain the information on different film thicknesses, the information has no values. Accordingly, it is important to arrange the dummy patterns on the dummy pixel region which is arranged closest to the pixel.

Figure 22:
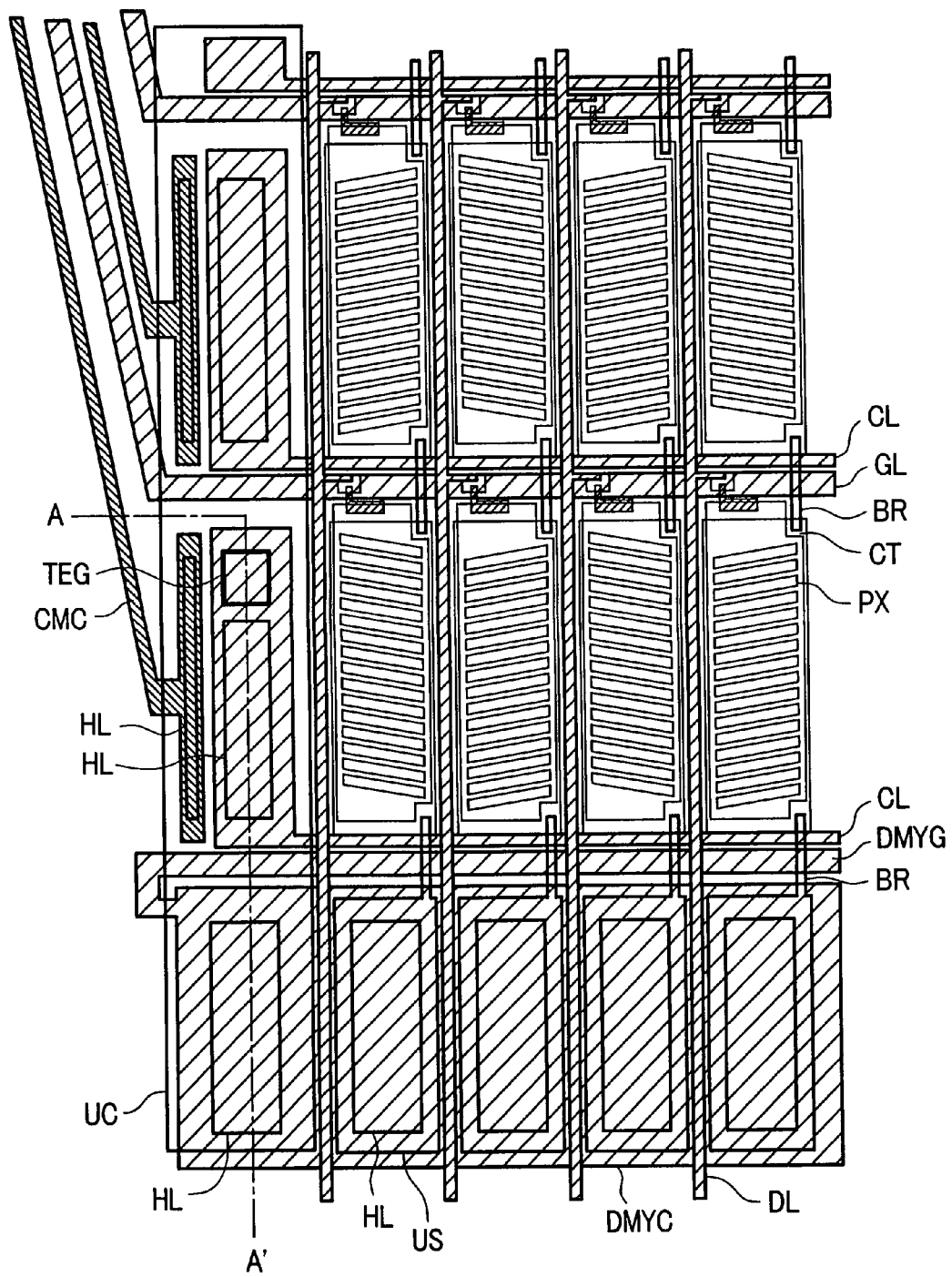
FIG. 22 is a plan view of the arrangement example of the dummy pattern in a dummy pixel region.

FIG. 22 shows an example in which, for example, one measuring dummy pattern TEG is formed in the dummy region shown in FIG. 19. When a plurality of measuring dummy patterns TEG are arranged in the dummy region, the measuring dummy patterns TEG may be arranged on the separate dummy pixel in the dummy pixel region arranged closest to the pixel based on the same technical concept which is explained hereinafter.

In the dummy pixel where the measuring dummy pattern TEG is arranged, a size of the PAS hole HL formed in the protection film PAS is reduced. Then, on the region which is covered with the obtained protective film PAS, the measuring dummy pattern TEG is arranged.

The structure and the manner of using of the measuring dummy pattern TEG related to the measurement of various film thicknesses are explained with respect to examples of various measuring dummy patterns TEG using the cross-sectional structure taken along a line A-A' in FIG. 22.

Figure 23A:
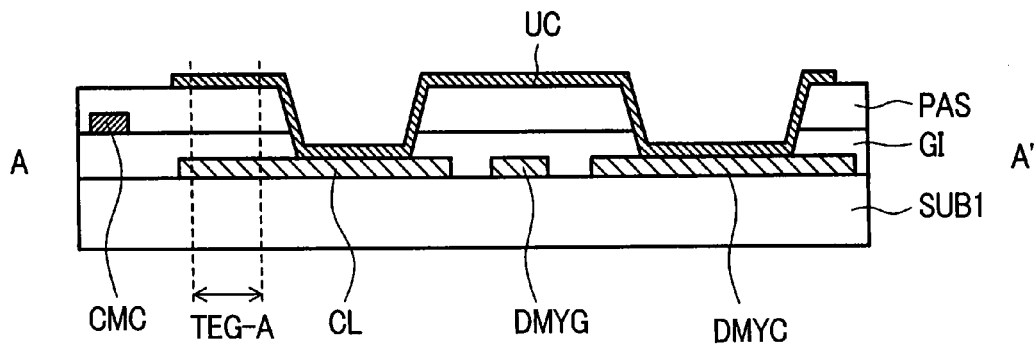
FIG. 23A and FIG. 23B are cross-sectional views for explaining an example of a dummy pattern.
Figure 23B:
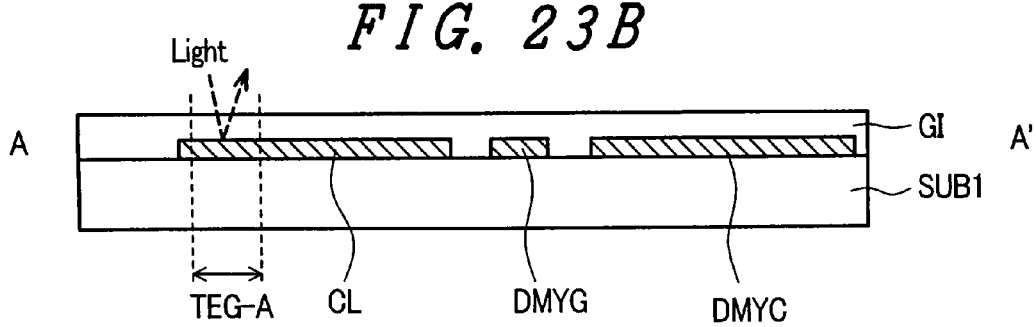

FIG. 23A and FIG. 23B show the cross-sectional structure taken along the line A-A' in FIG. 22, wherein FIG. 23A shows the cross-sectional structure at the time of completion and FIG. 23B shows the cross-sectional structure at the time of measuring. The measuring dummy pattern TEG-A aims at the measurement of the film thickness of the gate insulation film GI. In a stage after the formation of the gate insulation film GI and prior to the formation of the protective film PAS, as shown in FIG. 23B, a film thickness of the gate insulation film GI is detected by an optical technique which uses light Light. Since the common signal line CL is a metal layer and hence reflects light, it is possible to know the film thickness of the gate insulation film GI which is a transparent film using an ellipsometer. In FIG. 23A which shows the cross-sectional structure in the completed form, the region of the measuring dummy pattern TEG-A is recognized as the dummy pixel having the small hole in the protective film PAS.

Figure 24A:
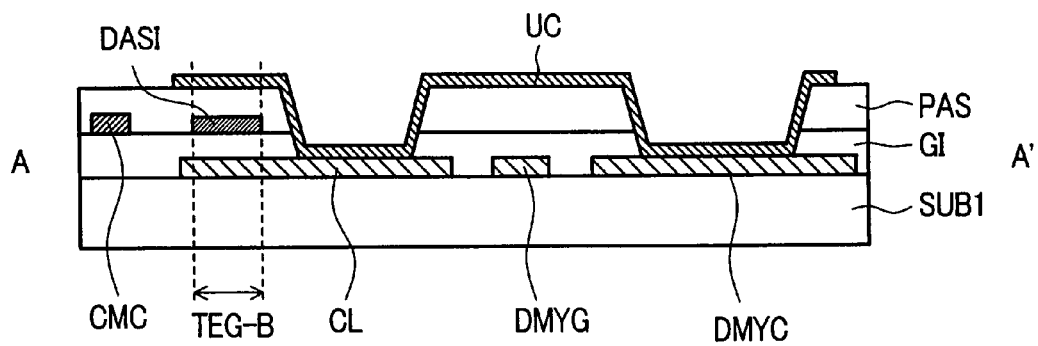
FIG. 24A and FIG. 24B are cross-sectional views for explaining an example of a dummy pattern.
Figure 24B:
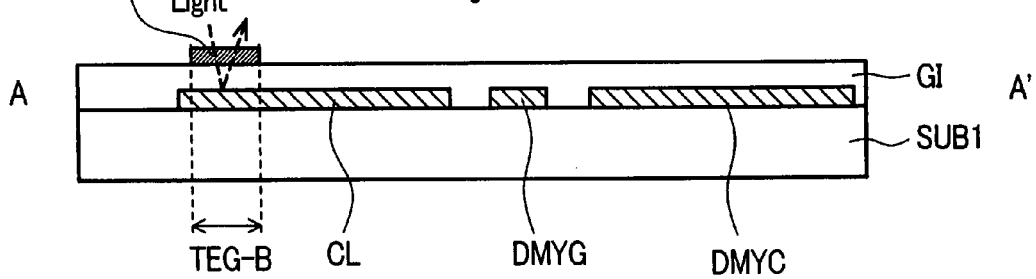

FIG. 24A and FIG. 24B show the cross-sectional structure taken along the line A-A' in FIG. 22, wherein FIG. 24A shows the cross-sectional structure at the time of completion and FIG. 24B shows the cross-sectional structure at the time of measuring. The measuring dummy pattern TEG-B aims at the measurement of the total film thickness of the gate insulation film GI and the semiconductor layer a-Si. In a stage after the formation of the gate insulation film GI and the formation of the semiconductor layer a-Si and prior to the formation of the protective film PAS, as shown in FIG. 24B, the total film thickness of the gate insulation film GI and the semiconductor layer a-Si is detected by an optical technique which uses light Light. By measuring the film thickness of the gate insulation film GI alone using the technique shown in FIG. 23, it is also possible to know the film thickness of the semiconductor layer a-Si alone by the subtraction. In FIG. 24A which shows the cross-sectional structure in the completed form, the region of the measuring dummy pattern TEG-B is recognized as the dummy pixel in which the isolated a-Si pattern remains.

FIG. 25A and FIG. 25B show the cross-sectional structure taken along the line A-A' in FIG. 22, wherein FIG. 25A shows the cross-sectional structure at the time of completion and FIG. 25B shows the cross-sectional structure at the time of measuring. The measuring dummy pattern TEG-C aims at the measurement of the film thickness of the protective film PAS. The dummy video pattern DDL constituted of the video signal lines DL is formed on the gate insulation film GI. On the dummy video pattern DDL, the protective film PAS is formed. By forming the dummy video pattern DDL using a metal layer which is formed on the same layer as the video signal line DL, it is possible to optically measure the film thickness of the protective film PAS using the ellipsometer as shown in FIG. 25B.

Further, by performing the measurement after forming the upper shield electrode US using the transparent electrode as shown in FIG. 25A, it is possible to know the film thickness of the transparent electrode by subtracting the film thickness of the protective film PAS found in the step shown in FIG. 25B.

In FIG. 25A which shows the cross-sectional structure in the completed form, the region of the measuring dummy pattern TEG-C is recognized as the dummy pixel in which the pattern which is formed on the same layer as the isolated video signal line DL remains.

<Module Structure>

An example of the module structure shown as the example in FIG. 27 is explained in more detail.

<<Schematic Structure>>

Figure 28A:
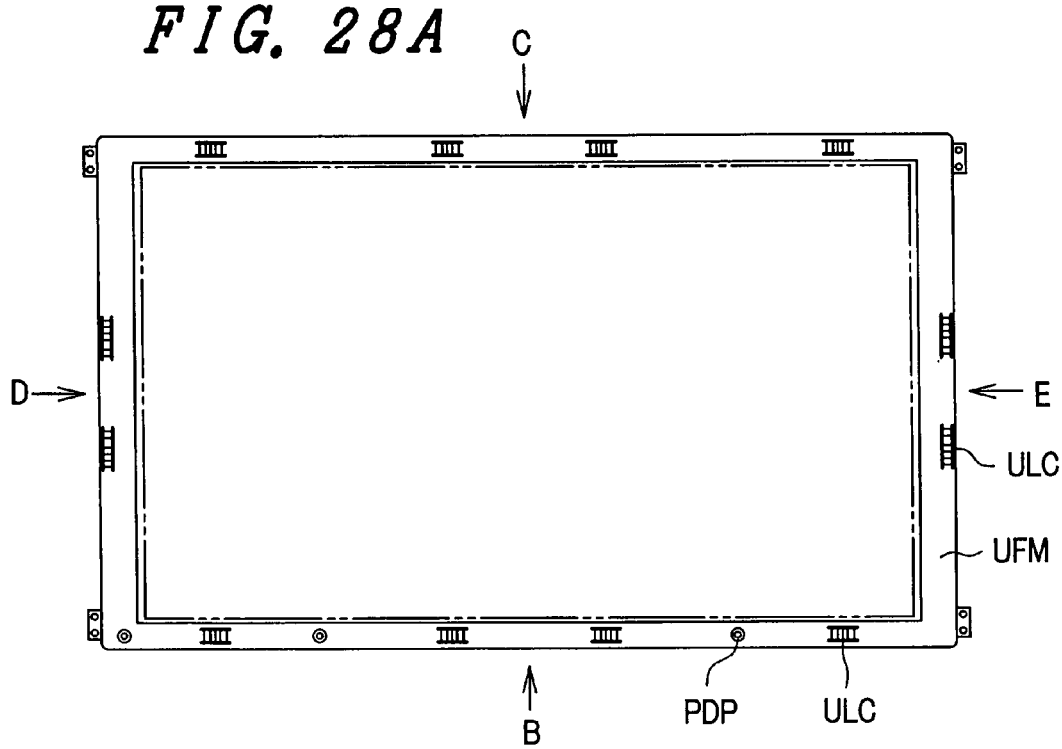
FIG. 28A to FIG. 28E are views of the module of the display device as viewed from a front side, an upper side, a lower side, a left side and a right side in a state that the display device includes an upper frame

FIG. 28A is a front view of the display device in a state that the upper frame UFM is mounted. The upper frame UFM is formed of a metal material. An example of a connecting portion ULC between the upper frame UFM and the lower frame LFM is formed on each side. Further, holes of positioning portions PDP are observed.

FIG. 28B, FIG. 28C, FIG. 28D and FIG. 28E are respectively views corresponding to a lower surface, an upper surface, a left surface and a right surface of the structure shown in FIG. 28A. The upper frame UFM is formed in a state that the upper frame UFM is bent and extended to side surface of respective sides thereof.

Figure 28B:
Figure 28C:
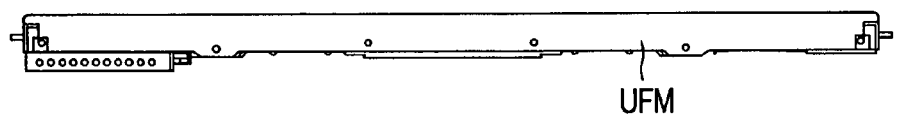
Figure 28D:
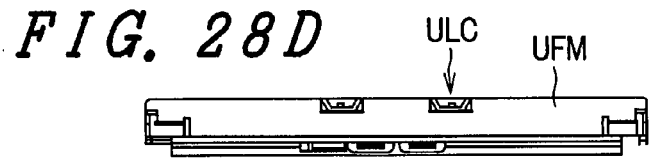
Figure 28E:
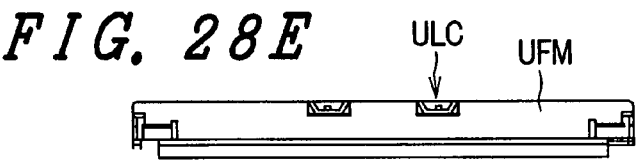

Although the upper and lower frame connecting portion ULC are not observed in FIG. 28B and FIG. 28C, portions of the frame connecting portions ULC are observed in FIG. 28D and FIG. 28E. This structure is adopted to contract a profile size of portions other than the display region of the display device. Accordingly, although the upper frame strength outside the upper and lower frame connecting portions ULC becomes weaker at a short side than a long side of the upper frame, since the distance per se of the frame is short with respect to the short side and hence, the influence on the rigidity as a whole can be suppressed. Accordingly, it is possible to achieve both of the contraction of the profile size and the maintenance of the strength.

Further, to maintain the connection strength, the larger number of the upper and lower frame connecting portions ULC are formed on the long side than the short side.

Figure 29:
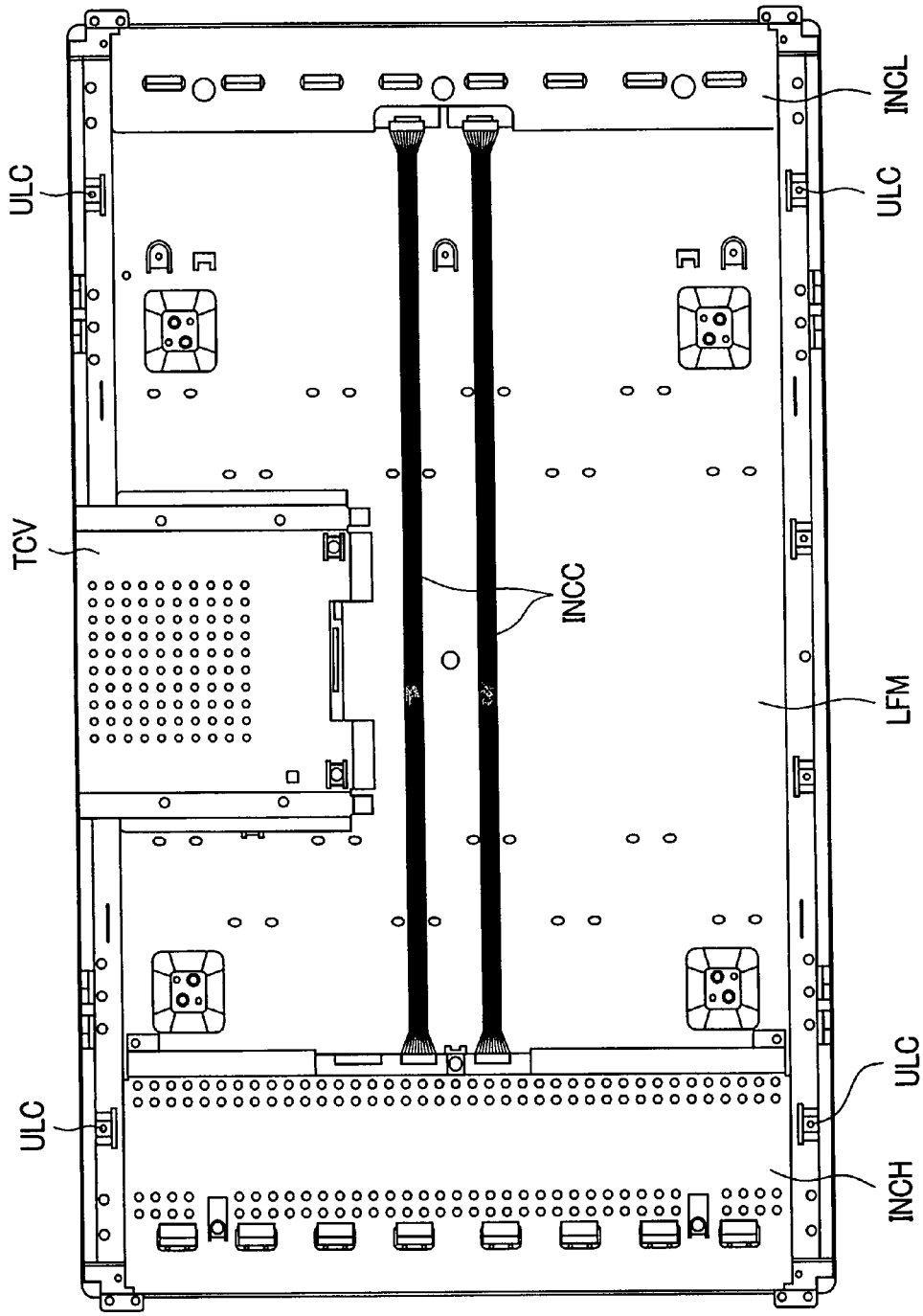
FIG. 29 is a view of the module of the display device as viewed from a back surface.

FIG. 29 is a view showing the display device as viewed from a back surface. Corresponding to the upper and lower frame connecting portions ULC when the upper and lower frame connecting portions ULC are viewed from the upper frame, the upper and lower frame connecting portions ULC are also formed on the lower frame LFM.

On the left side of the drawing, an inverter cover (high voltage side) INCH is provided and an inverter printed circuit board (high voltage side) is arranged below the inverter cover INCH. The leaking electric field from the inverter is shielded by the inverter cover (high voltage side) INCH. On the upper side of the drawing, the controller (printed circuit board) and a cover of the TCON (TCON cover) TCV are arranged. On the right side of the drawing, an inverter cover (low voltage side) INCL is provided and an inverter printed circuit board (low voltage side) is arranged below the inverter cover INCL.

The leaking electric field from the low-voltage-side inverter printed circuit board is shielded by the inverter cover (low voltage side) INCL.

Both of the inverter cover (high voltage side) INCH and the TCON cover TCV are formed of metal for shielding and a large number of holes are formed in the inverter cover (high voltage side) INCH and the TCON cover TCV for heat radiation. The holes formed in the TCON cover TCV are set smaller than the holes formed in the inverter cover (high voltage side) INCH. With respect to the frequency of the leaking electric field, the frequency of the leaking electric field from the controller printed circuit board is higher than the leaking electric field from the inverter printed circuit board and hence, the heat radiation is achieved while preventing the leaking of the electric field from the holes by setting the holes formed in the TCON cover TCV small. On the other hand, although the frequency from the inverter printed circuit board is relatively small, an electric current is supplied to the light source CFL and hence, the heat generation is large. Accordingly, by forming the holes larger than the holes formed in the TCON cover TCV, it is possible to obtain both of the heat radiation and the shielding of the leaking electric field. Further, by changing the sizes of these holes, the resonance frequency of the metal shield plate can be dispersed and hence, the generation of the resonance sounds can be prevented under any operation conditions.

Figure 30A:
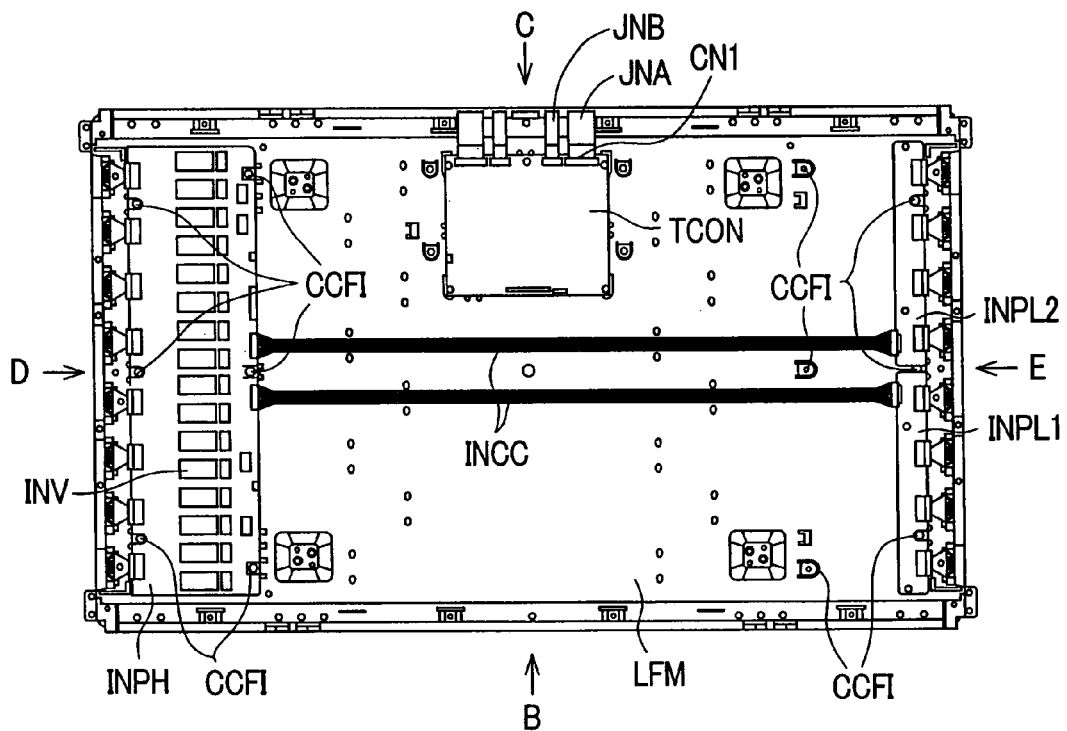
FIG. 30A to FIG. 30E are views of the module of the display device as viewed from a back surface, a front surface, and upper, lower, left and right side surfaces in a state that a TCON cover, an inverter cover and an upper frame are removed.
Figure 30B:

FIG. 30A to FIG. 30E are views for showing a state in which the respective covers consisting of the inverter cover (high voltage side) INCH, the inverter cover (low voltage side) INCL and the TCON cover TCV are removed, wherein FIG. 30A is a view as viewed from the back surface side.

On the left side of the drawing, an inverter printed circuit board (high voltage side) INPH is formed. A large number of inverter transformers are arranged on the inverter printed circuit board (high voltage side) INPH. Further, a high-voltage-side output is supplied to the light source through a connector.

On the right side of the drawing, an inverter printed circuit board (low voltage side) INPL is formed. A low-voltage-side end portion of the light source is arranged on a connector of the inverter printed circuit board (low voltage side) INPL. The inverter printed circuit board (low voltage side) INPL is divided in two and the divided inverter printed circuit boards are arranged as the inverter printed circuit board (low voltage side) INPL1 and the inverter printed circuit board (low voltage side) INPL2.

The inverter printed circuit board (low voltage side) INPL and the inverter printed circuit board (high voltage side) INPH are connected with each other using an inverter printed circuit board connection cable INCC. Due to such a constitution, the low-voltage-side of the light source is connected to the connector of the inverter printed circuit board connection cable INCC via a line on the inverter printed circuit board (high voltage side) INPH using a connector and the inverter printed circuit board connection cable INCC is connected with the inverter printed circuit board (high voltage side) INPH using a connector whereby the supply of electricity to the low voltage side becomes possible.

On the lower frame LFM, inverter printed circuit board common connecting portions CCFI which allow the connection of the inverter printed circuit board to the lower frame LFM are formed. The inverter printed circuit board common connecting portions CCFI are formed on the lower frame LFM in the left-and-right symmetry. That is, even when the inverter printed circuit board (high voltage side) INPH and the inverter printed circuit board (low voltage side) INPL are arranged in a reverse manner in the left and right direction, it is possible to cope with the situation using the same display device. This implies that since the heat generation from the inverter printed circuit board is relatively large, by adjusting the arrangement relationship with other heat generating parts within a set of a liquid crystal TV set or the like, the heat generation can be made uniform whereby it is possible to prevent the generation of locally high-temperature portions.

Since the inverter printed circuit board (low voltage side) INPL can be made smaller than the inverter printed circuit board (high voltage side) INPH, an extra portion is formed at either side of the inverter printed circuit board common connecting portion CCFI. Accordingly, in the inverter printed circuit board (high voltage side) INPH, the inverter printed circuit board common connecting portion CCFI is fixed to the lower frame LFM using given portions formed on both sides of the printed circuit board. In the inverter printed circuit board (low voltage side) INPL, the inverter printed circuit board common connecting portion CCFI is fixed to the lower frame LFM using given portions formed on one side of the printed circuit board. For this end, it is desirable that a width of the inverter printed circuit board (low voltage side) INPL is ½ or less of a width of the inverter printed circuit board (high voltage side) INPH. It is more desirable that a width of the inverter printed circuit board (low voltage side) INPL is ⅓ or less of a width of the inverter printed circuit board (high voltage side) INPH. This provision is made to ensure the sufficient fixing strength by the fixing of the printed circuit board to only one side of the lower frame LFM.

On the upper side of the drawing, a controller printed circuit board is arranged. The controller TCON is formed on the controller printed circuit board. Outputs from the controller TCON are supplied to the display element CEL by a joiner (A) JNA, a joiner (B) JNB and the like via the connectors CN1.

Figure 30C:

FIG. 30B, FIG. 30C, FIG. 30D and FIG. 30E are respectively views corresponding to a lower surface, an upper surface, a left surface and a right surface of the structure shown in FIG. 30A. FIG. 30C shows that a printed circuit board PCB which supplies signals to the video signal drive circuit of the display element CEL is arranged on a side surface of the display device. By connecting joiner (A) JNA and a joiner (B) JNB using the connector CN2, various signals and voltages are supplied to the drain printed circuit board DPCB and the controller TCON. The drain printed circuit board DPCB is constituted of a drain printed circuit board DPCB1 and a drain printed circuit board DPCB2. These printed circuit boards DPCB1, DPCB2 are explained later.

Figure 30D:
Figure 30E:

FIG. 30D and FIG. 30E show a state that a large number of cables from the inverter printed circuit board are arranged.

Figure 31:
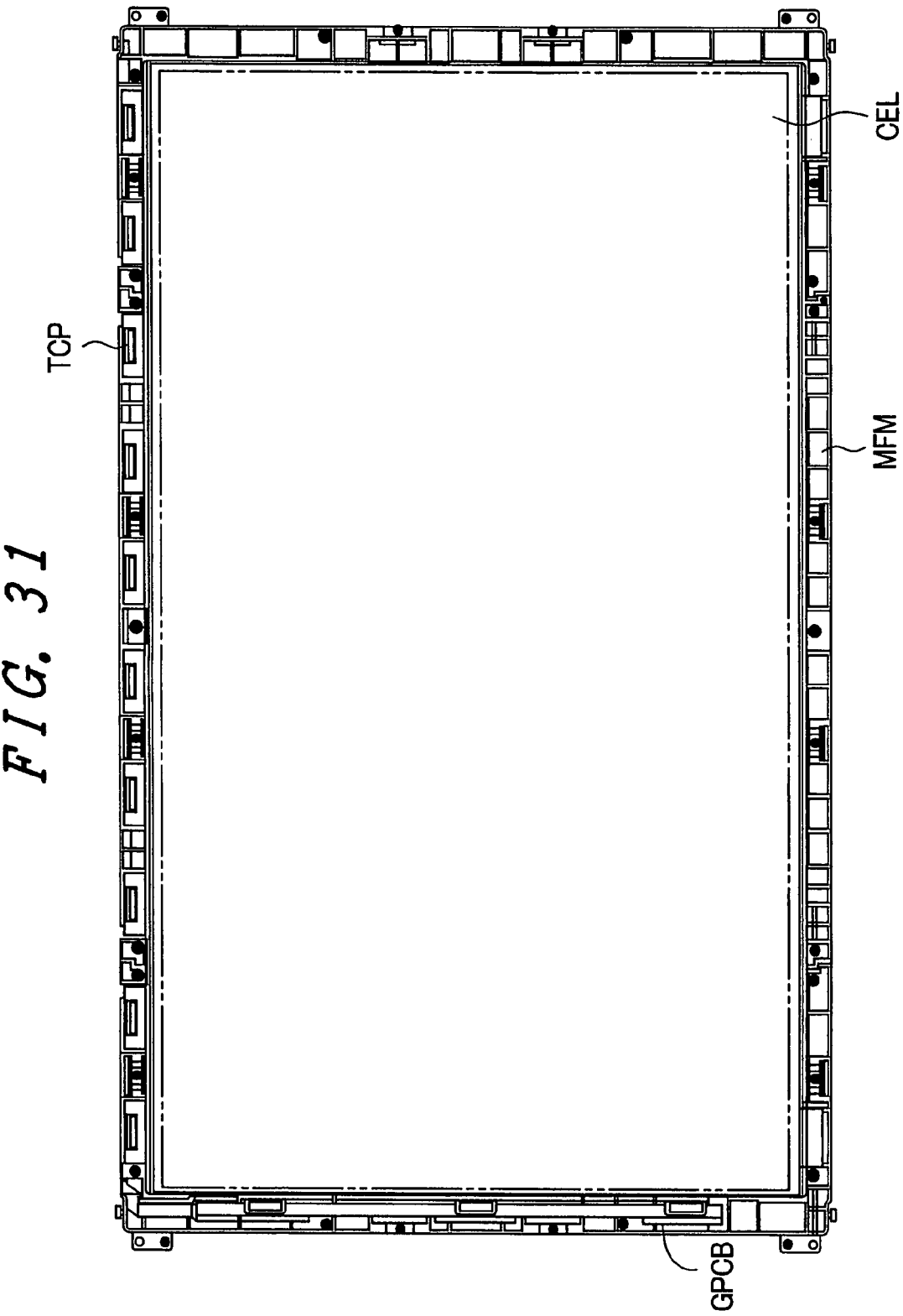
FIG. 31 is a view of the module of the display device from a front surface in a state that the upper frame is removed.

FIG. 31 shows a state in which the upper frame UFM shown in FIG. 28A is removed. The intermediate frame MFM is arranged and the display element CEL is stacked on the intermediate frame MFM. On an upper side of the display element CEL, the video signal drive circuit is formed using the tape carrier TCP as an example. The video signal drive circuit is connected with either one of the drain printed circuit boards DPCB1, DPCB2. On the left side of the display element CEL, the gate printed circuit board GPCB is formed. The gate printed circuit board GPCB is connected to the display element CEL by the tape carrier TCP.

Figure 32:
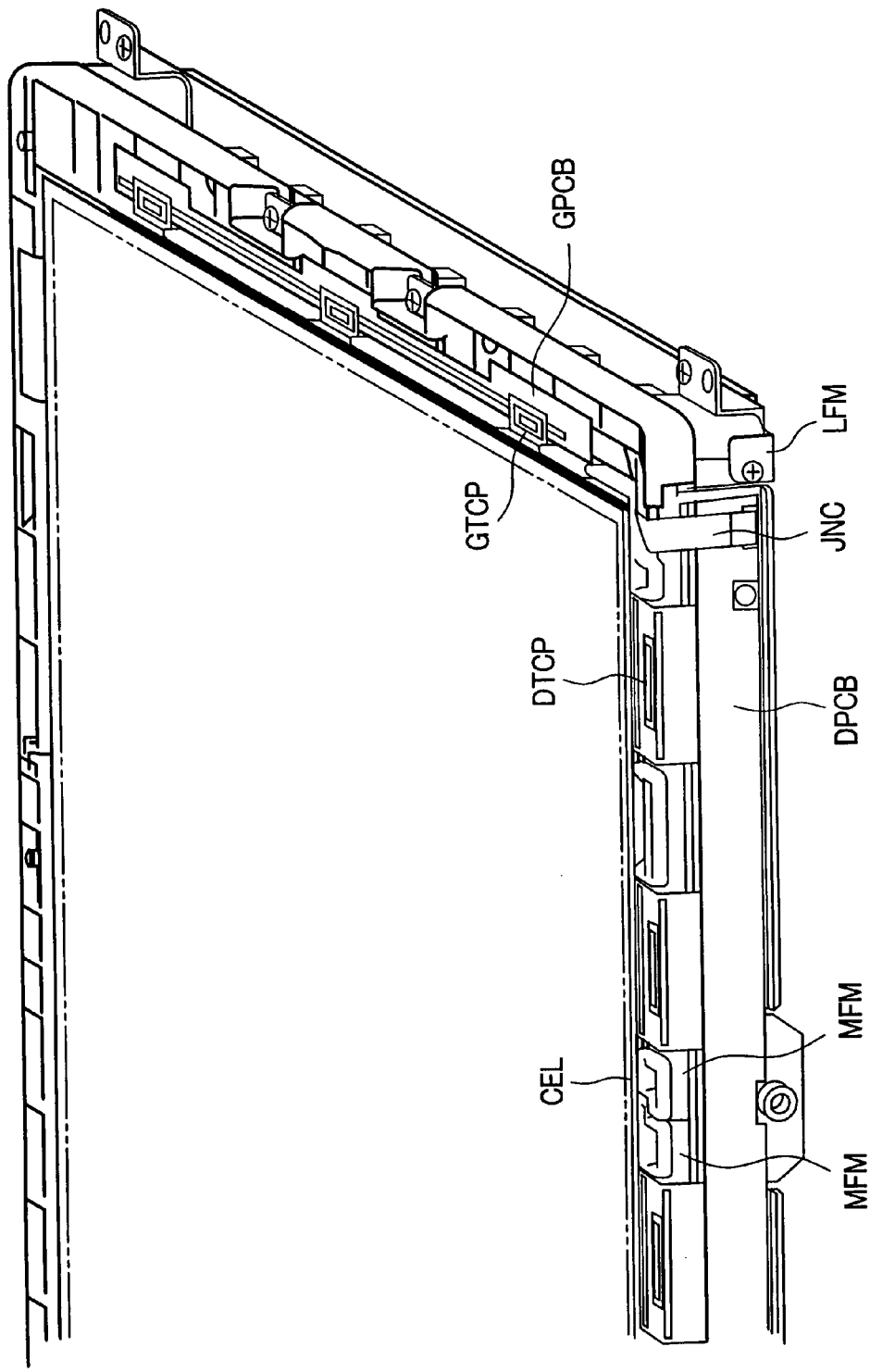
FIG. 32 is a perspective view of the module of the display device in a state that the upper frame is removed.

FIG. 32 is a perspective view focusing on the left upper corner portion shown in FIG. 31. A signal from the drain printed circuit board DPCB is applied to the DTCP and the video signal is applied to the display element CEL. A signal from the gate printed circuit board GPCB is applied to the GTCP and the gate signal is applied to the display element CEL. The drain printed circuit board DPCB and the gate printed circuit board GPCB are connected with each other by the joiner JNC. Due to such a constitution, compared to the case in which the gate printed circuit board GPCB is directly connected from the controller TCON, it is possible to reduce the distance of the joiner JNC and hence, the constitution which is resistant to noises can be provided.

<<Fixing of Upper and Lower Frames>>

Figure 33:
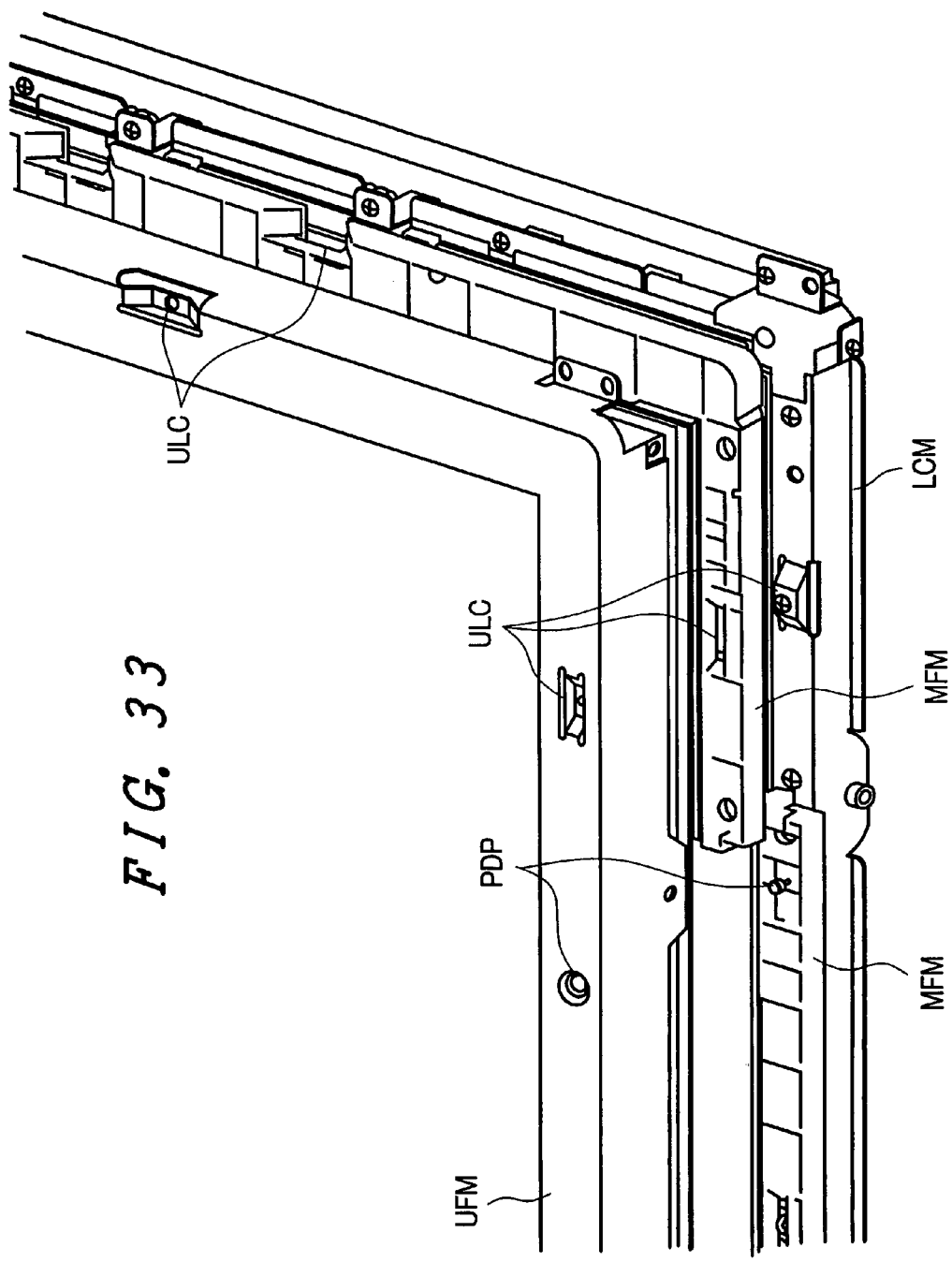
FIG. 33 is a perspective view for explaining the fitting relationship of the upper frame, an intermediate frame and a lower frame.
Figure 34:
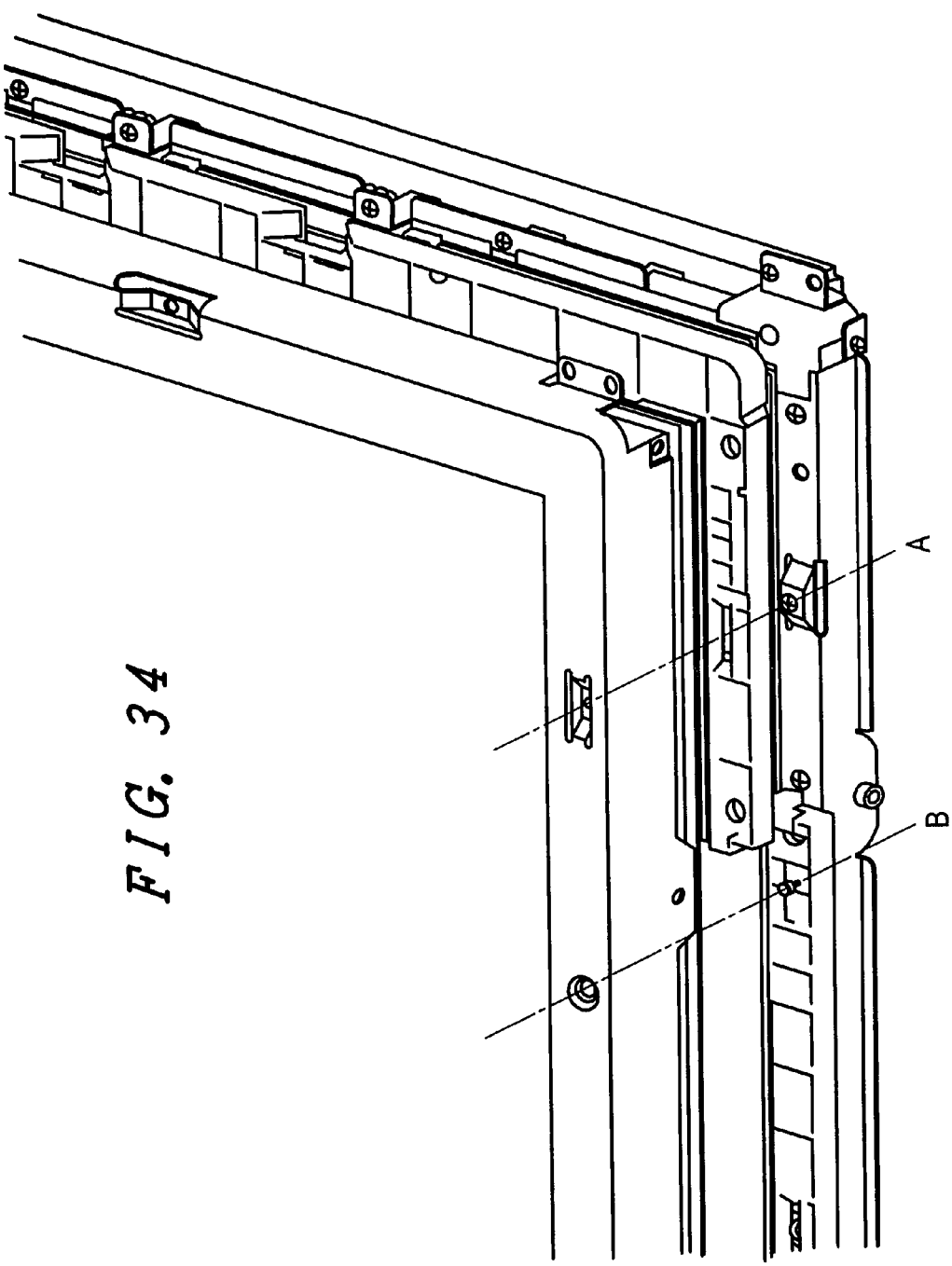
FIG. 34 is a perspective view for explaining the fitting relationship of the upper frame, the intermediate frame and the lower frame.

Next, the explanation is made with respect to the upper and lower frame connecting portions ULC and positioning portions PDP. FIG. 33 is a perspective view showing an exploded state of the upper frame UFM, the intermediate frame MFM and the lower frame LFM. In the upper and lower frame connecting portions ULC, the upper frame UFM has projecting portions on a lower side thereof, the lower frame LFM has projecting portions on an upper side thereof, and hole portions are formed in the intermediate frame MFM. With respect to the positioning portions PDP, the intermediate frame MFM has projecting portions which are projected to the upper frame UFM or the lower frame LFM and hole portions are formed on the projection-side frame. This constitution is explained in more detail. The upper and lower frame connecting portions ULC which constitute an A line portion in FIG. 34 and the positioning portions PDP which constitute a B line portion in FIG. 34 in a fitting engagement state of the display device are respectively explained in conjunction with FIG. 35 and FIG. 36.

Figure 35A:
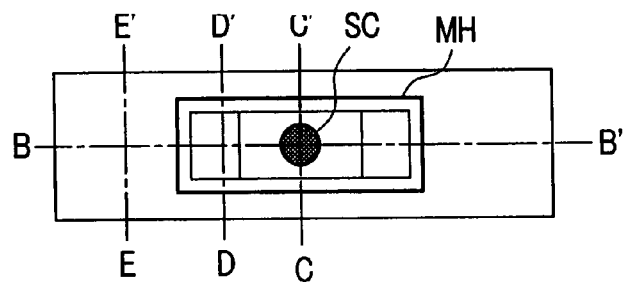
FIG. 35A to FIG. 35E are views for explaining the fitting relationship at a portion A in FIG. 34 in more detail.

FIG. 35A is a planar schematic view of the upper and lower frame connecting portions ULC. Symbol MH indicates hole portions formed in the intermediate frame MFM and symbol SC indicates fixing screws.

Figure 35B:
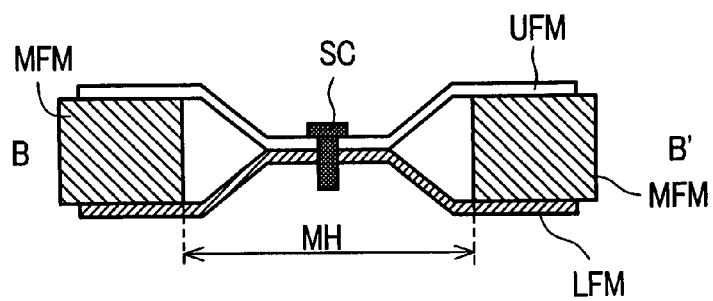

FIG. 35B is a cross-sectional view taken along a line B-B' in FIG. 35A. In the upper and lower frame connecting portions ULC, the upper frame UFM projects downwardly and the lower frame LFM projects upwardly. The holes MH are formed in the intermediate frame MFM and the upper frame UFM and the lower frame LFM are directly brought into contact with each other through the holes MH. Due to such a constitution, the upper and lower frames can ensure the direct contact with a large area with respect to the screw SC. By directly connecting the upper frame UFM and the lower frame LFM using the screw SC, the firm fixing can be realized. Further, since the upper frame UFM and the lower frame LFM are brought into direct contact with each other in a wide area around the screw SC, it is possible to ensure the further fixed connection.

Figure 35C:
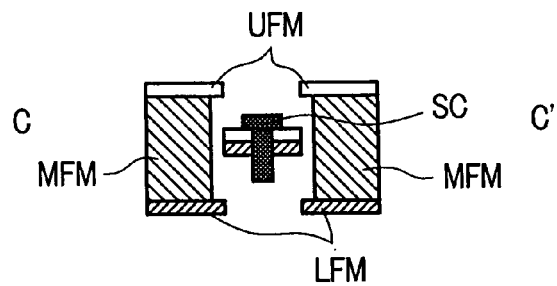
Figure 35D:
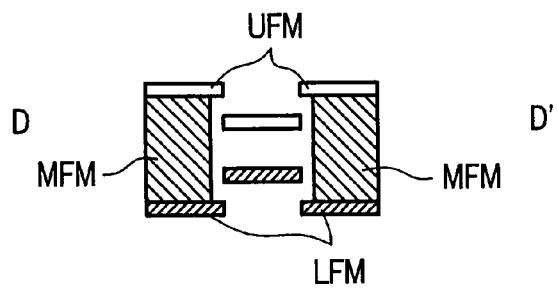
Figure 35E:
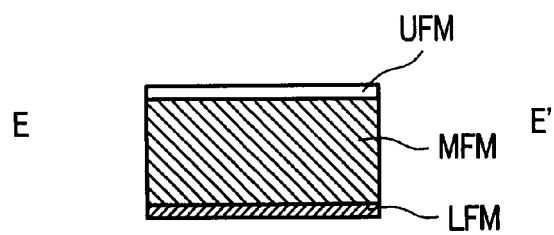

FIG. 35C is a cross-sectional view taken along a C-C' line portion in FIG. 35A and shows that the upper frame UFM projects downwardly and the lower frame LFM projects upwardly. FIG. 35D is a cross-sectional view taken along a D-D' line portion in FIG. 35A and shows a region in a state that the upper frame UFM and the lower frame LFM are separated from each other. FIG. 35E is a cross-sectional view taken along a E-E' line portion in FIG. 35A and shows that the upper frame UFM is arranged above the intermediate frame MFM and the lower frame LFM is arranged below the intermediate frame MFM.

Figure 36A:
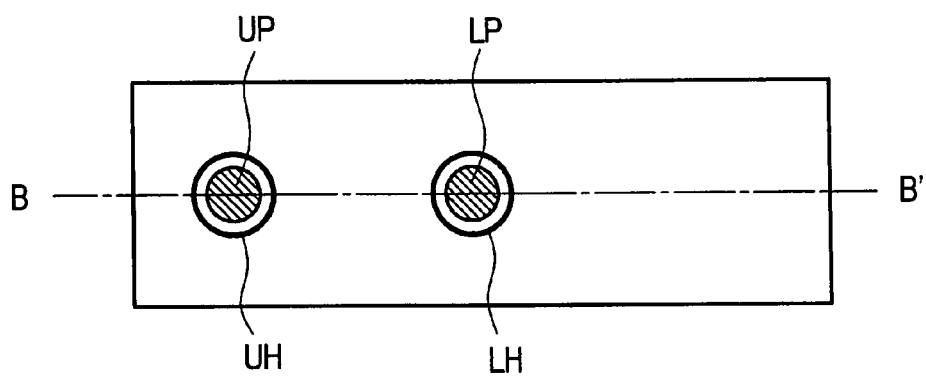
Figure 36B:
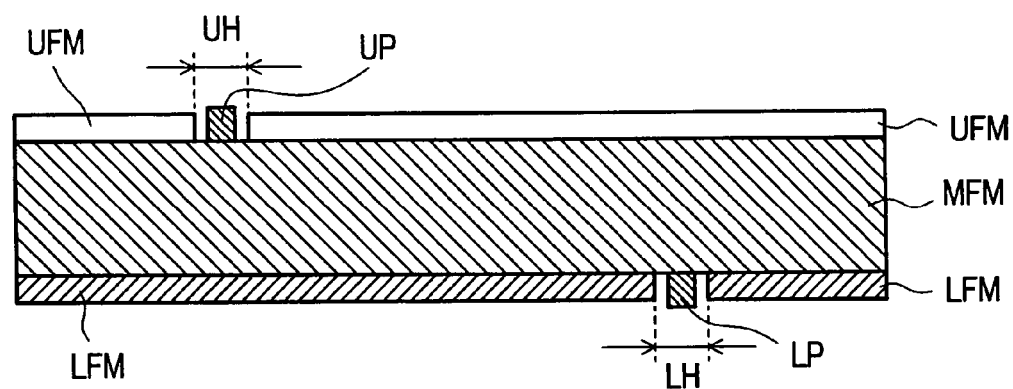

FIG. 36A and FIG. 36B are explanatory views related to the positioning portions PDP, wherein FIG. 36A is a perspective plan view and FIG. 36B is a cross-sectional view taken along a line B-B' line portion in FIG. 36A. An upper projecting portion UP is integrally formed on the intermediate frame MFM. This upper projecting portion UP can realize the positioning or the alignment of the upper frame UFM with respect to the intermediate frame MFM together with a hole UH formed in the upper frame UFM. Further, a lower projecting portion LP is integrally formed on the intermediate frame MFM. This lower projecting portion LP can realize the positioning or the alignment of the lower frame LFM with respect to the intermediate frame MFM together with a hole LH formed in the lower frame LFM.

As shown in FIG. 36A, the hole UH formed in the upper frame UFM and the hole LH formed in the lower frame LFM are formed in positions which are different in plane. This provision is provided to release an undesired force or stress which may arise at the time of connecting the upper frame UFM and the lower frame LFM by displacing the positions of the hole UH formed in the upper frame UFM and the hole LH formed in the lower frame LFM thus ensuring the firm connection of the upper frame UFM and the lower frame LFM. Further, it is also possible to obtain an advantageous effect that a resonance point is also dispersed in the upper frame UFM and the lower frame LFM so that the generation of the resonance sound can be prevented.

<<Intermediate Frame>>

Figure 37:
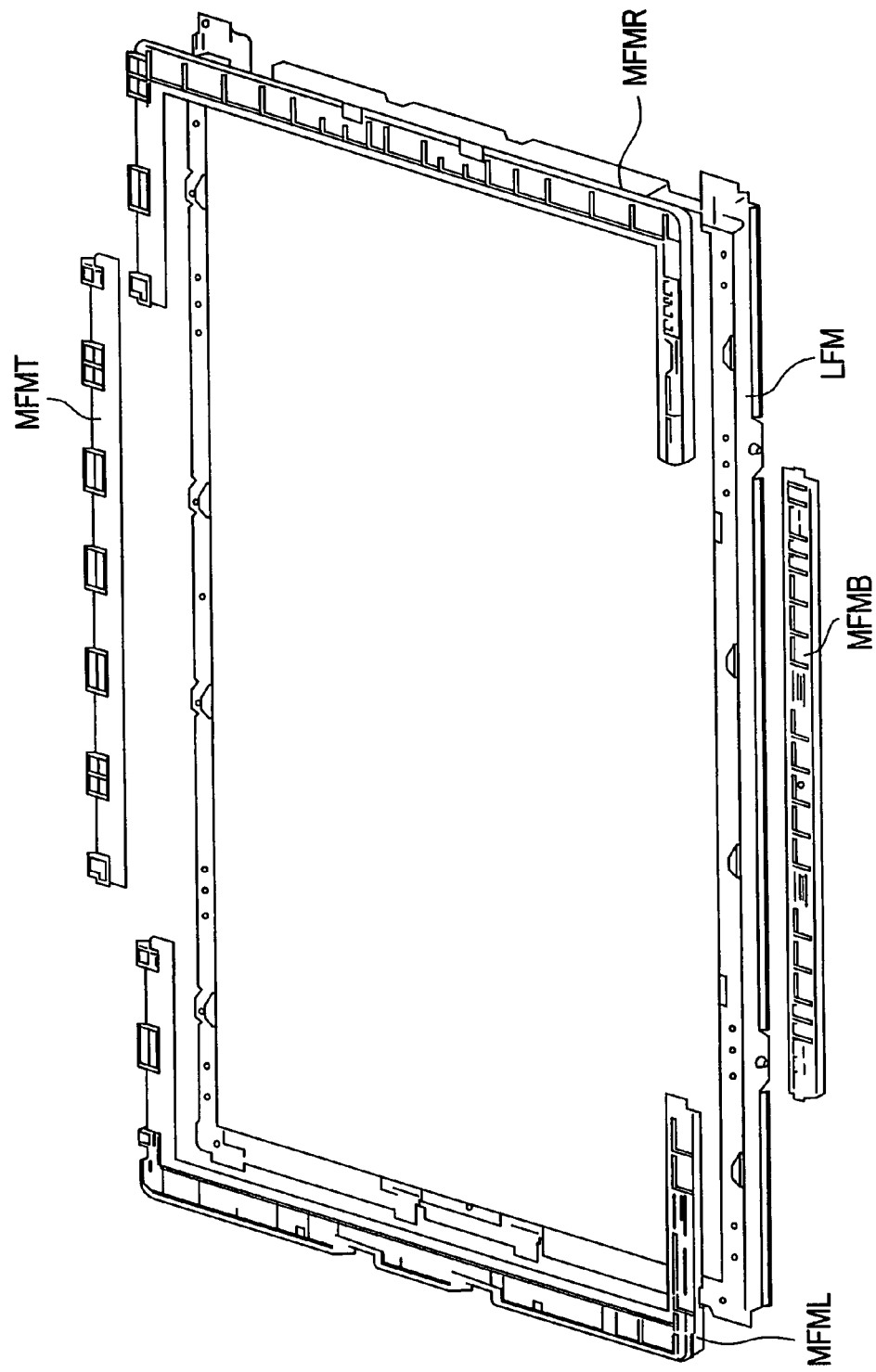
FIG. 37 is an exploded perspective view showing the parts constitution of the intermediate frame.

The intermediate frame MFM is formed of a resin-made member. Further, as shown in FIG. 37, the intermediate frame MFM is divided into four members consisting of a right intermediate frame MFMR, a left intermediate frame MFML, an upper intermediate frame MFMT and a lower intermediate frame MFMB. These four members are formed independently from each other. Further, the respective members are individually connected to the lower frame LFM. The direct fixing of the divided intermediate frames MFM are not performed.

In the large-sized module, it is difficult to manufacture the resin members with high accuracy. Further, even when the ideal shape is ensured in an initial stage, due to the expansion and the contraction which occur due to the temperature change, the shape is displaced from a shape which is intended. This displacement of the shape applies to the display element CEL and becomes a cause of deterioration of the display quality of the display element CEL. Further, this gives rise to generation of a stress and deterioration of a vibration-resistant characteristic of the module.

Accordingly, by dividing the resin-made intermediate frame MFM in four and by preventing the divided intermediate frames from being directly fixed to each other, a size of the intermediate frame MFM per each member can be made small whereby the intermediate frame MFM which can minimize the influence of the expansion and the contraction attributed to heat can be manufactured with high accuracy. Further, the respective intermediate frames MFM are directly fixed to the metal-made lower frame LFM from the intermediate frame MFM side using the screws. Since the lower frame LFM is made of metal, the lower frame LFM can be manufactured with accuracy and receives the least change of shape attributed to the temperature change. Accordingly, it is possible to maintain the position of the intermediate frame MFM with high accuracy. In the above-mentioned upper and lower frame connecting portions ULC, by directly fixing the upper frame UFM to the lower frame LFM through the hole portion formed in the intermediate frame MFM from the upper frame UFM side using the screw, the direct firm fixing between the intermediate frame MFM and the upper frame UFM is not provided. That is, both of the intermediate frame MFM and the upper frame UFM are directly fixed to the lower frame LFM, the reference of the position can be unified to the lower frame LFM and hence, it is possible to manufacture a module having the firm structure with high accuracy. This structure is the structure which is extremely suitable for a display device having a large size such as a large-sized TV set.

Among four-split intermediate frames MFM, both of the intermediate frame MFMT and the intermediate frame MFMU extend in one direction, that is, the longitudinal direction (long-side direction) of the display device and are formed to have a relatively large length. On the other hand, the intermediate frame MFML and the intermediate frame MFMR are configured to have a shape which extends both of the lateral direction (short-side direction) and the longitudinal direction of the display device, a length of the portion in the longitudinal direction of the display device is made shorter than a length of the portion of the lateral direction. Due to such a constitution, the intermediate frame MFMT and the intermediate frame MFMB can ensure the positional accuracy in the lateral direction of the display element CEL, that is, the positional accuracy in the vertical direction of the display element CEL with high accuracy. Further, the intermediate frame MFML and the intermediate frame MFMR can ensure the positional accuracy in the longitudinal direction of the display element CEL, that is, the positional accuracy in the horizontal direction of the display element CEL with high accuracy. In this manner, by clearly separating the directions that the positional accuracy is realized for every member, it is also possible to ensure the accuracy even when the resin-made members are applied to a large-sized display device and hence, the undesired contraction of the profile size can be prevented.

Further, the intermediate frame MFML and the intermediate frame MFMR have portions thereof extended in the longitudinal direction. To enhance the positional accuracy in the vertical direction, it is desirable that the intermediate frame MFML and the intermediate frame MFMR are not brought into contact with end portions of the substrate of the display element CEL. Accordingly, it is desirable that the horizontal distance between these two intermediate frames and the end portion of the display element CEL at the same height in the vertical direction of the substrate is set longer than the horizontal distance between the intermediate frames MFMT and MFMB and the end portion of the display element CEL at the same height in the vertical direction of the substrate.

The intermediate frames MFM which are arranged close to each other have, as shown in FIG. 33, projecting portions which are displaced from each other. FIG. 38A is a view of the intermediate frames MFM in an assembled state as viewed from above. The intermediate frame MFMR and the intermediate frame MFMB have projecting portions thereof in the horizontal direction meshed with each other. Due to such a constitution, the assembly of the intermediate frame MFM is facilitated. Further, in the vicinity of the fitting portion, the intermediate frame MFMR and the intermediate frame MFML are respectively individually and directly fixed to the lower frame LFM using the screw SC. Due to such a constitution, the accuracy of end portions of the respective intermediate frames MFM can be realized. With respect to the respective intermediate frames MFM, by directly fixing the intermediate frames MFM to the lower frame LFM from the intermediate frame side at a plurality of portions using the screws S, the connection can be reinforced and, at the same time, the operability at the time of assembling the module can be enhanced by unifying the fixing with screws to the fixing from the upper side as in the case of the screw connection at the upper and lower frame connecting portions ULC. The similar shapes can be observed with respect to the fitting portion of the intermediate frame MFMB and the intermediate frame MFMR shown in FIG. 39A.

The intermediate frame MFM increases a resin thickness thereof only at portions thereof which requires the increase of the thickness and reduces the resin thickness at other portions. Due to such a provision, the intermediate frame MFM becomes light-weighted. The shape of the intermediate frame MFM can be freely set on demand by resin injection molding which uses a mold.

<<Transmission of Signals to Drain Printed Circuit Board>>

FIG. 38B is a view which is obtained by observing a lower side surface of FIG. 38A.

In FIG. 38B, a drain printed circuit board DPCB1 is arranged. Signals from the drain printed circuit board DPCB1 are supplied to a drive circuit (driver element) DRV on a tape carrier TCP and video signals are generated. The video signals are supplied to a video signal terminal of the display element CEL from an output terminal of the tape carrier TCP. A drive circuit may be directly mounted on the display element CEL or the drive circuit may be directly formed on the display element CEL using the TFT.

The drain printed circuit board DPCB1 is fixed to the lower frame LFM using screws SC. At the same time, when the GND of the drain printed circuit board DPCB1 and the lower frame LFM are electrically connected with each other by such fixing, the stable GND potential can be realized.

Two joiners are connected to the drain printed circuit board DPCB1 from the controller printed circuit board side. The joiner (A) JNA has a large width and a small number of layers. For example, the joiner (A) JNA is constituted of a joiner having one conductive layer. The joiner (B) JNB has a narrow width and a large number of layers. For example, the joiner (B) JNB is constituted of a joiner having two conductive layers. The joiner (A) JNA is preferably provided for supplying the gray scale power source or the power source of the video signal drive circuit. On the other hand, the JNB is preferably provided for transmitting the various kinds of signals such as clocks or the display data because the transmission of the high frequency signal can be performed by increasing the conductive layers. It is possible to adopt the best joiner and realize the high performance and low cost by separating the joiners using the signal voltages and the power source voltages in this manner. Further, it is possible to obviate the interference of the signals and the power source so that the reduction of the noise at transmitting signals and the stabilization of the power source can be enhanced.

Figure 41A:
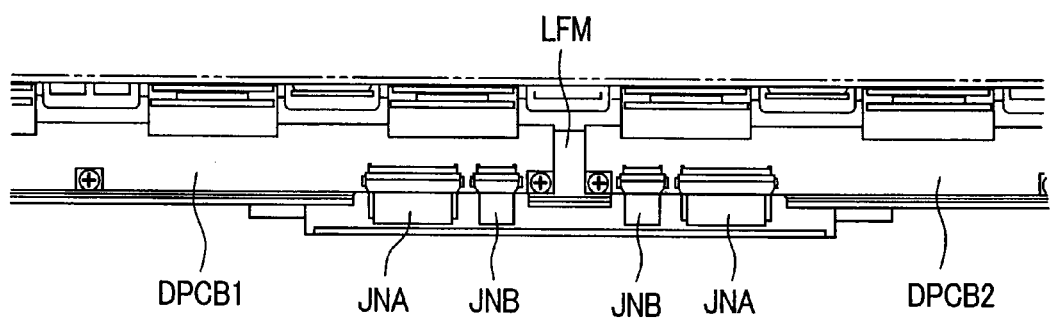
FIG. 41A and FIG. 41B are explanatory views of a divided drain printed circuit board.

FIG. 41A shows the relationship between the drain printed circuit board DPCB1 and the drain printed circuit board DPCB2. Two drain printed circuit boards DPCB1, DPCB2 are independent from each other, and are respectively fixed to the lower frame LFM. The drain printed circuit boards DPCB are constituted of printed circuit boards, and hence, in a large-sized display device, it gives rise to a drawback on the reliability such that the accuracy and the deformation of the printed circuit board per se become causes of the drawback on the image quality as they apply the stress to the display element CEL or the stress is applied to the tape carrier TCP and it becomes a cause of the disconnection. Compared to the case in which drain printed circuit boards DPCB are formed of one large-sized printed circuit board, such a possibility can be reduced by dividing the drain printed circuit board DPCB into a plural number of boards. In the structure shown in FIG. 41A, two drain printed circuit boards DPCB are respectively and directly fixed to the lower frame LFM by the screw SC. Due to such a constitution, drain printed circuit boards DPCB are maintained in a high accuracy.

The joiner(A) JNA and the joiner(B) JNB are formed on both of the drain printed circuit boards DPCB1, DPCB2. Here, both joiners(A) JNA are arranged to be positioned inside both joiners(B) JNB. This is because by allowing the extending distances of JNB containing high frequency signals such as clocks on the respective drain printed circuit boards DPCB to coincide with each other, the waveform dullness and the influence of noises can be made equal whereby the timing control can be facilitated.

Figure 41B:
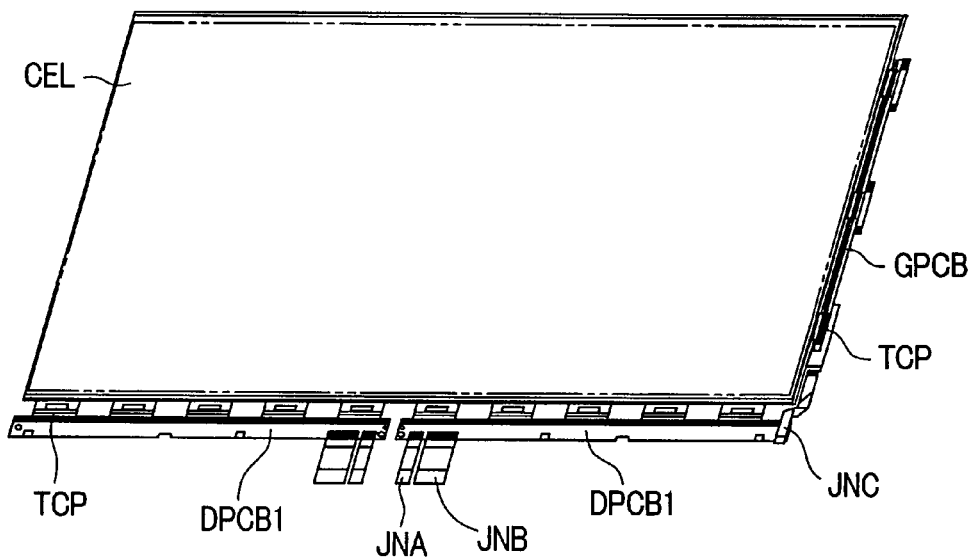

FIG. 41B is a view for showing the state of the display element CEL before the display element CEL is fixed to the lower frame LFM. The drain printed circuit boards DPCB have a width wider than the width of the gate printed circuit board GPCB since the drain printed circuit boards DPCB have many kinds of voltages to be transmitted and complicated signals. Accordingly, in view of the contraction of a profile size out of the display region, the drain printed circuit boards DPCB are bent and arranged to the side surface or the back surface as shown in FIG. 41A, on the other hand, the gate printed circuit board GPCB can be arranged to one end portion of the display element CEL without being bent. Here, it is preferable that the drain printed circuit boards DPCB are bent to the side surface and fixed to the lower frame, LFM other than the drain printed circuit boards DPCB are bent to the back surface. This is because the leaked electric field from the drain printed circuit boards can be sealed on the metal made upper frame UFM which is disposed outside the drain printed circuit boards in an assembled state.

<<Inverter Cable>>

Figure 39A:
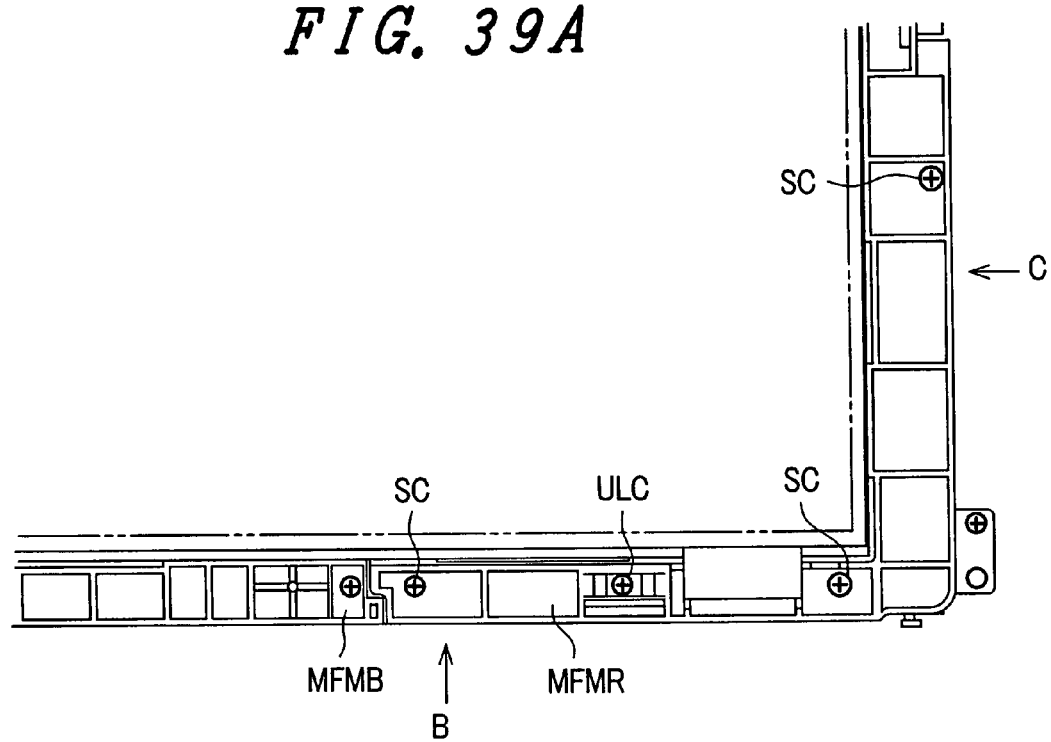
FIG. 39A to FIG. 39C are a front view and side views of one corner portion of the module in a state that the upper frame is removed.
Figure 39B:
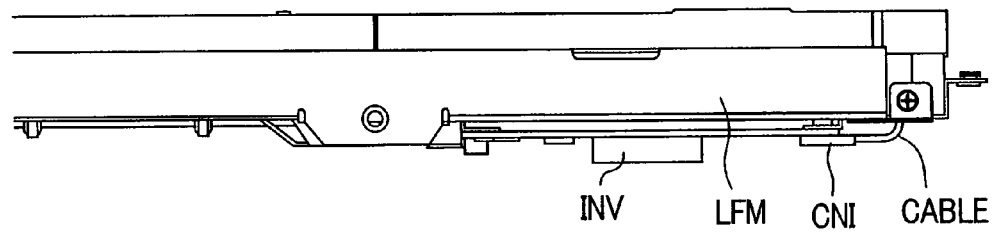

FIG. 39B is a side view obtained by observing the FIG. 39A from the lower side. In the drawing, an inverter (transformer) INV is arranged on the inverter printed circuit board (on the high voltage side). The output at the high voltage side from the connector CNI is supplied to the light source by the cable.

Figure 39C:
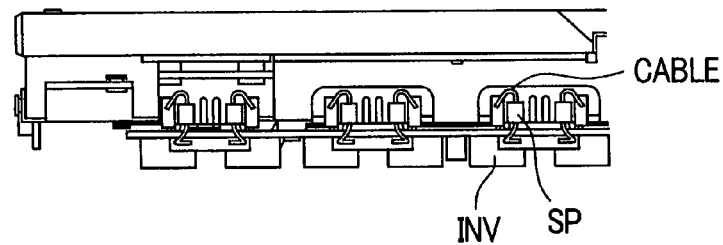

FIG. 39C is a side view observed from the right side of FIG. 39A. In the drawing, the output from the inverter is supplied to the light source by the cable CABLE. Here, the cables CABLE are arranged in plural numbers corresponding to the number of the light sources and hence, it contributes to the enhancement of the productivity by surely and easily performing the fixing. Further, when the cable CABLE is not fixed, the parasitic capacitances become different for respective cables CABLE and this difference in parasitic capacitance becomes a cause of the brightness irregularities for every light source and also becomes a cause of the disconnection of the cable per se.

Figure 40:
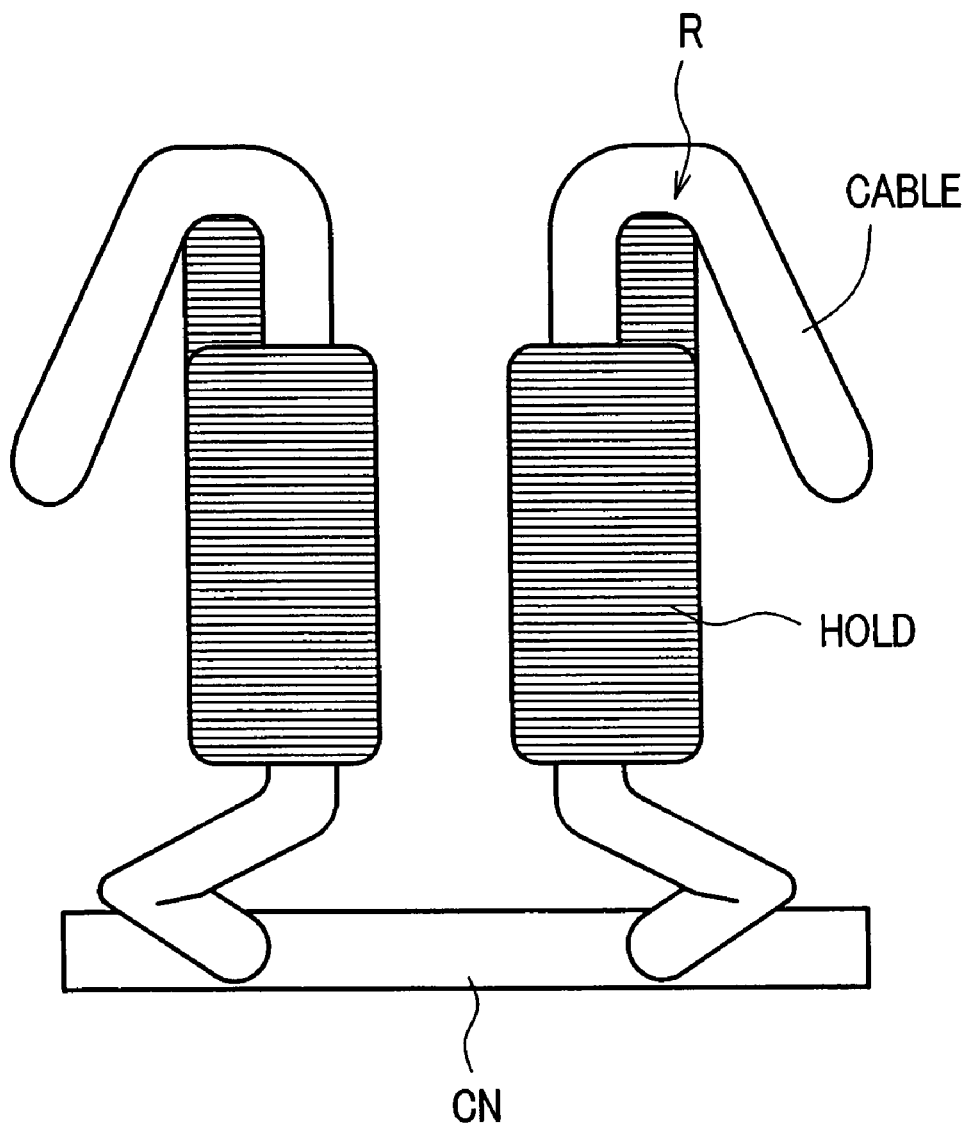
FIG. 40 is a view for explaining the holding structure of a cable.

As shown in FIG. 39C, the cable CABLE is fixed to the dedicated holding portion. The holding portion is shown in FIG. 40. The holding portion is integrally formed with a side mold SM (described later) and is made of resin. The cable CABLE from the connector CN is arranged to the region which is surrounded by the side surface of the side mold SM and a holding member HOLD. The movement of the cable CABLE in the front-to-rear direction is restricted as shown in FIG. 40. Further, the cable CABLE is arranged along the R portion having the circular shape formed above the holding member HOLD. The cable CABLE is again made to return to the lower side from the R portion and is connected with the light source. Due to such a constitution, the movement of the cable CABLE in the vertical direction in the drawing is restricted.

The fixing is realized by simply fitting the cable into the holding portion having such a simple constitution.

<<Cross-Sectional Structure of Module as a Whole>>

Figure 42A:
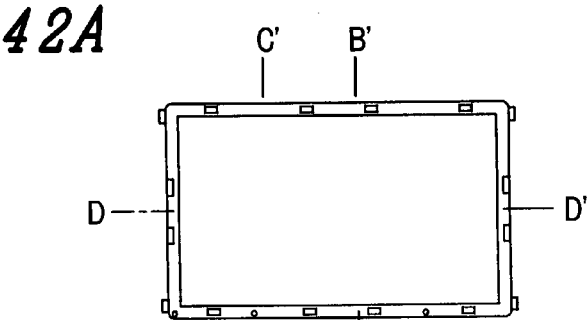
FIG. 42A to FIG. 42D are explanatory views showing the schematic cross-sectional structure of the module of the display device.
Figure 42B:
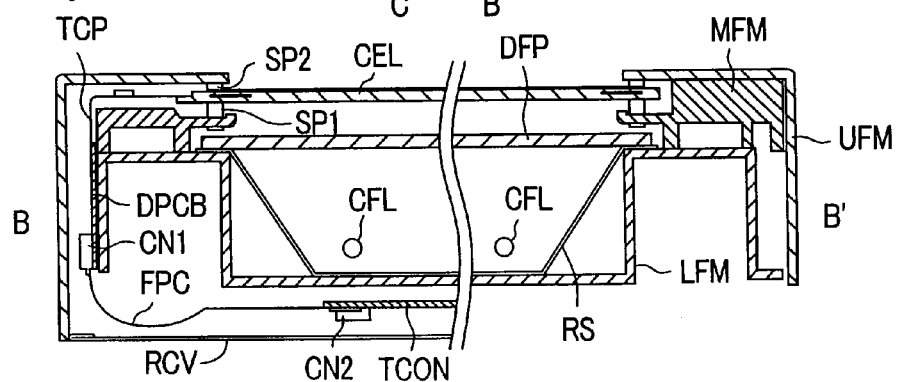

FIG. 42B is a cross-sectional view taken along a line B-B' in FIG. 42A. The upper frame UFM is arranged on the display element CEL by way of spacers SP2. These spacers SP2 are formed of a member having resiliency such as rubber, for example. The upper frame UFM extends around the display element CEL and, thereafter, bends along a side surface of the display element CEL. A video signal line driving circuit DD is arranged on the left side of the drawing. A tape carrier TCP is connected to a terminal of the substance SUB1 of the display element CEL and this tape carrier TCP is connected to the drain printed circuit board DPCB. The joiner FPC is connected to the connector CN1 on the drain printed circuit board DPCB and the joiner FPC is connected to the connector CN2 of the controller TCON (circuit board) and hence the power source voltage and various kinds of signals are supplied to the display element CEL. An intermediate frame MFM is arranged below the display element CEL by way of spacers SP1. The lower frame LFM is arranged below the intermediate frame. The lower frame LFM is formed of an approximately planer plate in a region below the display element CEL and is raised upwardly at the peripheral portion of the display element CEL and is extended again horizontally to form a contact surface with the intermediate frame MFM. Subsequently, the lower frame LFM is bent downwardly again to form a fixing portion to which the drain printed circuit board DPCB is fixed and, at the same time, to ensure the rigidity of the module as a whole.

A light source CFL is arranged between the display element CEL and the lower frame LFM. A reflection sheet RS which reflects the light from the light source is arranged between the light source CFL and the lower frame LFM. A white plastic sheet, for example, can be used as a reflection sheet RS. The reflection sheet RS is bent in the oblique direction at a peripheral portion thereof and is raised upwardly. Thereafter, the reflection sheet RS is extended horizontally and is pressed by a diffusion plate DFP which is stacked on the reflection sheet RS. The diffusion plate DFP is, for example, formed of a while plastic plate and diffuses the light from the light source CFL and so as to make the brightness difference between a region which includes the light source and a region which does not include a light source uniform. Furthermore, a condensing sheet such as a prism sheet, a diffusion sheet and the like are arranged on demand between the diffusion plate DFP and the display element CEL.

Figure 42C:
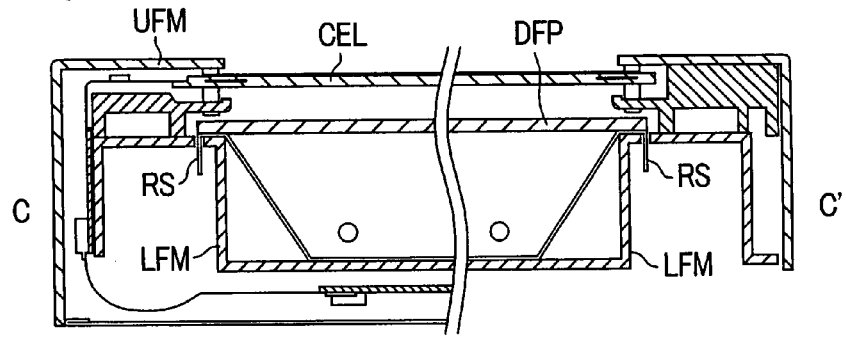

FIG. 42C is a cross-sectional view taken along a line C-C' in FIG. 42A. Although FIG. 42A shows the cross-section on the same side as FIG. 42B, FIG. 42C explains a portion at a displaced position. The constitutional feature which makes the constitution shown in FIG. 42C different from the constitution shown in FIG. 42B lies in that a hole is formed in a portion of the lower frame LFM arranged below the intermediate frame MFM and an end portion of the reflection sheet RS is fitted into the hole. This constitutional feature enables the extremely simple and reliable positioning of the reflecting sheet.

Figure 42D:
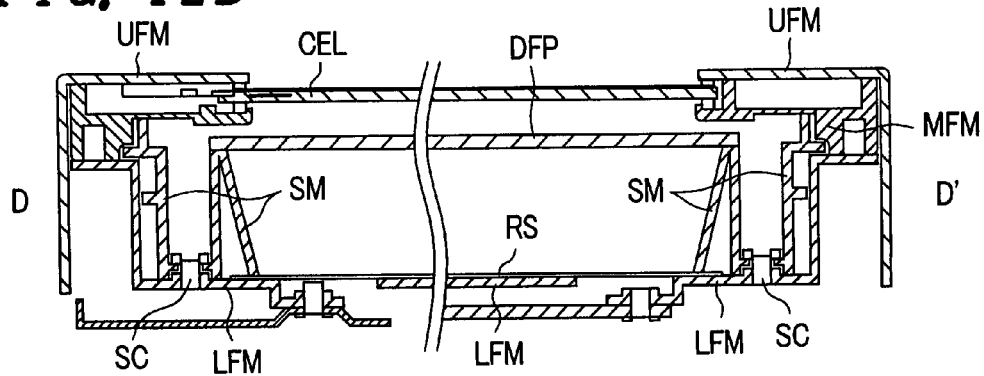

FIG. 42D is a cross-sectional view taken along a line D-D' in FIG. 42A. In this direction, it is necessary to pull out many cables from the light source CFL. Resin-made side molds SM are arranged for this purpose. Each side mold SM is fitted from the upper side to the lower frame LFM with screws SC. Here, the principle which uses the lower frame as the reference is also strictly observed thus realizing high accuracy. Here, by sandwiching the end portion of the reflection sheet RS between the lower frame LFM and the side mold SM, the fixing of the reflection sheet RS is realized simultaneously with the fixing of the side mold SM to the lower frame LFM. On the left side of the drawing, a gate printed circuit board GPCB which is connected with the display element CEL using the tape carrier TCP is described.

Figure 43A:
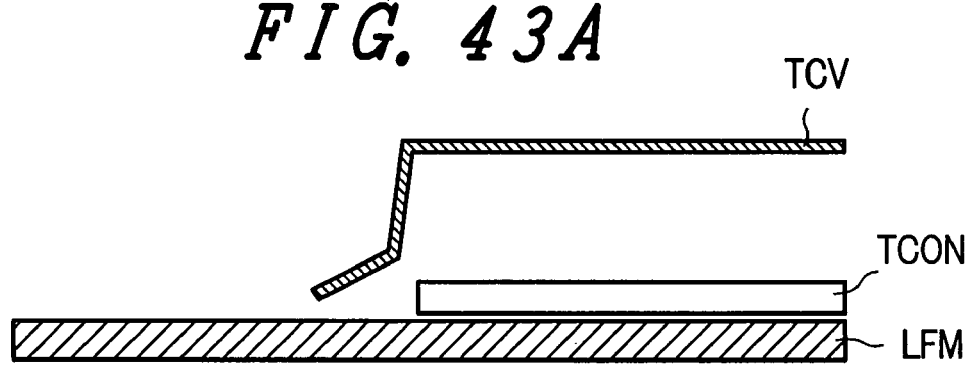
FIG. 43A to FIG. 43C are explanatory views of a fixing method of a cover of a display device.
Figure 43B:
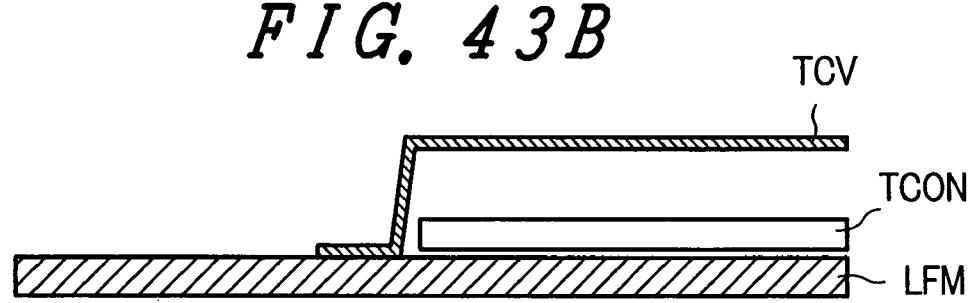
Figure 43C:
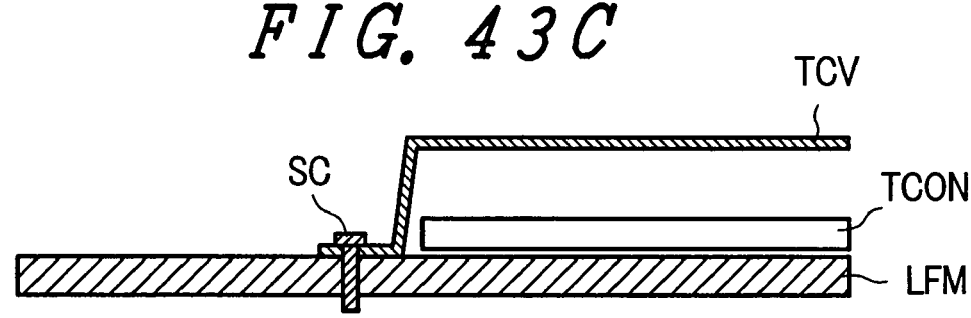

FIG. 43A and FIG. 43B are views showing the fixing of the TCON cover TCV which shields the controller printed circuit board TCON and the lower frame LFM. FIG. 43A shows the constitution before fixing and the end portion of TCB is bent towards the side of lower frame LFM. As shown in FIG. 43B, pressing the end portion to the lower frame LFM, the lower frame LFM and the TCON cover TCV are fixed by screws SC in this condition. This fixing brings the TCON cover TCV and the lower frame LFM into contact with each other and allows both of them to become conductive with each other not only at the screws but also at a large area of the TCON cover TCV whereby it is possible to enhance the effect to shield the electric field leaked from the controller TCON (substrate) by the TCON cover TCV. The existence of this provision can be determined based on whether a side which is bent in the direction toward the lower frame is present on an end portion of the TCON cover TCV or not when the TCON cover TCV is separated by removing the screws SC of the TCON cover TCV and the lower frame LFM.

The similar constitution is applicable to the inverter cover so as to contribute to the enhancement of the leaked-electric field shielding effect.

<Light Source>

Figure 44A:
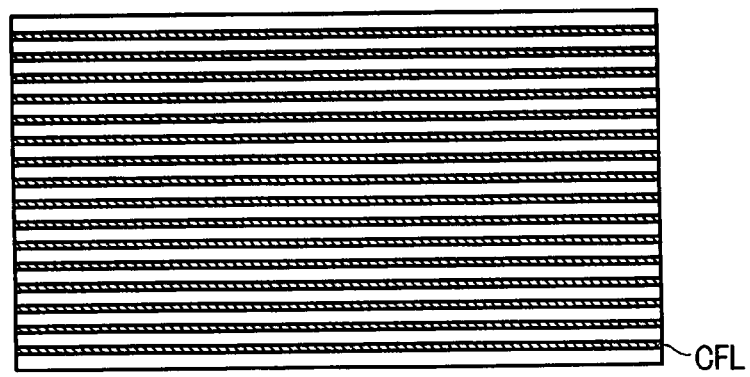
FIG. 44A to FIG. 44D are views showing a constitutional example of a backlight portion.

When the light source has a plurality of fluorescent tubes, the arrangement example of the fluorescent tubes is shown in FIG. 44A. In this manner, in case that a large number of fluorescent tubes are arranged, it is important to achieve the uniformity of the brightness of the fluorescent tubes. Since high frequency and high voltage are applied to the fluorescent tubes, the parasitic capacitance is different depending on the distance between the fluorescent tubes and the metal-made lower frames LFM thus giving the influence to the intensity of the brightness. Accordingly, it is important to maintain the distance between the fluorescent tubes and the lower frame LFM uniform as much as possible.

Figure 44B:
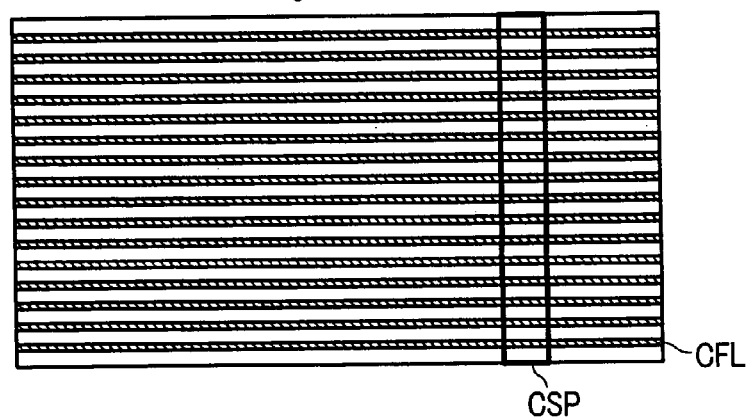
Figure 44C:
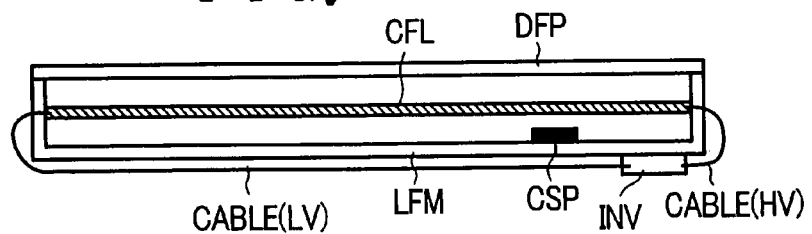

FIG. 44B is a view showing an example of the arrangement of the common spacer CSP such that the common spacer CSP longitudinally crosses the plurality of fluorescent tubes. As an example, by using rubber as the material, the shape can be formed freely and the placing operation can be made easily. Further, the same members are collectively arranged to the plurality of light sources, the distance between the fluorescent tubes and the lower frames can be easily set to the value which is more than the value which is set by the thickness of the common spacer CSP. When the distance between the fluorescent tubes and the lower frame becomes is increased, the degree of influence attributed to the difference in distance is rapidly lowered so that it is important to prevent the fluorescent tubes from being arranged excessively close to the lower frame.

By forming the common spacer CSP using the resilient member such as rubber or sponge, it is possible to obtain an advantageous effect that the rupture of the light source can be prevented when the vibration and the impact are applied to the common spacer CSP.

Figure 44D:
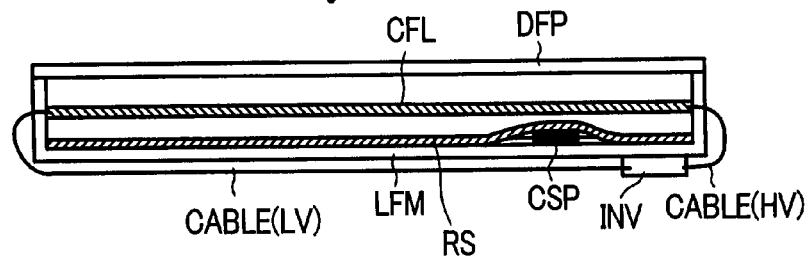

FIG. 44D is a view showing a case that the reflection sheet RS is arranged between the common spacer CSP and the light source. Due to such a constitution, the uniformity of the brightness in the light source CFL extending direction by the common spacer CSP can be improved.

Although the common spacer CSP can be arranged at an arbitrary position, it is desirable to arrange the common spacer CSP at least at high voltage when the light source has a high voltage side and a low voltage side. This is because that the fluctuation of the distance between the light source and the lower frame LFM at a high voltage side has a larger influence on the brightness than at the low voltage side. FIG. 4C and FIG. 4D are views showing an example of an arrangement of a common spacer CSP at least at a high voltage side in a case that when the output from the inverter INV has a high voltage side and a low voltage side, the light source CFL is connected from the high voltage side using a cable CABLE (HV) and the light source CFL is connected from the low voltage side using the CABLE (LV).

Figure 45:
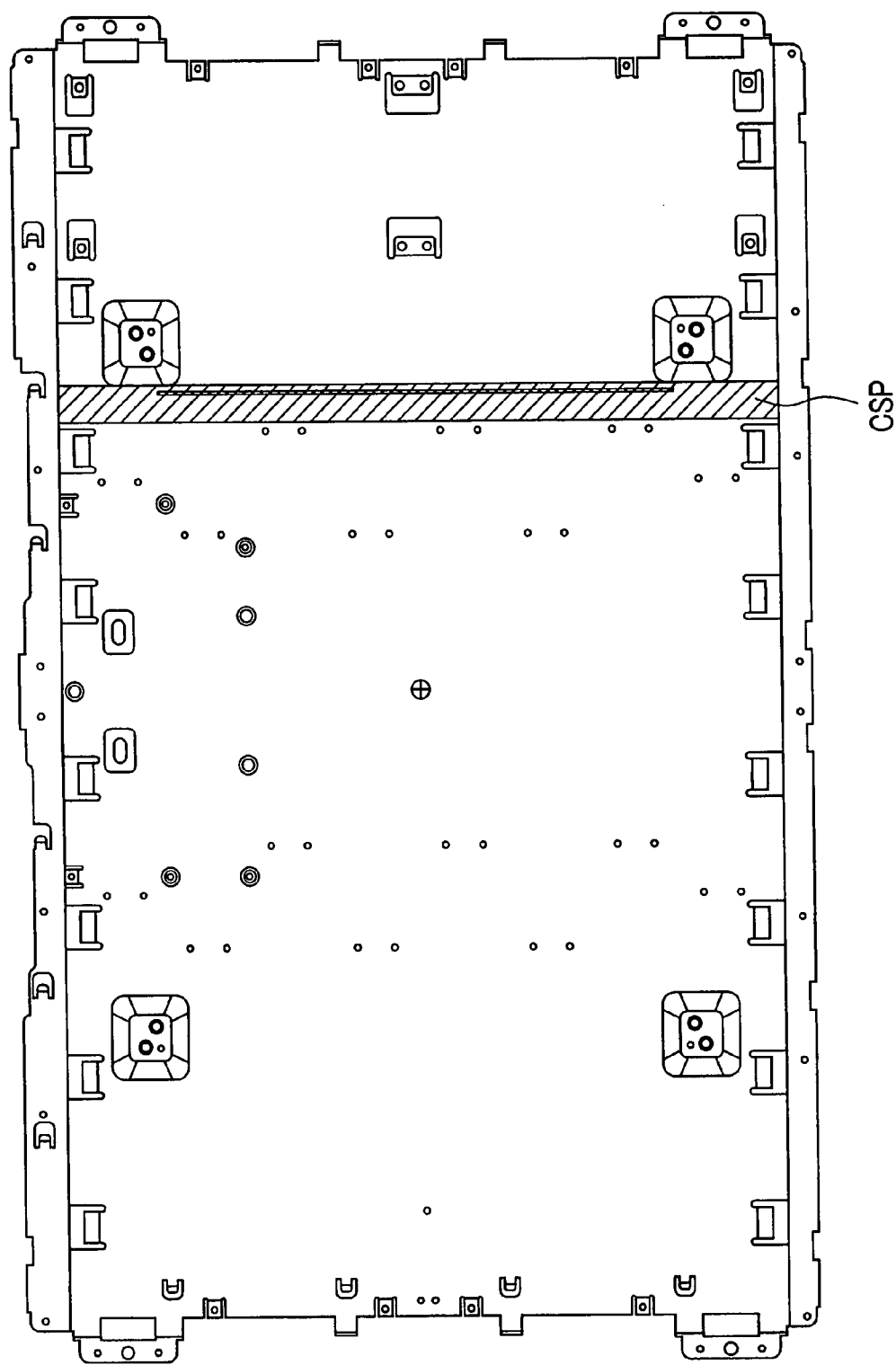
FIG. 45 is an explanatory view of the arrangement positions of common spacers.

FIG. 45 is a perspective view of the back surface showing the positional example of the arrangement of the common spacer CSP in the actual module. FIG. 45 shows the example in which common spacers CSP are collectively arranged in common with the whole light sources such that the common spacers CSP are arranged close to the high voltage side.

<System>

<<γ Characteristics>>

Figure 46:
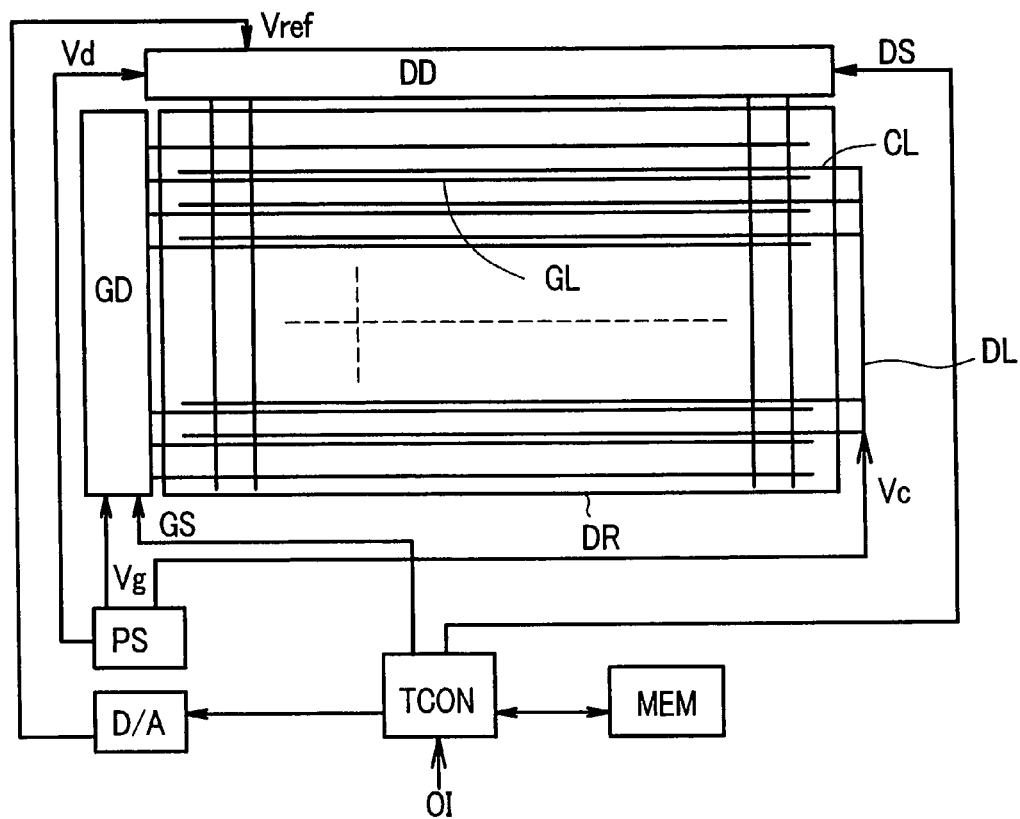
FIG. 46 is a view for explaining a schematic example of a system of the display device.

FIG. 46 is a system constitutional example which can change the γ characteristics indicative of the relationship between the gray scales and the brightness.

Signals from the outside of the display device such as signals of TV, signals of PC, or other various control signals are inputted to the controller CON as the external inputs OI. The controller TCON forms the above-mentioned signals into the signals for making the display elements CEL to perform the image display. These signals are different from each other depending on the display elements CEL and are formed into the signals necessary for the respective display devices. For example, depending on whether the display element CEL is a liquid crystal display device, an EL display device or a FED display device, the signals are formed into signals necessary for the display device. For example, when the display element CEL is the liquid crystal display device, for example, a video signal line drive circuit signal DS is supplied to the video signal line drive circuit DD from the controller TCON, and a gate signal line drive circuit signal GS is supplied to the gate signal line drive circuit GD from the controller TCON. Various voltages Vd for a video signal line drive circuit containing a drive voltage of the circuit per se and a plurality of gray scale reference voltages are supplied to a video signal line drive circuit DD from a power source circuit PS. Various voltages Vg for the gate signal line drive circuit which include a drive voltage of a gate signal line drive circuit per se and the voltage which becomes the reference with respect to a gate voltage are supplied to the gate signal line drive circuit GD. Further, a common signal line voltage Vc is supplied as the common potential of the display element CEL. The video signal is supplied to the video signal line DL from the video signal line drive circuit DD and the gate signal is supplied to the gate signal line GL from the gate signal line drive circuit GD. The potential of the video signal line DL is supplied to the pixel electrode PX in response to the control signal of the gate signal line GL by a switching element TFT provided to the pixel. By driving the liquid crystal molecules by the electric field or the voltage difference between the pixel electrode PX and the common potential Vc, the state of the liquid crystal layer is changed and the image display is realized.

The constitutional feature which makes the constitution shown in FIG. 46 different from the constitution shown in FIG. 26 lies in that although the gray scale reference voltage Vref is also generated in the power source circuit PS in FIG. 26, in FIG. 46, the gray scale reference voltage Vref is generated in the D/A converter D/A in response to the signal from the controller TCON. Accordingly, the Vref can be changed in response to the signal from the controller TCON. Since the video signal line drive circuit DD generates the voltage for every gray scale in response to the Vref, the γ characteristics can be changed by changing the Vref.

In the example of the system shown in FIG. 46, a memory MEM which can supply information to the controller TCON is arranged. The memory MEM can hold the data corresponding to the plurality of γ characteristics as an example. In the table 1, the data corresponding to the three kinds of γ characteristic is stored in the memory MEM as a set of data A, B, C. It is explained that the actual brightness-gray scale characteristics can be changed in response to the plurality of γ data in FIG. 47 and FIG. 48.

TABLE 1

| No. | Data Set |
|---|---|
| 1 | A |
| 2 | B |
| 3 | C |

Figure 47:
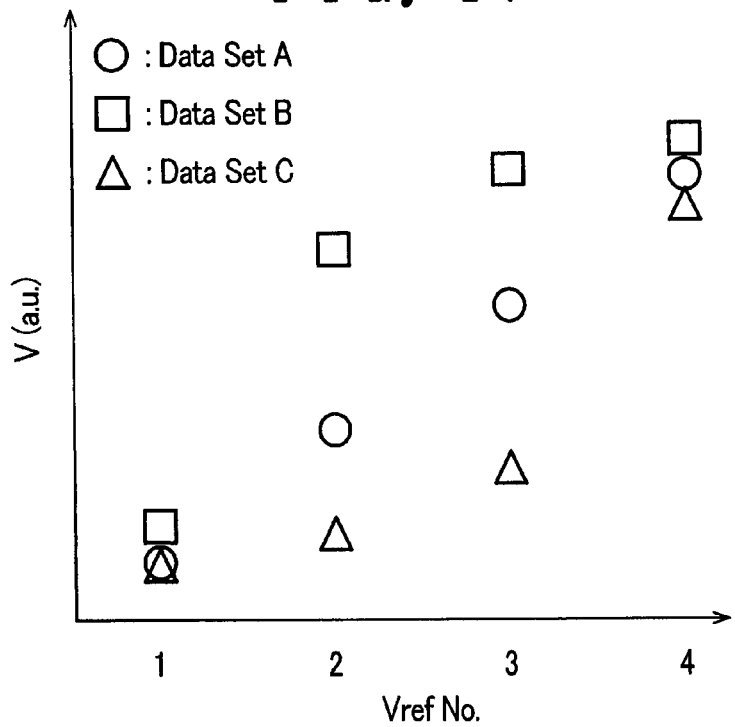
FIG. 47 is an explanatory view showing an example of predetermined values of a data set.
Figure 48:
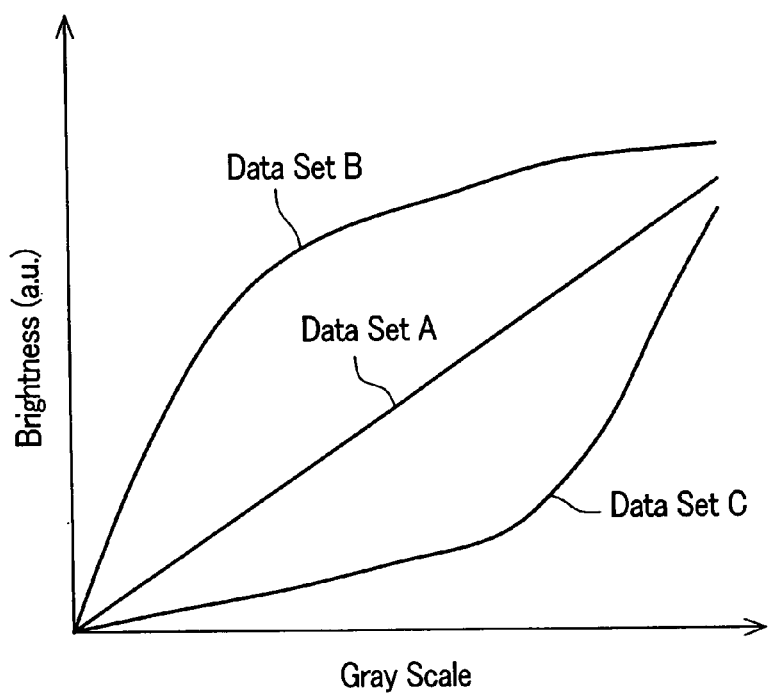
FIG. 48 is an explanatory view showing an example of the relationship between the data set and the gray scale-brightness characteristics.

In FIG. 47, the example of the case which has temporarily four kinds of voltages as the gray scale reference voltage Vref is shown. The voltage values are respectively recorded in the memory MEM corresponding to the data set A, B, C. The controller TCON selects one data set which is used among the data sets and generates the actual gray scale reference voltage Vref corresponding to the data set using the D/A converter D/A. Accordingly, the gray scale-brightness characteristics shown in FIG. 48 have a curve corresponding to the gray scale reference voltage data for every data set. That is, the change of the γ characteristics can be realized.

Figure 49:
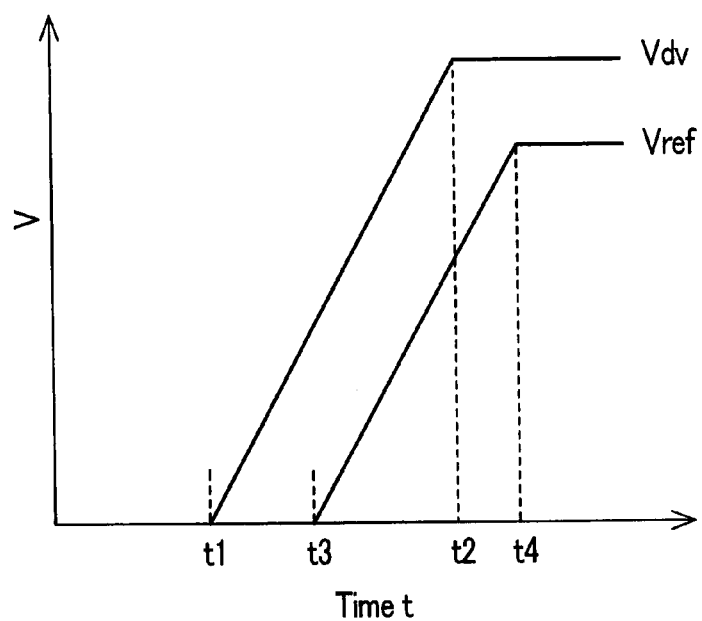
FIG. 49 is an explanatory view of rising sequences of a driver power source and a gray scale reference power source.

At the time of supplying the gray scale reference voltage Vref from the D/A converter D/A to the video signal line drive circuit DD, it is desirable that the gray scale reference voltage is raised at the sequence shown in FIG. 49. In FIG. 49, the axis of abscissas indicates time, and the axis of ordinates indicates voltage. At the time t1, the power source voltage Vdv of the video signal line drive circuit is preliminarily raised and the supply of the gray scale reference voltage Vref from the D/A converter D/A is started at the time t3 before the power source voltage Vdv of the video signal line drive circuit reaches the stationary state. Then, after the Vdv reaches the stationary state at the time t2, the gray scale reference voltage Vref is set to the stationary state at the time t4. When the gray scale reference voltage Vref is generated by a D/A converter D/A, various kinds of gray scale reference voltages are applied to the video signal line drive circuit DD. This is because that the breakdown or the deterioration of dielectric strength of the video signal line drive circuit DD can be prevented in such a case.

<<Manufacturing Information Display>>

Figure 51A:
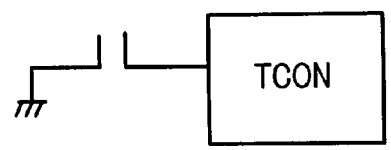
FIG. 51A and FIG. 51B are explanatory views showing an example of a technique for changing over to the information display mode.
Figure 51B:
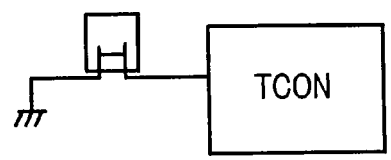

In a display device in which various settings including the change of the γ characteristics are possible, it is important to take measures with which it is possible to recognize what kind of setting is actually taken in the display device. Therefore, in the display device of the present invention, the setting information is made displayable. To be more specific, since the display device includes the display elements CEL, the information is directly displayed on the display elements CEL. One example of a technique for simply switching the information display mode and the normal display mode is shown in FIG. 51. An output from one terminal of the controller TCON is exposed on the controller TCON (substrate) using a first pin. Then, a second pin which is arranged close to the first pin and is connected to the GND potential is prepared. As shown in FIG. 51A, in a state that these two pins are opened, TCON performs a normal display. On the other hand, as shown in FIG. 51B, when these two pins are short-circuited using a short bar, the controller TCON can recognize the request for the information display mode and hence, it becomes possible to switch the operation to the information display mode.

Various examples of the information display screen are shown in FIG. 50A to FIG. 50F. FIG. 50A is an example in which data stored in normal textual information per se is displayed. FIG. 50B shows an example in which the version information or the customer information is displayed. Although FIG. 50A and FIG. 50B are directly displayed by letters, to consider a process control on the manufacturing line, when the information is displayed in patterns rather than letters, the control using the automatic recognition using a machine becomes easier. Accordingly, FIG. 50C shows an example in which a barcode pattern is displayed. In the same manner, as shown in FIG. 50D, a two-dimensional bar code may be displayed.

Further, when the number of types of the information which are configured to be displayed may be small, simply, as shown in FIG. 50E, the information may be displayed by changing the number of strips. This method has an advantageous effect that this display can be easily discriminated by both of a machine and a human. Further, when it is desired to further increase an amount of information, as shown in FIG. 50F, in addition to the number of the strips, the color information of R, G, B may be added. It is possible that the amount of the information which can be displayed is increased to the number of strips×the number of colors used for the method and, at the same time, it is possible to obtain an advantageous effect that the recognition is further facilitated especially for a human.

<<Changeover of Frequency>>

In a display device, there exists a demand for changing of the frequency of image display corresponding to the kinds of the image information which are configured to be displayed. As an example, such request may be occurred at the time of mainly displaying a still image and at the time of mainly displaying a moving image. In FIG. 59, a constitutional example in which the frequency changeover is realized is shown. To the external input OI, except for the normal signal to be inputted, a mode change signal is inputted. The controller TCON temporarily stores the image signal in the inputted signals in the memory MEM. Then, in response to the frequency which is set with respect to the operation mode instructed using the mode signal, the image signal is read out from the memory MEM and the signal is outputted to the video signal line drive circuit DD or the like.

In this constitution, there exists a drawback that the mode change signal is inputted from the outside of the display device. For example, an image process processor in a TV judges the contents of the image and instructs the operation mode to the display device using the mode change signal. In this case, the mode change signal is inputted to the display device at the time when the external processing device judges as necessary. However, when the display frequency of the screen is immediately switched in response to the mode change signal, there arises a drawback such that the writing-in frequency is changed from the middle of the screen thus generating an irregular brightness and the irregular brightness is observed for a moment or excess or deficiency of data within the memory occurs thus disturbing the display.

FIG. 60 is a flowchart for resolving this drawback. When the mode change signal is received by the controller TCON, the controller TCON examines the changeover timings of a plurality of display modes which differ in the frequencies. At this time, when the timings are corresponded with each other, the mode change is performed and, when the timings are not corresponded with each other, it is processed such that the mode change is postponed until the timings are corresponded with each other.

FIG. 61 is a view showing the relationship of the timings at the mode 1 and the mode 2 which differ in the frequencies from the image data from the outside.

From the outside, the image data is inputted as OI, and this image data is sequentially shown in 1, 2, 3 by a frame unit. This implies that the time passes as it goes in the right direction in the drawing. This data is temporarily stored in the memory, is sequentially read out from the memory and is displayed. When assuming that the mode 1 is a mode having a high frequency, the data which are read out from the memory are sequentially displayed as 1, 2, 3, 4. Then, since the frequency is high, the data catches up the input of the image information from the outside. At this time, by using the frame, by operating such as writing in a black screen on the screen or the like, for example, display of the hold type display device such as a liquid crystal display device which is made closer to the display of the impulse type display device can be realized and the display of the moving image can be made in visually high speed. The mode 2 is a mode displaying a screen with the same frequency as the input information and is sequentially displayed as 1, 2, 3 corresponding to the image information from the outside.

As clearly explained in FIG. 61, the timing in which the mode 1 and the mode 2 are corresponded with each other is limited to the timing described as switching timing in the drawing. In the timing rather than the switching timing, irregularity is unavoidably generated in the display image for a moment. Therefore, it is necessary to perform the switching of the display mode at the corresponded timing in the flowchart shown in FIG. 60 or the like and, by this means, for the user who observes the image, a state in which no image irregularity is occurred at the time of changing the mode can be realized.

<Measurement of Resistance of the Connecting Portion>

Figure 52:
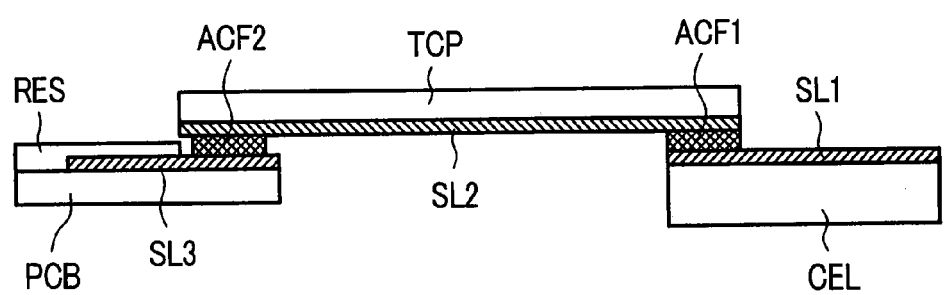
FIG. 52 is an explanatory view showing the connection of a display element CEL, a tape carrier TCP and a printed circuit board PCB.

A passage through which a signal of the printed circuit board PCB is transmitted to the display element CEL in the display element CEL is shown in FIG. 52. The signal line SL3 on the printed circuit board PCB is electrically connected with the signal line SL2 on the tape carrier TCP using the connecting portion ACF2. The signal line SL2 and the signal line SL1 on the display element CEL are electrically connected using the connecting portion ACF1. By using this constitution, the signal is transmitted from the printed circuit board PCB to the display element CEL. At this time, it is favorable that the connection resistance of the connecting portion ACF is measurable using the actual manufacturing. This is because it is useful for the quality management during the manufacturing process. To be more specific, when the connecting portion is an anisotropic conductive film, since the connection resistance is easily changed, the necessity for the management is increased. Then, means for measuring this connection resistance with a reliable accuracy using a product or a wiring pattern which enables the measurement are invented.

Figure 53A:
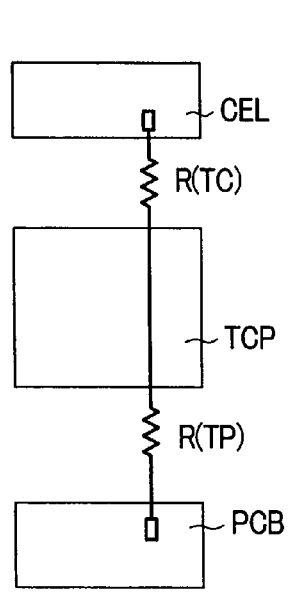
FIG. 53A to FIG. 53C are explanatory views on the measurement of the connection resistance between the tape carrier TCP and a printed circuit board PCB.
Figure 53B:
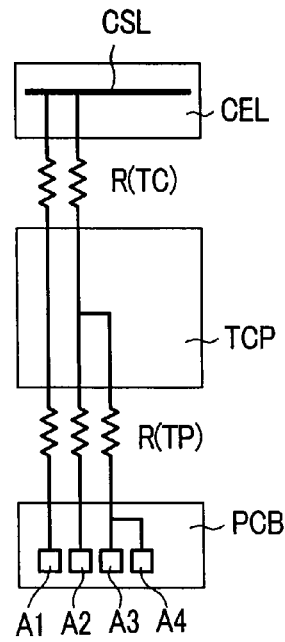
Figure 53C:
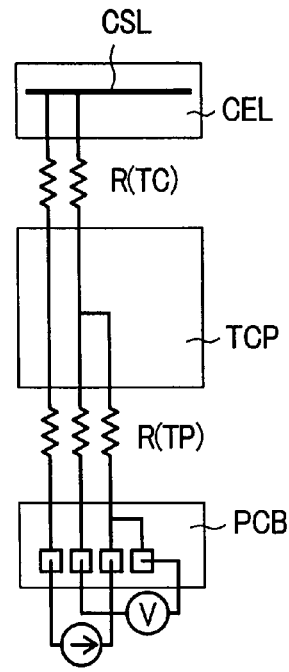

FIG. 53A is a schematic view as the base for the following explanations. The connection resistance of the connection portion between the display element CEL and the tape carrier TCP is R (TC), the connection resistance of the connection portion between the tape carrier TCP and the printed circuit board PCB is R (TP). FIG. 53B shows the arrangement for enabling the measurement of R (TP) in the manufacturing stage. A common potential line bus CSL is arranged to the display element CEL. This implies that the respective tape carrier TCP and the display element CEL are connected at two places separately. Respective two connections which are separately connected to this common potential line bus CSL and form R (TC) are formed. In one connection out of these two connections, the line is divided on the tape carrier TCP thus forming three R (TP). This implies that the respective tape carrier TCP and the printed circuit board PCB are connected at three places separately. The line which is divided on the tape carrier TCP is further divided on the printed circuit board PCB. In this stage, there are four lines and the respective lines form measurement terminals as A1 to A4 corresponding to the respective lines on the printed circuit board PCB. Here, as shown in FIG. 53C, by supplying a constant current between A1 and A3 and by measuring the voltage difference between A2 and A4, R (TP) is easily calculated as a voltage/current. This measurement concept per se is widely known as the four terminal method and as a highly accurate resistance measurement method. The improvement is characterized in that, by designing the wiring arrangement in such a manner that the divisions are formed on the tape carrier TCP and the printed circuit board PCB using the method, the measurement is made enable in the actual display device.

Figure 54A:
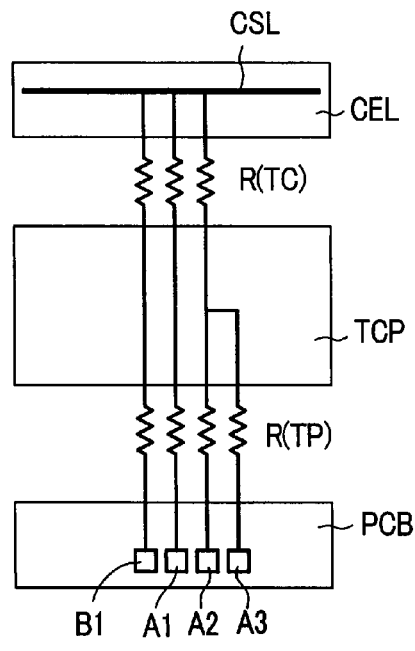
FIG. 54A and FIG. 54B are explanatory view on the measurement of the connection resistance between the tape carrier TCP and the display element CEL.
Figure 54B:
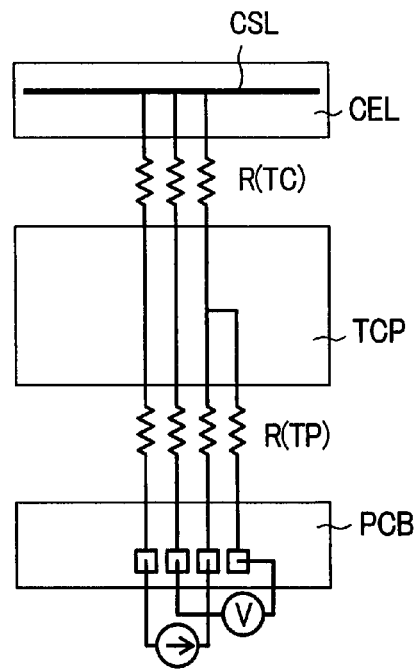

FIG. 54A and FIG. 54B are views showing the constitution which enables the measurement of the R (TC). As shown in FIG. 54A, three lines are connected to the common potential line bus CSL and, one out of three lines is divided on TCO and constitutes terminals B1 and A1 to A3. Here, as shown in FIG. 54B, by supplying a constant current between B1 and A2 terminals and by measuring the voltage between A1 and A3, R (TC) is also easily calculated as the voltage/current.

Figure 55A:
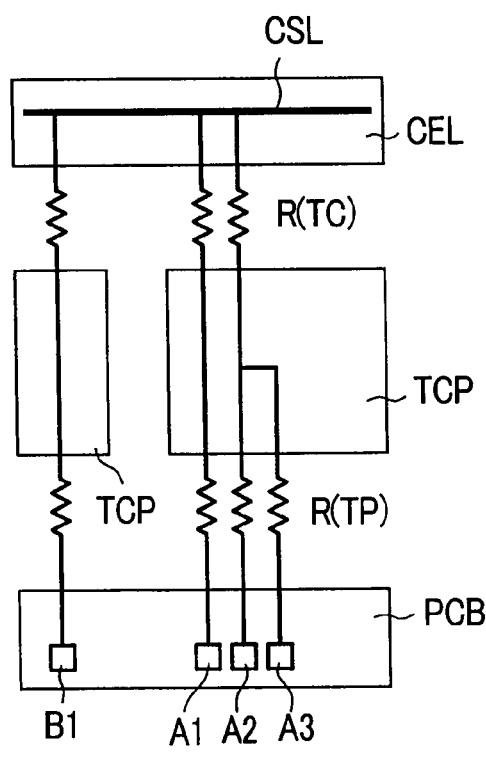
FIG. 55A and FIG. 55B are explanatory view on the measurement of the connection resistance between the tape carriers TCP and the display element CEL by way of a plurality of tape carriers TCP.
Figure 55B:
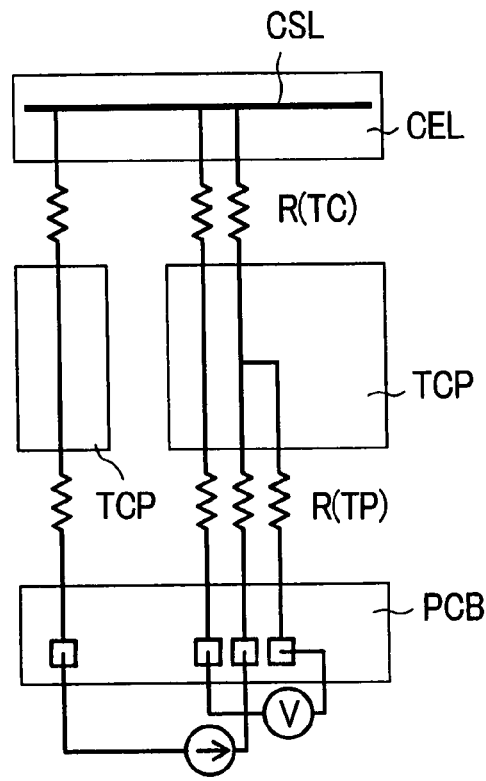

FIG. 55A and FIG. 55B are views showing a modified example of the constitution shown in FIG. 54A and FIG. 54B. The line which is connected to the B1 terminal is formed by a route which passes through another tape carrier TCP and, as shown in FIG. 55B, R (TC) can be calculated using the same measurement as FIG. 54A.

Figure 56A:
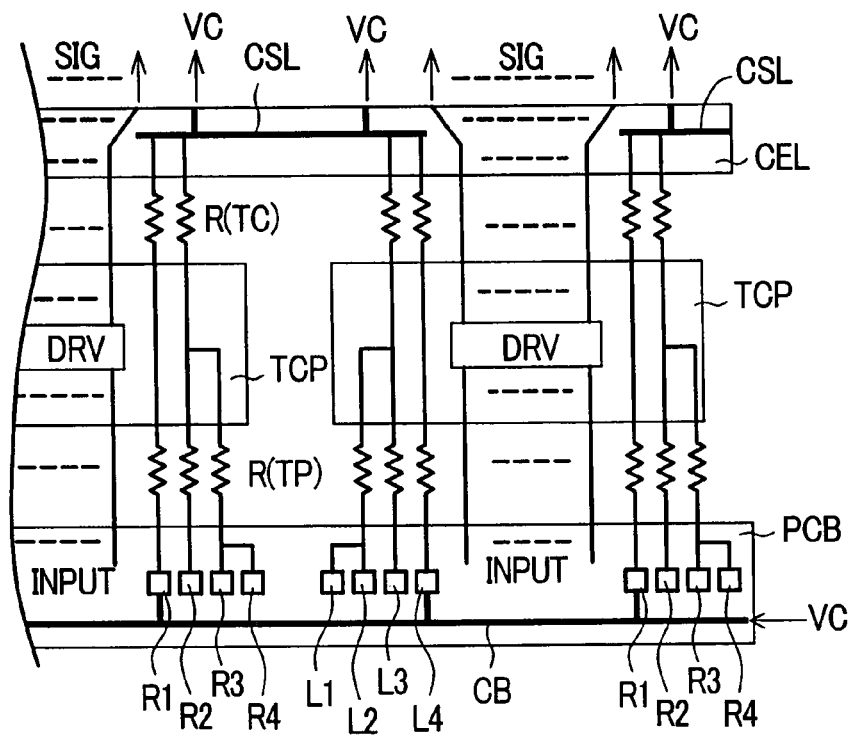
FIG. 56A and FIG. 56B are schematic connection views of the printed circuit board PCB, the tape carrier TCP and the display element CEL in a state that a connection resistance measurement pattern is incorporated.

An arrangement which corresponds to the measurement of both of R (TC) and R (TP) and is favorably adopted for an actual use shown in FIG. 56. The common potential line bus CSL on the display element CEL is also used as a bus line for supplying the common potential VC. The respective tape carriers TCP have driver elements DRV arranged in the center thereof, the respective driver receives an input signal INPUT from the printed circuit board PCB and produces a signal used for the display of the display element CEL and the signal is supplied to the display region through the signal line SIG. Each tape carrier TCP has a common potential supply line which does not pass through the driver element DRV formed on the outside of the driver element DRV. This supply line is connected to the common potential line bus CSL on the display element CEL and also connected to the common bus line CB which is formed on the printed circuit board PCB. Accordingly, when the common potential VC is supplied to the common bus line CB, the common potential is supplied to the common potential line bus on the display element CEL. This common potential supply line has a measurement terminal L4 formed on the printed circuit board PCB. Further, a measurement line is formed in a state that the measurement line is connected to the common potential line bus CSL, extends on the tape carrier TCP and is connected on the printed circuit board PCB, and a measurement terminal L3 is formed on the printed circuit board PCB. This measurement line is sequentially divided on the tape carrier TCP and the printed circuit board PCB thus increasing the number thereof and each line has a measurement terminal formed on the printed circuit board PCB. Accordingly, the measurement terminals L1 to L4 are formed. On the opposite side of the printed circuit board PCB by way of the driver element DRV, terminals R1 to R4 are formed in a symmetrical manner, for example. When the common potential line bus CSL is formed in the region between the neighboring tape carriers TCP as shown in FIG. 56A, the groups of measurement terminals of R1 to R4 and L1 to L4 are completed with respect to the neighboring tape carriers TCP with each other.

Here, it is constituted such that the lines other than the common potential supply line are not connected to VC.

Figure 56B:
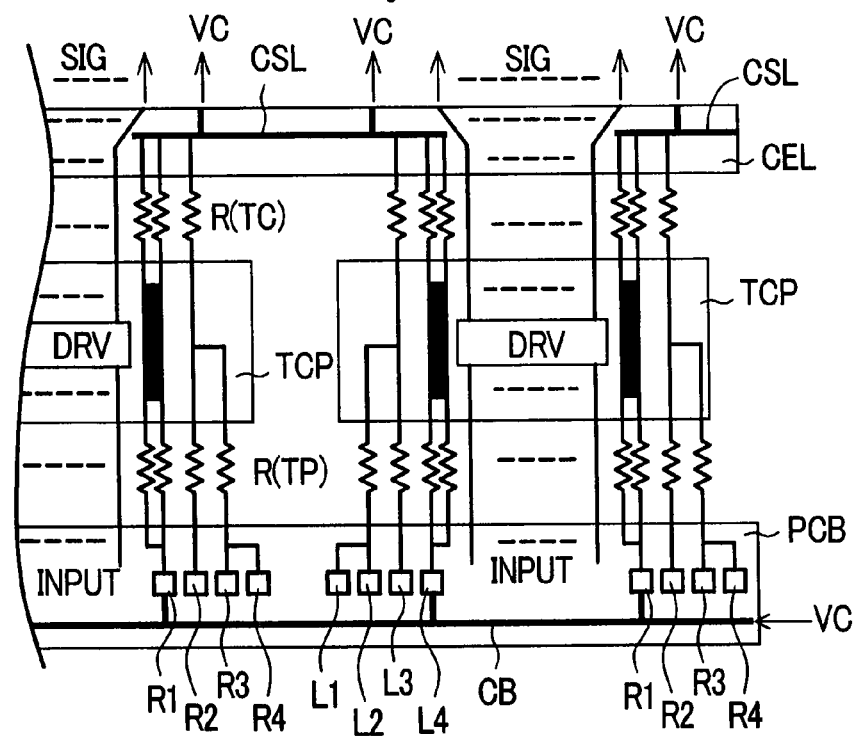

FIG. 56B shows an example in which, by setting a plurality of common potential supply lines, lowering of the power supply resistance at the power supplying of the common potential is realized.

Figure 57A:
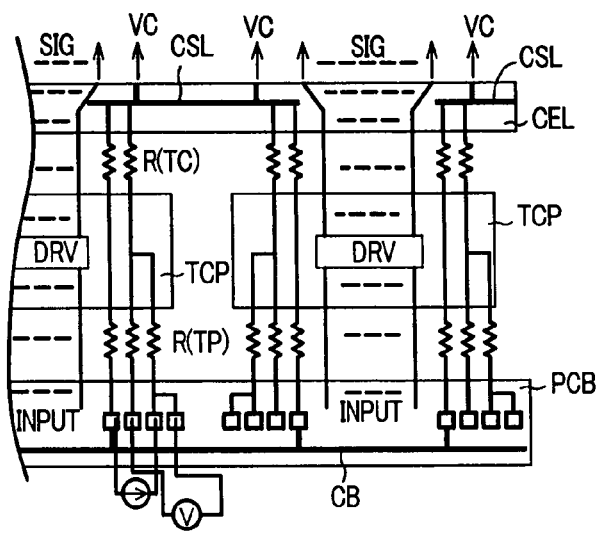
FIG. 57A to FIG. 57C are explanatory views of an example of the measurement of the connection resistance between the tape carrier TCP and the printed circuit board PCB.
Figure 57B:
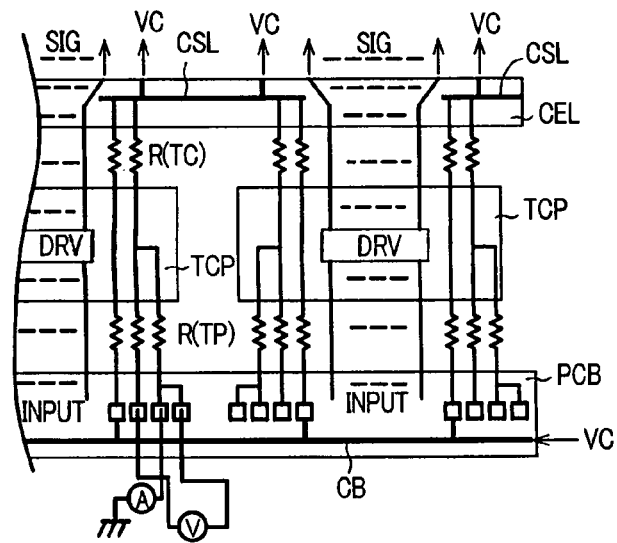
Figure 57C:
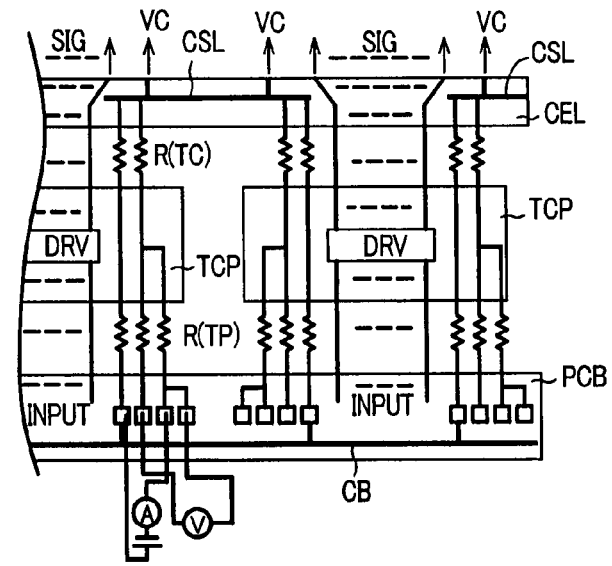

FIG. 57A to FIG. 57C are views showing a method in which R (TP) is measured using the constitution of the arrangement of FIG. 56A. FIG. 57A is a measurement example of a case in which the voltage is measured by supplying a current from a constant current source. FIG. 57B is an example of a constitution in which a voltage is supplied to the common bus line, a ammeter is connected to R3 and the point of the ammeter is connected to the ground. When the voltage configured to be supplied to the common bus line is other than the ground potential, a current is measured thus enabling the calculation of R (TP). In this method, VC can be directly measured as a normal common potential and hence, there is an advantageous effect that it is not necessary to prepare the constant current source. Further, there is an advantageous effect that the measurement of R (TP) can be performed during the operation of the display elements CEL. FIG. 57C is an example of a constitution in which, instead of the constant current source shown in FIG. 57A, the ammeter and the voltage source are used in combination.

Figure 58A:
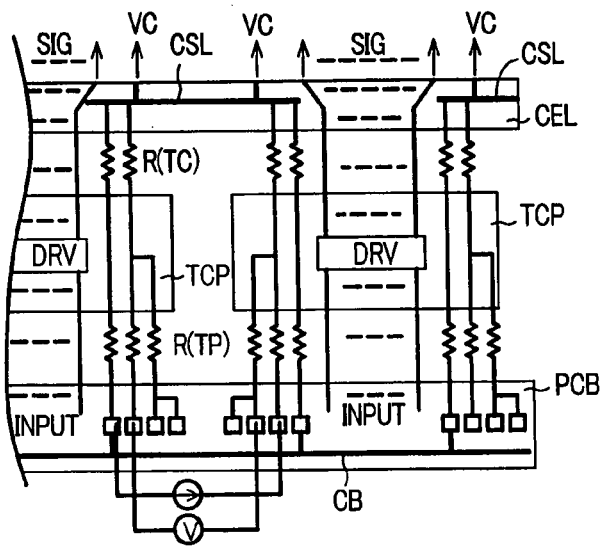
FIG. 58A to FIG. 58C are explanatory views of an example of the measurement of the connection resistance between the tape carrier TCP and the display element CEL.
Figure 58B:
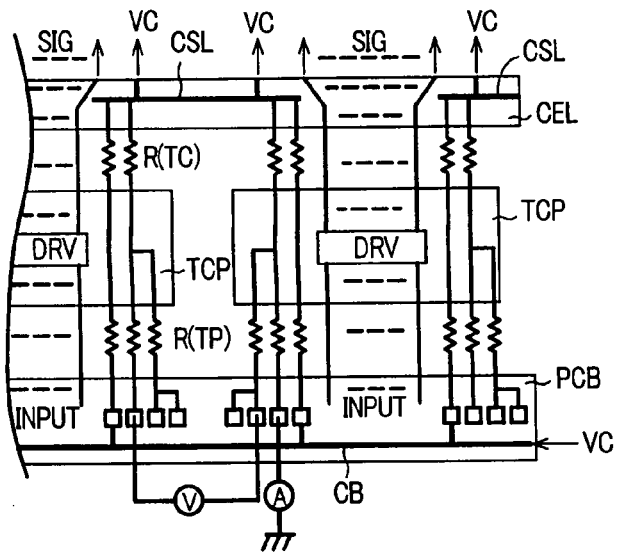
Figure 58C:
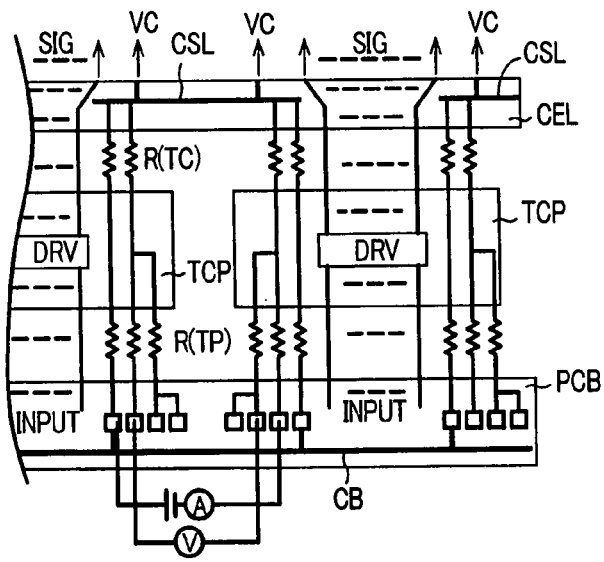

FIG. 58A to FIG. 58C are views showing a constitutional example at the measurement of R (TC). FIG. 58A shows an example in which the constant current source is used and, by connecting the constant current source between R1 and L3 and measuring the voltage between R2 and L2, R (TC) can be calculated. FIG. 58B shows an example of a case in which the common potential VC is supplied and the ammeter is connected to L3 and the output of the ammeter is grounded. The voltmeter is connected between R2 and L2. FIG. 58C is an example of a constitution in which, instead of the constant current source shown in FIG. 58A, the ammeter and the voltage source are used in combination.

<<Examples of Various Inventions Disclosed in this Specification>>

Examples of various inventions disclosed in this specification are described hereinafter.

<<A: TFT>>

(A-1) A display device in which the display device includes a semiconductor layer on a gate signal line and a drain electrode and a source electrode which are formed on the semiconductor layer and has the drain electrode connected with a video signal line using a connecting member at a connecting portion, the improvement being characterized in that the gate signal line has a hole in the vicinity of the connecting portion, and the connecting member sets a width thereof at the connecting portion with the video signal line larger than a width thereof at a connecting portion with the drain electrode.

(A-2) A display device being characterized in that, in the constitution (A-1), the drain electrode is formed in a shape which surrounds a periphery of the source electrode in a semicircular shape.

(A-3) A display device being characterized in that, in the constitution (A-1), the connecting member gets over the gate signal line with an angle.

<<B: Pixel Electrode Connecting Portion>>

(B-1) A display device in which the display device includes a semiconductor layer formed on a gate signal line and a drain electrode and a source electrode formed on the semiconductor layer, has the drain electrode connected to a video signal line, and has the source electrode connected to a pixel electrode in a connecting region, the improvement being characterized in that the source electrode once extends over the gate signal line and, thereafter, is bent in the direction parallel to the gate signal line and extends, and is subsequently bent in the direction of the gate signal line thus forming a bent connecting region.

(B-2) A display device being characterized in that, in the constitution (B-1), the gate signal line is formed in a state that the gate signal line is recessed in the connecting region portion.

(B-3) A display device being characterized in that, in the constitution (B-1), the gate signal line is formed in a state that a line width thereof is made fine in the connection region portion.

(B-4) A display device being characterized in that, in any one of the constitutions (B-1) to (B-3), the gate signal line has a hole at a crossing portion between the gate signal line and a video signal line, the gate signal line is divided into two portions having a fine line width, and two portions are merged again to form a bold line.

(B-5) A display device which constitutes a TFT by forming a semiconductor layer on a gate signal line and by forming a drain electrode and a source electrode on the semiconductor layer, connects the drain electrode with a video signal line, and connects the source electrode with a pixel electrode in a connecting region, the improvement being characterized in that the gate signal line sets a width thereof larger at a portion where the TFT is formed than a crossing portion with the video signal line and in the vicinity of the connecting portion.

<<C: Common Signal Line and Common Electrode>>

(C-1) A display device in which the display device includes a common signal line and a common electrode formed on a layer different from a layer on which the common signal line is formed, and the common signal line and the common electrode are directly connected to each other, the improvement being characterized in that the common signal line is formed above the common electrode and is arranged in a state that an end portion or an end side of the common electrode falls within a width of the common signal line.

(C-2) A display device in which the display device includes a common signal line and a common electrode formed on a layer different from a layer on which the common signal line is formed and the common signal line and the common electrode are directly connected to each other, the improvement being characterized in that the common signal line is formed above the common electrode and is arranged in a state that an end portion of the common electrode is positioned in a midst portion of the common signal line in the width direction.

<<D: Connection of the Common Potentials of Upper and Lower Pixels>>

(D-1) A display device being characterized in that each pixel includes a common electrode and a common signal line which extends through a group of pixels which are arranged in the lateral direction in common, wherein the common signal line is formed such that, at least one portion thereof is directly overlapped to the common electrode and, further, is arranged on one of either an upper or lower side of the pixel and, on another side of the upper or lower side of the pixel, an island-like connecting portion which is connected to the common electrode is arranged and, the above-mentioned common signal line and the above-mentioned connecting portion are connected by a bridge line which extends over a gate signal line.

(D-2) A display device being characterized in that each pixel includes a common electrode and a common signal line which extends through a group of pixels which are arranged in the lateral direction in common, a bridge line which connects the neighboring pixels in the vertical direction over a gate signal line is provided, wherein the above-mentioned bridge line is connected to the above-mentioned common electrode by way of the common signal line and the above-mentioned common electrode and the bridge line are formed of a transparent electrode and the above-mentioned common signal line is formed of metal.

(D-3) A display device being characterized in that, in the constitution (D-1), the above-mentioned common electrode and the bridge line are formed of a transparent electrode and the above-mentioned common signal line and the island-like connecting portion are formed of metal.

(D-4) A display device being characterized in that, in the constitution (D-2) or (D-3), the above-mentioned common electrode is brought into contact with the above-mentioned common signal line from below.

(D-5) A display device being characterized in that, in the constitutions (D-2) to (D-4), the above-mentioned common electrode is brought into contact with the island-like connecting portion in a lower layer.

(D-6) A display device being characterized in that, in any one of the constitutions (D-1) to (D-5), a pixel electrode having a large number of fine line-like portions or slit-like portions is arranged above the common electrode and the pixel electrode and the line bridge are formed on the same layer.

(D-7) A display device being characterized in that, in the constitutions (D-1) to (D-5), a pixel electrode having a plurality of fine line-like portions or slit-like portions is arranged above the common electrode and the pixel electrode and the bridge line are formed of a same material.

(D-8) A display device being characterized in that, in the constitution (D-7), the common electrode is also formed of the same material as the bridge line.

(D-9) A display device being characterized in that, in the constitutions (D-1) to (D-8), a connecting portion between the bridge line and the common electrode or the island-like connecting portion has a shape in which a corner portion thereof on the pixel electrode side is cut.

(D-10) A display device being characterized in that, in the constitutions (D-1) to (D-8), a connecting portion between the pixel electrode and the common electrode or an island-like connecting portion are overlapped to each other by way of three sides which are unparallel to each other.

<<E: Another Example of Pixel>>

(E-1) A display device being characterized in that, each pixel includes a planar common electrode and a pixel electrode which is overlapped to the common electrode and has a large number of fine line-like portions or slits, the direction of the fine line-like portions or slits formed in the pixel electrode differs between an upper region and a lower region of each pixel, wherein the slits are directed downwardly as the slits extend toward one side surface of the pixel in the upper region and are directed upwardly as the slits extend in the same one side direction of the pixel in the lower region thus arranging the slits in the directions as if the slits converge toward the center, a common signal line is provided to the pixels which are arranged close to each other in the lateral direction in common, the common electrodes are connected with the common signal line, and the display device includes a bridge line which electrically connects the common electrodes of the pixels which are arranged close to each other in the vertical direction.

(E-2) A display device being characterized in that, in the constitution (E-1), the bridge line is formed on the side toward which the slits converge.

(E-3) A display device being characterized in that, in the constitution (E-2), the common potential connecting portions are respectively formed corresponding to upper and lower end portions of the side toward which the slits converge.

(E-4) A display device being characterized in that, each pixel includes a planar common electrode and a pixel electrode which is overlapped to the common electrode and has a large number of fine line-like portions or slits, the direction of the fine line-like portions or slits formed in the pixel electrode differs between an upper region and a lower region of each pixel, wherein the slit is directed downwardly as the slits extend toward one side surface of the pixel in the upper region and is directed upwardly as the slits extend in the same one side surface of the pixel in the lower region thus arranging the slits in the direction as if the slits converge toward the center and the display device has a pattern in which the pixel electrode repeats the enlargement and the contraction of a width thereof at least three times in a center region of the pixel electrode.

(E-5) In (E-4), a black screen is periodically displayed.

(E-6) A display device being characterized in that, each pixel includes a planar common electrode and a pixel electrode which is overlapped to the common electrode and has a large number of fine line-like portions or slits, the direction of the fine line-like portions or slits formed in the pixel electrode differs between an upper region and a lower region of each pixel, wherein the slits are directed downwardly as the slits extend toward one side surface of the pixel in the upper region and are directed upwardly as the slits extend in the same one side surface of the pixel in the lower region thus arranging the upward slits and the downward slits in a state that the upward slits and the downward slits are alternately meshed with each other in a center region of the pixel.

<<F: Dummy Pixel Region>>

(F-1) A display device being characterized in that the display device includes a plurality of pixels in the inside of the display region and a dummy region arranged in an outer periphery of the display region, wherein the respective pixels at corner portions in the inside of the display region have electrodes which are arranged in a state that the pixels hardly receives the influence of an electric field from the dummy pixels at the corner portions.

(F-2) A display device being characterized in that the display device includes a plurality of pixels in the inside of the display region and a dummy region which is arranged on an outer periphery of the display region, an electrode which constitutes an uppermost layer on a substrate includes line-like electrodes or slits and the directions of the line-like electrodes or the slits are equal between the pixels which are arranged at corner portions which face each other in an opposed manner with respect to the center of a screen, and at least in the vicinity of the corner portions.

(F-3) A display device being characterized in that, in the constitution (F-2), the direction of the line-like electrodes or the slits differs between the pixels which are arranged in a most-spaced-apart manner from each other on the same side and at least in the vicinity of the corner portions.

(F-4) A display device being characterized in that the display device includes a plurality of pixels in the inside of the display region and a dummy region which is arranged on an outer periphery of the display region, the display device includes two types of pixels in which an uppermost electrode formed on the substrate includes line-like electrodes or slits and the directions of the line-like electrodes or the slits differ from each other, and with respect to the direction of the linear electrodes or slits formed in the pixels at the corner portions, by comparing an acute intersecting angle which the direction of the line-like electrodes or the slits makes with respect to a line which connects the corner portion and the center of the display region, the pixels having the direction of the slits or the electrodes which intersects with an angle larger than the acute intersecting angle are arranged.

<<G: Dummy Pattern>>

(G-1) A display device being characterized in that the display device includes a plurality of pixels in the inside of the display region and a dummy region arranged in an outer periphery of the display region, wherein dummy pixels for film thickness measurement are arranged in the dummy region which is arranged closest to the display region.

(G-2) A display device being characterized in that, in the constitution (G-1), the dummy pixels for film thickness measurement have a larger number of holes formed in protective films thereof than the number of holes formed in protective films of other neighboring dummy pixels.

(G-3) A display device being characterized in that, in the constitution (G-2), there exists a plurality of types of dummy patterns having different layer structures.

<<H: Module Joining Structure>>

(H-1) A display device being characterized in that the display device includes an upper frame, an intermediate frame and a lower frame, wherein the respective upper frame and the intermediate frame are individually combined with respect to the lower frame.

(H-2) A display device in which the combination portion of the upper frame and the lower frame is not observed from a side surface on a long side of the display device and is observed from a side surface on a short side.

<<I: Inverter>>

(I-1) A display device being characterized in that the display device includes an inverter printed circuit board which is fixed to a metal frame, an inverter cover made of metal which covers the inverter printed circuit board, a controller printed circuit board which is fixed to the above-mentioned metal frame and the controller cover made of metal which covers the controller printed circuit board, wherein a large number of holes are formed in both of the above-mentioned inverter cover and the controller cover and the size of the hole of the inverter cover is larger than the size of the holes formed in the controller cover.

(I-2) A display device being characterized in that the display device includes a high-voltage side inverter printed circuit board and a low-voltage side inverter printed circuit board which are fixed to a metal frame, wherein an inverter transformer is arranged at the high-voltage side and the high-voltage side inverter printed circuit board and the low-voltage side inverter printed circuit board are arranged at the end portions of the metal frame facing to each other and, at the same time, are connected by the connecting member.

(I-3) A display device being characterized in that, in the constitution (I-2), the size of the high-voltage side inverter printed circuit board is larger than the size of the low-voltage side inverter printed circuit board.

(I-4) A display device being characterized in that, in the constitution (I-2) or (I-3), the number of the low-voltage side inverter printed circuit boards are larger than the number of the high-voltage side inverter printed circuit boards.

(I-5) A display device being characterized in that the display device includes a high-voltage side inverter printed circuit board and a low-voltage side inverter printed circuit board which are fixed to a metal frame, wherein an inverter transformer is arranged at the high-voltage side and the metal frame includes a fixing portion of the high-voltage side inverter printed circuit board and the low-voltage side inverter printed circuit board, whereby the fixing portions are arranged in a fixable state even when the high-voltage side inverter printed circuit board and the low-voltage side inverter printed circuit board are replaced.

(I-6) A display device being characterized in that, in the constitution (I-5), the fixing portions are arranged on the both sides of the substrate with respect to the high-voltage side inverter printed circuit board and are arranged on one side of the substrate with respect to the low-voltage side inverter printed circuit board.

(I-7) A display device being characterized in that, in the constitution (I-6), the width of the low-voltage side inverter printed circuit board is equal to or less than ½ of the width of the high-voltage side inverter printed circuit board.

(I-8) A display device being characterized in that, in the constitution (I-7), the width of the low-voltage side inverter printed circuit board is equal to or less than ⅓ of the width of the high-voltage side inverter printed circuit board.

<<J: Fixing of the Upper and the Lower Frame>>

(J-1) A display device being characterized in that the display device includes an upper frame, an intermediate frame and a lower frame, wherein, in a connecting portion of the upper frame and the lower frame, the upper frame has a projecting portion on a lower side thereof, the lower frame has a projecting portion on an upper side thereof and the intermediate frame has a hole portion formed therein.

(J-2) A display device being characterized in that, in the constitution (J-1), the upper frame and the lower frame are directly brought into contact to with each other in the above-mentioned hole portion.

(J-3) A display device being characterized in that, in the constitution (J-2), the upper frame and the lower frame are fixed to each other in the above-mentioned hole portion using screws.

(J-4) A display device being characterized in that the display device includes an upper frame, an intermediate frame and a lower frame, wherein the upper projecting portion and the lower projecting portion are integrally formed on the intermediate frame, a hole is formed in the upper frame corresponding to the upper projecting portion, a hole is formed in the lower frame corresponding to the lower projecting portion and the above-mentioned upper projecting portion and the lower projecting portion are arranged in a state positions of the projecting portions are displaced from each other.

<<K: Intermediate Frame>>

(K-1) A display device being characterized in that the display device includes an upper frame, an intermediate frame and a lower frame, wherein the intermediate frame is formed of a resin member and is divided into four members consisting of a right member, a left member, an upper member and a lower member, and all of these four members are independent from each other and the respective members are individually fixed to the lower frame.

(K-2) A display device being characterized in that, in the constitution (K-1), the upper frame and the lower frame are made of metal.

(K-3) A display device being characterized in that the display device includes an upper frame, an intermediate frame and a lower frame, wherein the intermediate frame is formed of a resin member, is divided into four members consisting of a right member, a left member, an upper member and a lower member, and all of these four members are independent from each other, these four members are configured such that the upper member and the lower member extend only in the longitudinal direction of a display device and the right member and the left member extend in both of the lateral direction and the longitudinal direction of the display device, and a length of a longitudinal portion of the display device is set shorter than a length of lateral portion of the display device.

(K-4) A display device being characterized in that, in the constitution (K-3), a display element is arranged between the upper frame and the intermediate frame.

(K-5) A display device being characterized in that, in the constitution (K-4), the right member and the left member are prevented from being brought into contact with a substrate end portion of the display element in the short-side direction.

(K-6) A display device being characterized in that, in the constitution (K-4), a horizontal distance between the right member and the left member at a same height with an end portion of the display element in the vertical direction of the display device is set longer than a horizontal distance between the upper member and the lower member at a same height with the end portion of the display element.

(K-7) A display device being characterized in that, in the constitution (K-1), the members which are arranged close to each other are arranged in a state that the projecting portions thereof in the horizontal direction are fitted into each other.

(K-8) A display device being characterized in that, in the constitution (K-7), in the fitting portions, the respective members which are arranged close to each other are fixed to the lower frame using screws.

<<L: Drain Printed Circuit Board>>

(L-1) A display device in which the display device includes a display element, a driver element which is connected to the display element and a drain printed circuit board which is connected with the driver element, the improvement being characterized in that two connecting members from a controller printed circuit board are connected to the drain printed circuit board, a width of one connecting member is set larger than a width of other connecting member, and the number of layers of another connecting member is set larger than the number of the layers of one connecting member.

(L-2) A display device being characterized in that, in the constitution (L-1), the above-mentioned one connecting member supplies a gray scale power source and a power source for a video signal drive circuit and other connecting member transmits clocks and display data.

(L-3) A display device being characterized in that, in the constitution (L-1) or (L-2), the drain printed circuit board is divided in two and each divided printed circuit board includes the above-mentioned one connecting member and the above-mentioned another connecting member and the connecting members are arranged such that another connecting member of both of printed circuit boards is arranged in the inside of one connecting member of both printed circuit boards.

(L-4) A display device including an upper frame made of metal, an intermediate frame made of resin and a lower frame made of metal, the improvement being characterized in that the display device includes a display element, a driver element which is connected to the display element and drain printed circuit boards which are connected to the driver element, wherein the drain printed circuit boards are provided in plural numbers, and the respective drain printed circuit boards are fixed to the above-mentioned lower frame using screws.

(L-5) A display device including an upper frame made of metal, an intermediate frame made of resin and a lower frame made of metal, the improvement being characterized in that the display device includes a display element, a driver element which is connected to the display element and a drain printed circuit board which is connected to the driver element, wherein the drain printed circuit board is arranged between a bent side surface portion of the lower frame and a bent side surface portion of the upper frame.

<<M: Inverter Cable>>

(M-1) A display device including an inverter, a light source and a cable which connects the light source and the inverter, the improvement being characterized in that the display device includes a holding member which is integrally formed with a mold which fixes the light source, the above-mentioned cable is arranged in a region sandwiched between a side surface of the mold and the holding member thus restricting the movement of the cable in the fore-and-aft direction and, further, the cable is arranged along an arcuate R portion which is formed above the holding member and is constituted such that the cable is restored again to a lower side of the R portion and, thereafter, connected to the light source.

<<N: Reflection Sheet>>

(N-1) A display device including a lower frame, a reflection sheet, a light source, a diffusion plate and a display element, the improvement being characterized in that the reflection sheet is arranged between the lower frame and the light source, the diffusion plate is arranged between the light source and the display elements, the lower frame is formed in an approximately planar shape in a region below the display element and the lower frame is raised upwardly in a peripheral portion of the display element and extends horizontally and, a horizontal portion has a hole formed therein, the reflection sheet is arranged approximately horizontally in a region below the display element, is bent in an oblique direction at a peripheral portion thereof and is extended upwardly and, thereafter, is extended horizontally and, further, a portion of an end portion of the sheet is bent downwardly and is fitted into a hole formed in a horizontal portion of the lower frame.

(N-2) A display device being characterized in that, in the constitution (N-1), the above-mentioned reflection sheet is sandwiched between a diffusion plate and the lower frame thus preventing the removal of the reflection sheet from the hole portion.

(N-3) A display device being characterized in that the display device includes an upper frame, an intermediate frame, a lower frame, a light source and a side mold to which the light source is fixed, wherein the above-mentioned upper frame, the intermediate frame, lower frame and side mold are independently fixed to the above-mentioned lower frame.

(N-4) A display device being characterized in that, in the constitution (N-3), the fixing is performed using screws.

<<P: Light Source>>

(P-1) A display device including a light source, a lower frame made of metal which is arranged below the light source, a display element which is arranged above the light source, the improvement being characterized in that a plurality of light sources are arranged in parallel and common spacers are arranged to longitudinally cross some of the plurality of light sources between the lower frame and the light source.

(P-2) A display device being characterized in that, in the constitution (P-1), the common spacers are formed of an elastic or resilient member.

(P-3) A display device being characterized in that, in the constitution (P-2), the common spacers are made of rubber or sponge.

(P-4) A display device being characterized in that, in the constitution (P-1), a reflection sheet is arranged between the common spacers and the light sources.

(P-5) A display device being characterized in that, in the constitution (P-1), the light source is a fluorescent tube, the fluorescent tube includes a side which is connected to a high-voltage side of an inverter and a side which is connected to a low-voltage side of the inverter and the above-mentioned common spacers are arranged on the high-voltage side.

(P-6) A display device being characterized in that, in the constitution (P-1), the light source is a fluorescent tube and the above-mentioned common spacers are collectively arranged on the whole fluorescent tube.

<<Q: γ Characteristics>>

(Q-1) A display device in which a signal from the outside of the display device is inputted to a controller and the controller supplies a video signal to a video signal drive circuit after processing the signal, the improvement being characterized in that a gray scale reference voltage which is supplied to a video signal line drive circuit is generated by a D/A converter in response to an instruction from the controller.

(Q-2) A display device being characterized in that, in the constitution (Q-1), the above-mentioned gray scale reference voltage is variable in plural kinds in response to the instruction of the controller.

(Q-3) A display device being characterized in that, in the constitution (Q-2), the video signal line drive circuit generates a voltage per each gray scale based on the gray scale reference voltage.

(Q-4) A display device being characterized in that, in the constitution (Q-3), the display device includes a memory which can supply information to the controller, and the above-mentioned memory holds a plurality of data sets for changing the gray scale characteristics.

(Q-5) A display device being characterized in that, in the constitution (Q-4), the above-mentioned data set is selectable in response to a signal from the outside.

(Q-6) A display device being characterized in that, in the constitution (Q-4) or (Q-5), a power source voltage for operating the circuit per se is supplied to the video signal line drive circuit, the rising sequence at the time of supplying the gray scale reference voltage to the video signal line drive circuit from the above-mentioned D/A converter is performed such that, as the time elapses, first of all, a power source voltage of the video signal line drive circuit is raised firstly and, before the power source voltage of the video signal line drive circuit reaches a steady state, the supply of the gray scale reference voltage is started. Thereafter, when the power source voltage of the video signal line drive circuit reaches the steady state, the gray scale reference voltage is allowed to assume the steady state.

<<R: Display of Manufacturing Information>>

(R-1) A display device including a display element and a controller which allows the display element to display a signal in response to a signal from the outside, the improvement being characterized in that the display device includes a memory, and the above-mentioned controller has an information display mode in which the display element is allowed to display information set in the above-mentioned memory.

(R-2) A display device being characterized in that, in the constitution (R-1), the changeover to the information display mode is performed corresponding to whether an output is released from one terminal of the controller or the short-circuiting occurs.

(R-3) A display device being characterized in that, in the constitution (R-1) or (R-2), the information displayed in the information display mode is a barcode.

(R-4) A display device being characterized in that, in the constitution (R-1) or (R-2), the information displayed in the information display mode is a strip-like image.

(R-5) A display device being characterized in that, in the constitution (R-4), the strips include strips which differ in color.

<<S: Changeover of the Display Frequency>>

(S-1) A display device including a display element and a controller which allows the display element to display a signal in response to a signal from the outside, the improvement being characterized in that the display elements are able to perform a display in a plurality of frequencies and the changeover of the frequency can be instructed in response to a mode change signal from the outside, the display device includes a memory which temporarily stores image information and, when the controller receives the mode change signal, the controller examines both changeover timings of the plurality of display modes having different frequencies, and the controller executes the mode change when the timings are synchronized with each other and, when the timings are not synchronized with each other, postpones the mode change until the timings are synchronized with each other.

(S-2) A display device being characterized in that, in the constitution (S-1), out of two display modes having different frequencies, one display mode is a mode which periodically displays a black image by setting a high frequency and another display mode is a mode in which the frequency is low and the input frequency from the outside and the display frequency coincide with each other.

<<T: Resistance Measurement of the Connecting Portion>>

(T-1) A display device in which the display device includes a display element, a tape carrier and a printed circuit board, and a signal from the printed circuit board is transmitted to a display element in a state that a terminal on the printed circuit board and a terminal on the tape carrier are connected with each other at a first connecting portion, the signal is transmitted through a line on the tape carrier, and a terminal on the opposite side of the tape carrier and a terminal of the display element are connected with each other at a second connecting portion, the improvement being characterized in that the connection resistance either at the first connecting portion and the second connecting portion is measurable using a measuring terminal formed on the printed circuit board.

(T-2) A display device being characterized in that, in the constitution (T-1), the above-mentioned measurement can be performed under conditions of a four terminal method.

(T-3) A display device being characterized in that, in the constitution (T-1), the above-mentioned first connecting portion or the second connecting portion is connected by way of an anisotropic conductive film.

(T-4) A display device in which the display device includes a display element, a tape carrier and a printed circuit board, and a signal from the printed circuit board is transmitted to a display element in a state that a terminal on the printed circuit board and a terminal on the tape carrier are connected with each other at a first connecting portion, the signal is transmitted through a line on the tape carrier, and a terminal on the opposite side of the tape carrier and a terminal of the display element are connected with each other at a second connecting portion, the improvement being characterized in that a common potential line bus is arranged at the display element, the tape carrier and the display element are connected separately at two places and, at the same time, are respectively connected to the common potential line bus separately, one out of these wirings is divided on the tape carrier and, accordingly, the tape carrier and the printed circuit board are respectively connected at three places, the wiring which is divided on the tape carrier is further divided on the printed circuit board and the measurement terminals corresponding to the above-mentioned respective wirings which are divided are arranged on the printed circuit board.

(T-5) A display device in which the display device includes a display element, a tape carrier and a printed circuit board, and a signal from the printed circuit board is transmitted to a display device in a state that a terminal on the printed circuit board and a terminal on the tape carrier are connected with each other at a first connecting portion, the signal is transmitted through a line on the tape carrier, and a terminal on the opposite side of the tape carrier and a terminal of the display element are connected with each other at a second connecting portion, the improvement being characterized in that the common potential line bus on the display element is also used as the common potential supplying bus line, the respective tape carriers include common potential supply lines which does not go through the driver element, the supply line is connected to the common potential line bus on the display element and is connected to the common bus line again which is formed on the printed circuit board, the common potential supply line has a measurement terminal thereof on the printed circuit board and is connected to the common potential line bus again and extends on the tape carrier and, thereafter, a measurement wiring which is connected to the printed circuit board is formed and a measurement terminal is formed on the printed circuit board and, the measurement wiring increase the number thereof by sequentially being divided on the tape carrier and on the printed circuit board and each of the divided wiring has a measurement terminal formed on the printed circuit board.

(T-6) A display device being characterized in that, in the constitution (T-5), out of the wirings which are connected to the measurement terminals, the wirings except for the common potential supply lines are separated from the reference potential supply line on the printed circuit board.

What is claimed is:

1. A display device, comprising:
a plurality of pixel regions, each of which is defined by a region surrounded by a gate signal line and a video signal line;
a common electrode which is formed in each pixel region and has a rectangle shape, the common electrode being formed in the same layer with the gate signal line and formed by transparent material;
a pixel electrode which is overlapped to the common electrode and has a plurality of slits, the pixel electrode being formed by transparent material;
a common signal line which is formed in parallel with the gate signal line, and is connected with the common electrode; and
a bridge line which is adjoined and formed so as to be in parallel to the video signal line and intersect the gate signal line,
wherein the bridge line connects two common electrodes each located on each side of the gate signal line, the bridge line is formed in a different layer from said two common electrodes, the bridge line is arranged across the gate signal line and is connected with each of said two common electrodes through a through hole, the bridge line is formed one by one to every two or more pixel regions,
wherein a connection portion is arranged between the bridge line and the common electrode in the position of the through hole, the connection portion being formed by metal material, the connecting portion having a shape in which a corner portion thereof on the pixel electrode side is cut, and
wherein a direction of slits formed in an upper region of each pixel region is different from a direction of slits formed in a lower region of each pixel region,
each slit has an inclination which is not parallel to the gate signal line and the video signal line, and inclination of the slits in the upper region and the inclination of the slits in the lower region are symmetrically formed so as to converge to a center of each pixel region.

2. A display device according to claim 1, wherein the bridge line is formed along with the video signal line of a side toward which the plurality of slits converge.

3. A display device according to claim 2, wherein the common signal line is formed on a position of a connecting area where the bridge line connects the common electrode.

4. A display device according to claim 3, wherein the pixel electrode is not formed on the connecting area.

5. A display device according to claim 3, wherein the common electrode is not formed on the connecting area.

6. A display device according to claim 3, wherein a connecting layer is formed on the connecting area and connects electrically between the bridge line and the common electrode.

7. A display device according to claim 1, wherein the pixel electrode and the bridge line are formed on the same layer.

8. A display device according to claim 1, wherein the pixel electrode and the bridge line are formed of a same material.

9. A display device according to claim 8, wherein the common electrode and the bridge line are formed of the same material.

10. A display device according to claim 1, wherein the connection portion by the side of the common signal line consists of a part of the common signal line.

* * * * *